(12) United States Patent
Cook, III et al.

(10) Patent No.: US 9,789,664 B2
(45) Date of Patent: Oct. 17, 2017

(54) PLATED TUBULAR LATTICE STRUCTURE

(71) Applicant: United Technologies Corporation, Farmington, CT (US)

(72) Inventors: Grant O. Cook, III, Spring, TX (US); James T. Roach, Vernon, CT (US)

(73) Assignee: UNITED TECHNOLOGIES CORPORATION, Farmington, CT (US)

( * ) Notice: Subject to any disclaimer, the term of this patent is extended or adjusted under 35 U.S.C. 154(b) by 0 days.

(21) Appl. No.: 14/903,305

(22) PCT Filed: Jul. 9, 2014

(86) PCT No.: PCT/US2014/045889
§ 371 (c)(1),
(2) Date: Jan. 7, 2016

(87) PCT Pub. No.: WO2015/006406
PCT Pub. Date: Jan. 15, 2015

(65) Prior Publication Data
US 2016/0145850 A1    May 26, 2016

Related U.S. Application Data

(60) Provisional application No. 61/844,161, filed on Jul. 9, 2013.

(51) Int. Cl.
*B32B 15/08* (2006.01)
*C25D 5/02* (2006.01)
(Continued)

(52) U.S. Cl.
CPC ............... *B32B 15/08* (2013.01); *B29B 11/06* (2013.01); *B29B 11/14* (2013.01); *B29C 43/183* (2013.01); *B29C 45/14* (2013.01); *C23C 18/1605* (2013.01); *C23C 26/00* (2013.01); *C25D 5/022* (2013.01); *C25D 7/04* (2013.01); *E04B 1/19* (2013.01); *E04B 1/30* (2013.01); *B29K 2101/10* (2013.01); *B29K 2101/12* (2013.01); *B29K 2105/20* (2013.01); *B29K 2705/00* (2013.01);
(Continued)

(58) Field of Classification Search
None
See application file for complete search history.

(56) References Cited

U.S. PATENT DOCUMENTS 4,916,110 A    4/1990 Manniso
7,927,708 B2   4/2011 Mizrahi
(Continued)

OTHER PUBLICATIONS

International Search Report for International Application No. PCT/US2014/045889; Date of Mailing: Nov. 24, 2014.
(Continued)

*Primary Examiner* — Patrick Maestri
(74) *Attorney, Agent, or Firm* — Cantor Colburn LLP

(57) ABSTRACT

A plated tubular lattice structure is described. The plated tubular lattice structure may comprise a backbone structure which may include a plurality of axial posts and a plurality of pyramidal structures extending laterally from the axial posts and connecting the axial posts at nodes. The plated tubular lattice structure may further comprise a metal plating layer plated on an outer surface of the backbone structure.

19 Claims, 32 Drawing Sheets

(51) Int. Cl.

| | | |
|---|---|---|
| *C25D 7/04* | (2006.01) | |
| *C23C 18/16* | (2006.01) | |
| *B29B 11/06* | (2006.01) | |
| *B29B 11/14* | (2006.01) | |
| *B29C 43/18* | (2006.01) | |
| *B29C 45/14* | (2006.01) | |
| *C23C 26/00* | (2006.01) | |
| *E04B 1/19* | (2006.01) | |
| *E04B 1/30* | (2006.01) | |
| *B29K 101/10* | (2006.01) | |
| *B29K 101/12* | (2006.01) | |
| *B29K 105/20* | (2006.01) | |
| *B29K 705/00* | (2006.01) | |
| *B29L 9/00* | (2006.01) | |

(52) U.S. Cl.
CPC ....... *B29L 2009/00* (2013.01); *B32B 2250/02* (2013.01); *B32B 2307/558* (2013.01); *B32B 2605/00* (2013.01); *E04B 2001/1927* (2013.01)

(56) References Cited

U.S. PATENT DOCUMENTS

| | | |
|---|---|---|
| 8,247,050 B2 | 8/2012 | McCrea et al. |
| 8,394,473 B2 | 3/2013 | McCrea et al. |
| 8,540,842 B2 | 9/2013 | Mizrahi |
| 2005/0115186 A1* | 6/2005 | Jensen ...................... A45F 3/04 52/633 |
| 2009/0193961 A1* | 8/2009 | Jensen .................. B29C 53/564 87/8 |
| 2010/0040902 A1 | 2/2010 | Mizrahi |
| 2010/0304063 A1 | 12/2010 | McCrea et al. |
| 2011/0162788 A1 | 7/2011 | Mizrahi |
| 2011/0283873 A1 | 11/2011 | Wadley et al. |
| 2012/0321906 A1 | 12/2012 | McCrea et al. |
| 2013/0143058 A1 | 6/2013 | McCrea et al. |
| 2013/0143060 A1 | 6/2013 | Jacobsen et al. |
| 2014/0162086 A1 | 6/2014 | Mizrahi |

OTHER PUBLICATIONS

Written Opinion for International Application No. PCT/US2014/045889; Date of Mailing: Nov. 24, 2014.

* cited by examiner

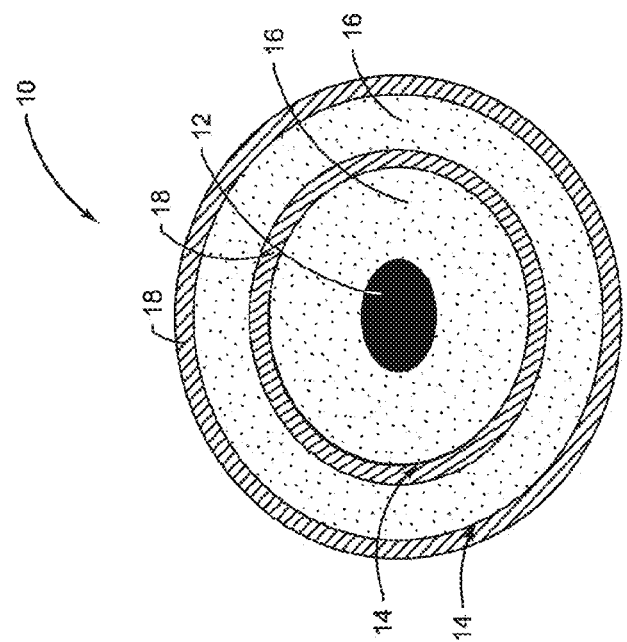
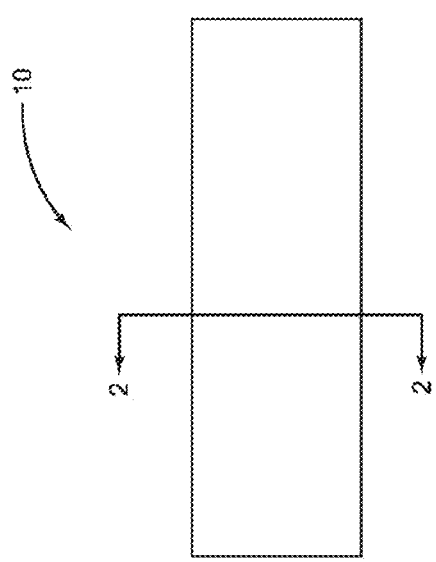
FIG. 2
FIG. 1

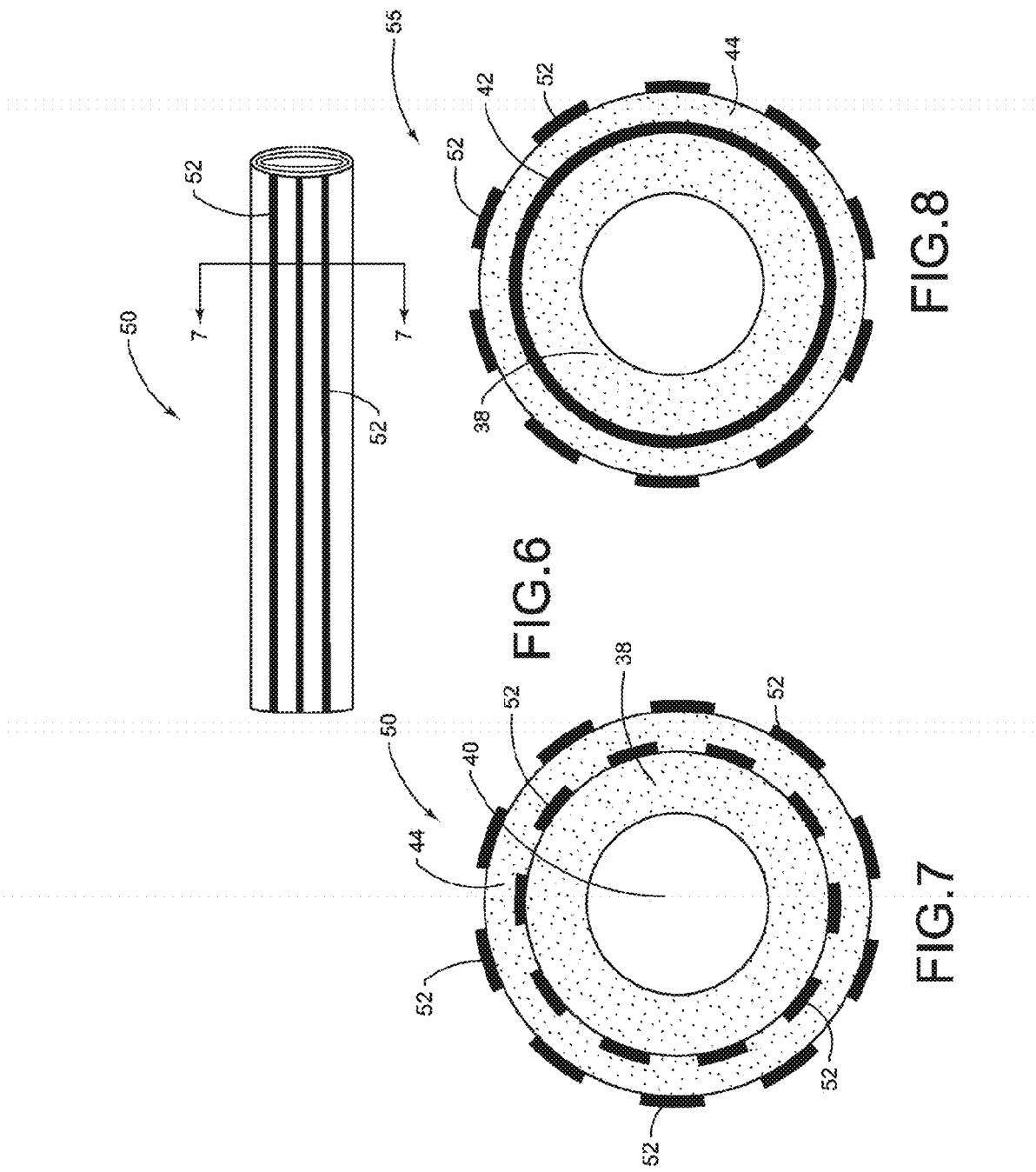

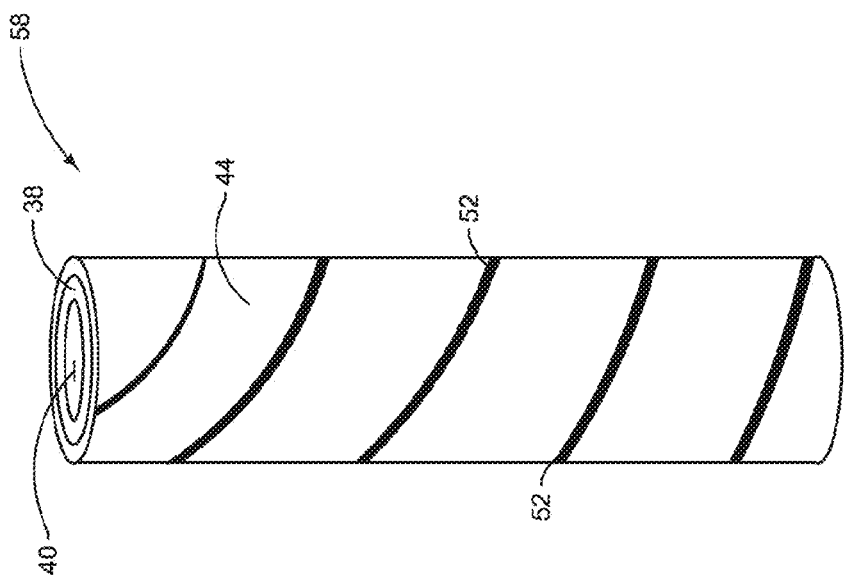
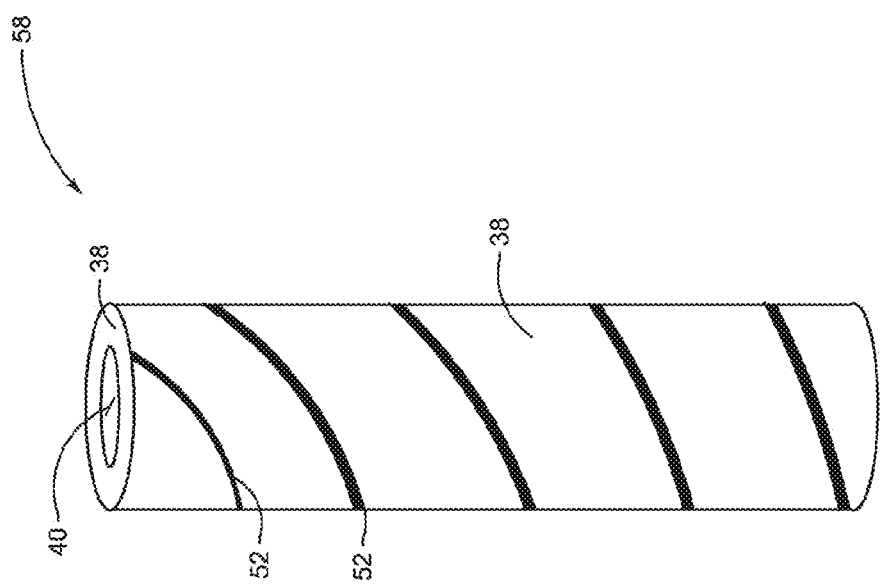

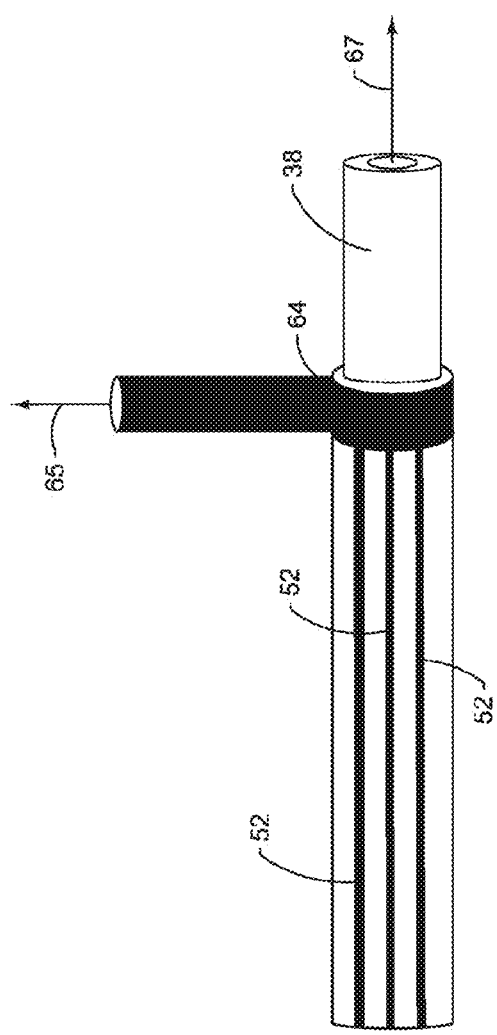
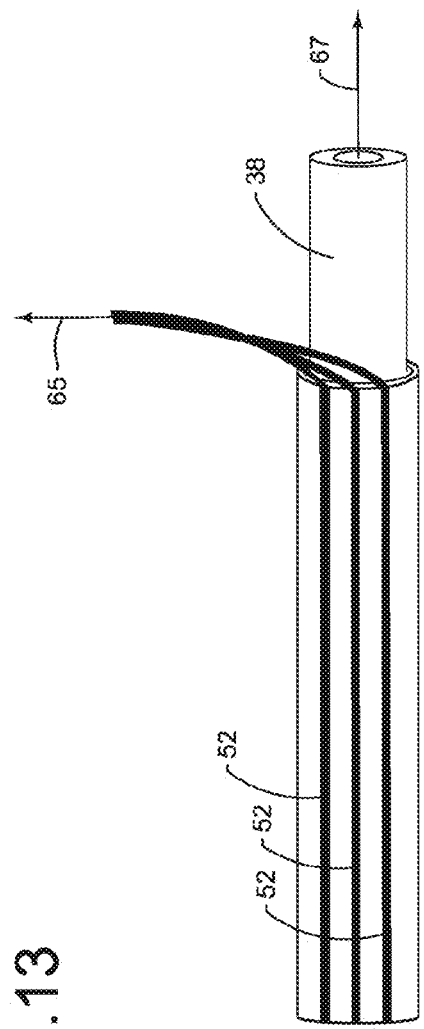

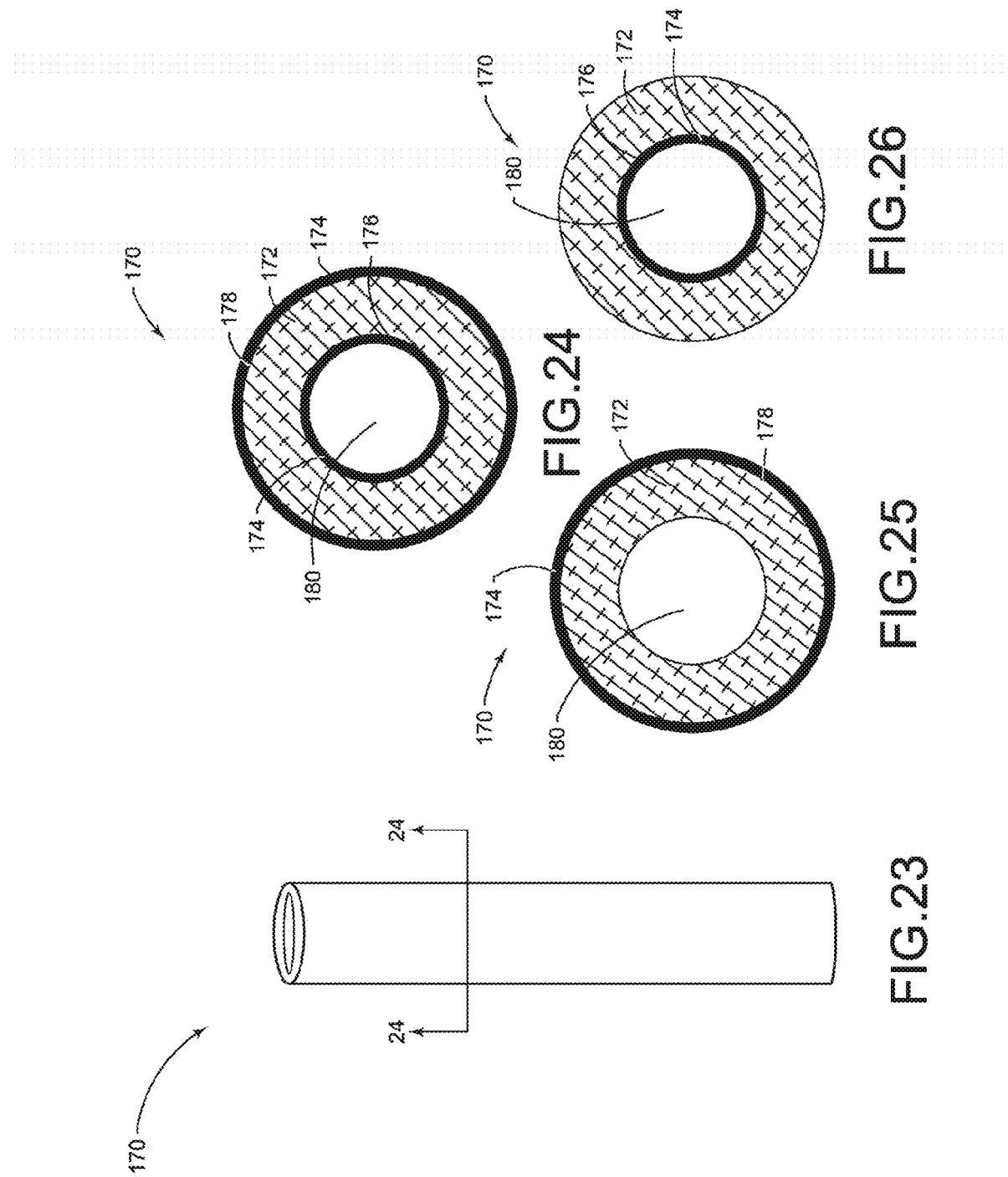

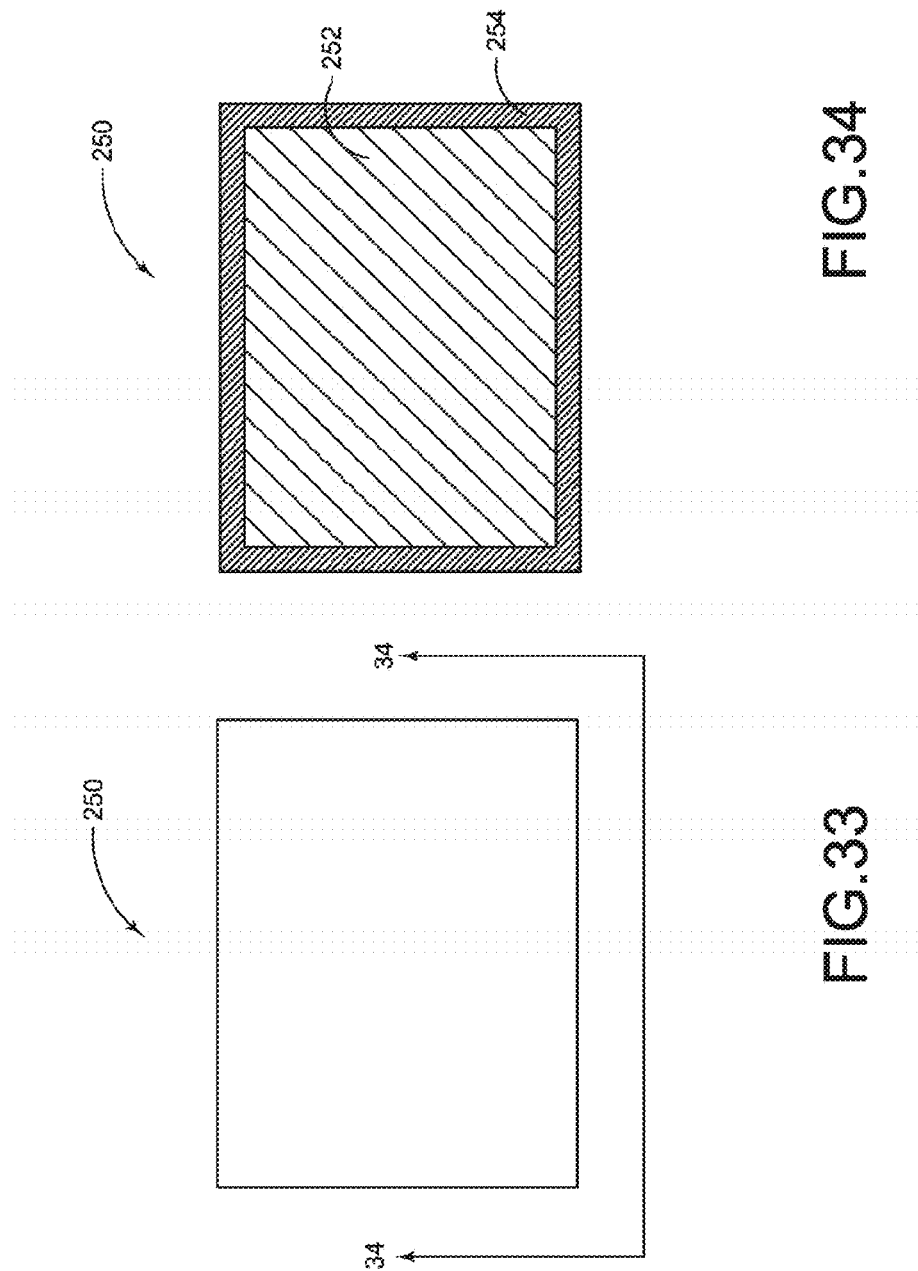

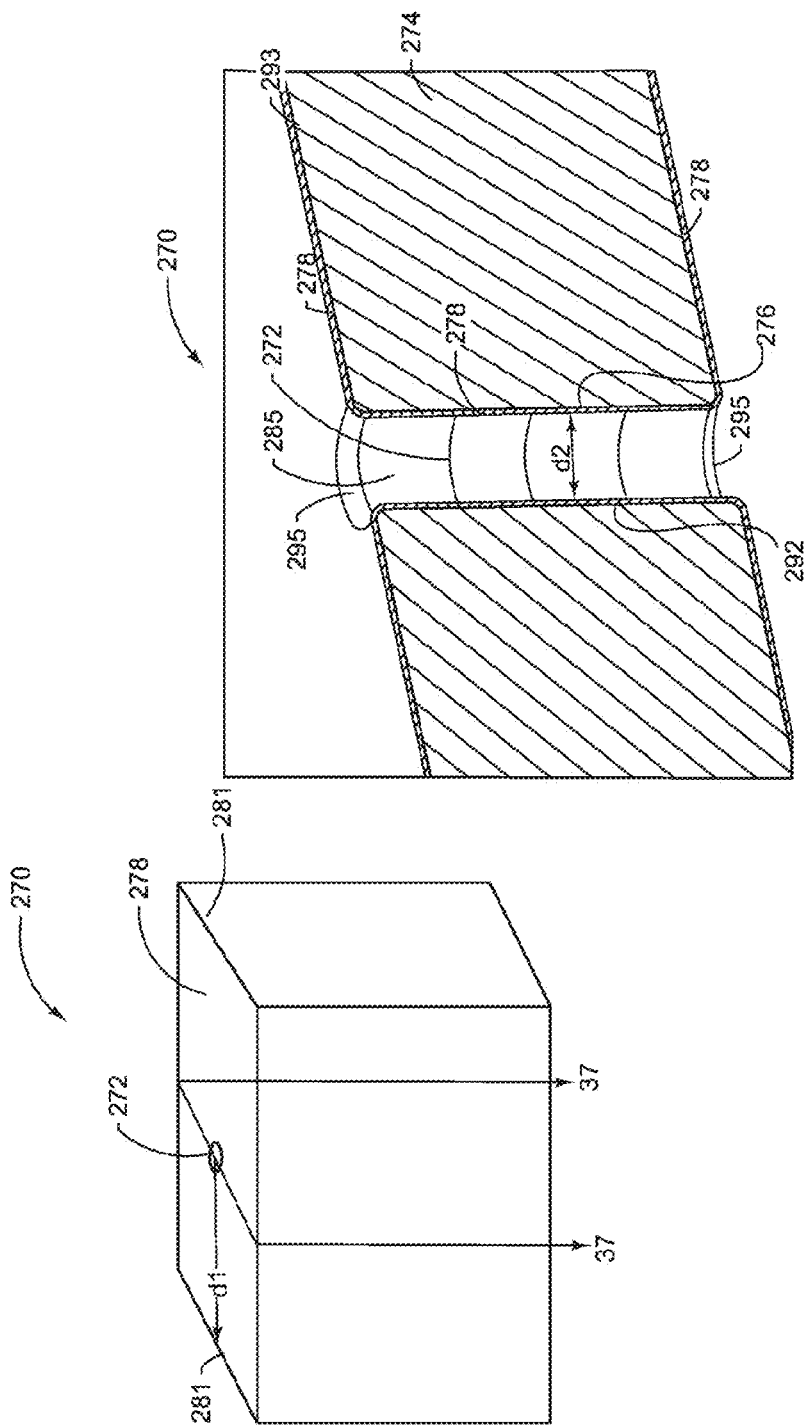

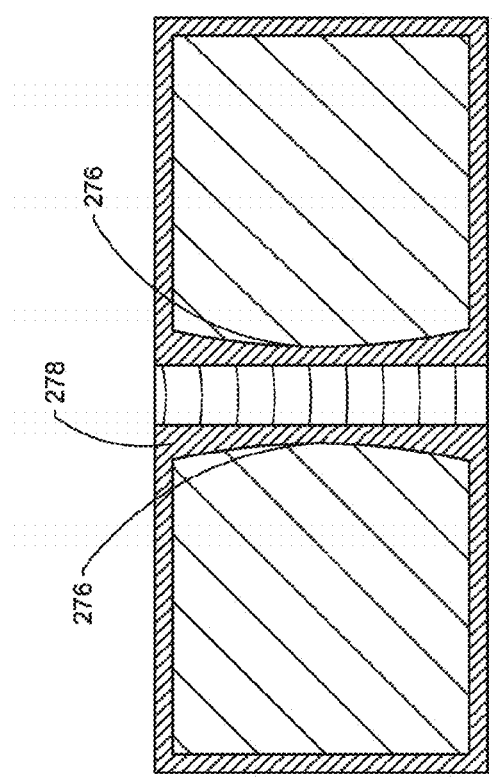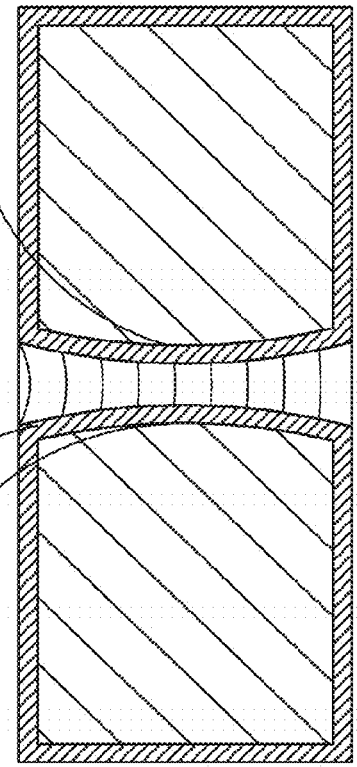

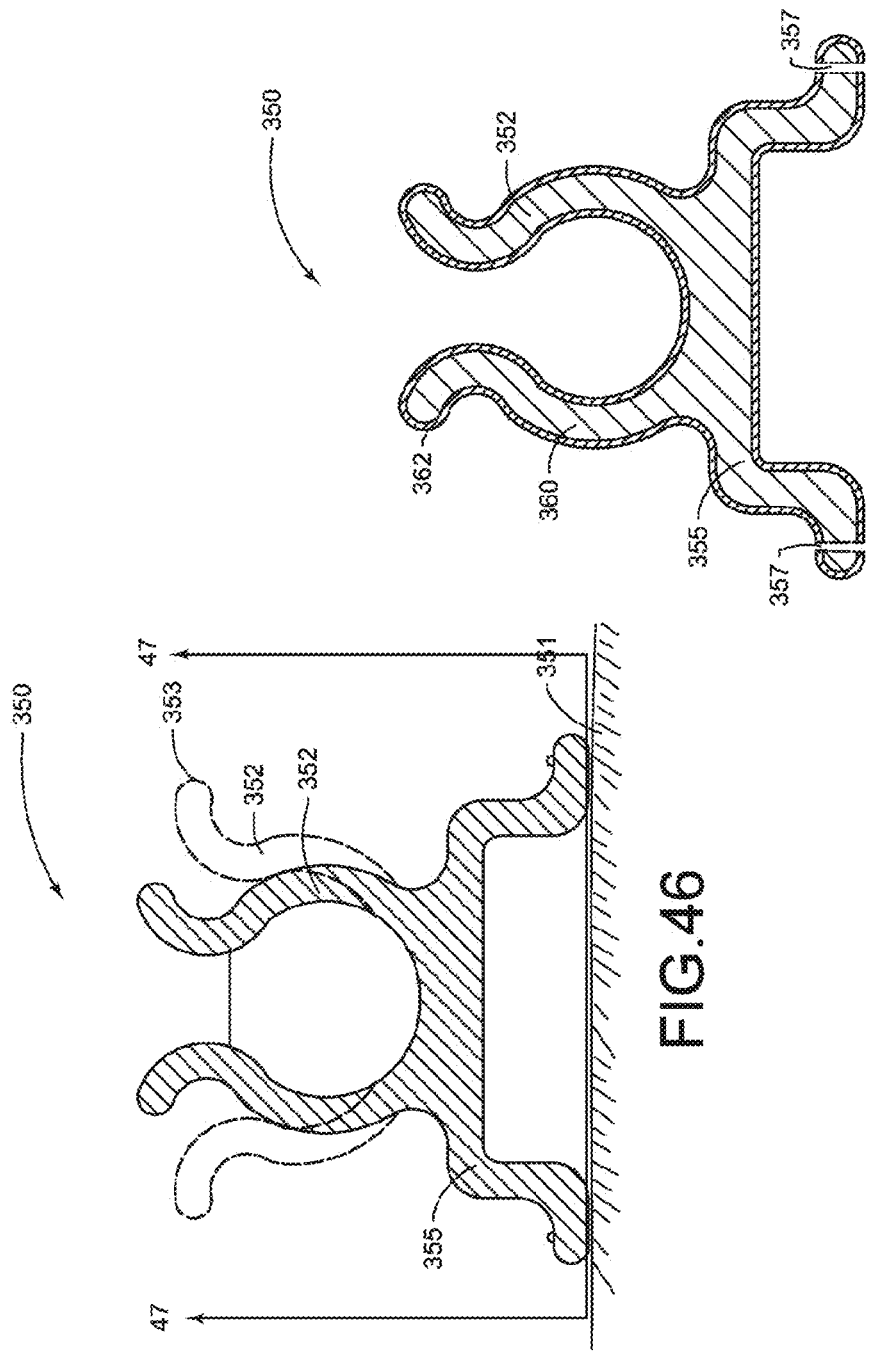

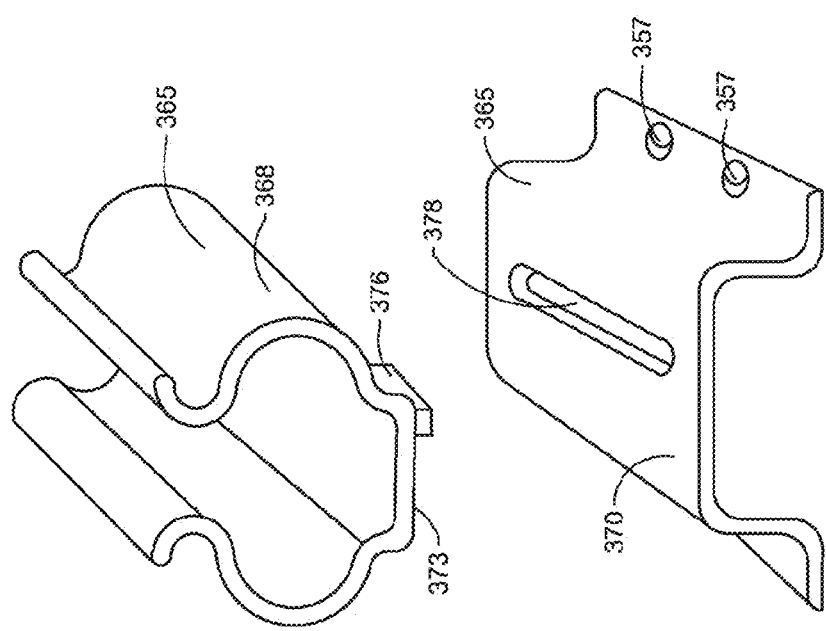
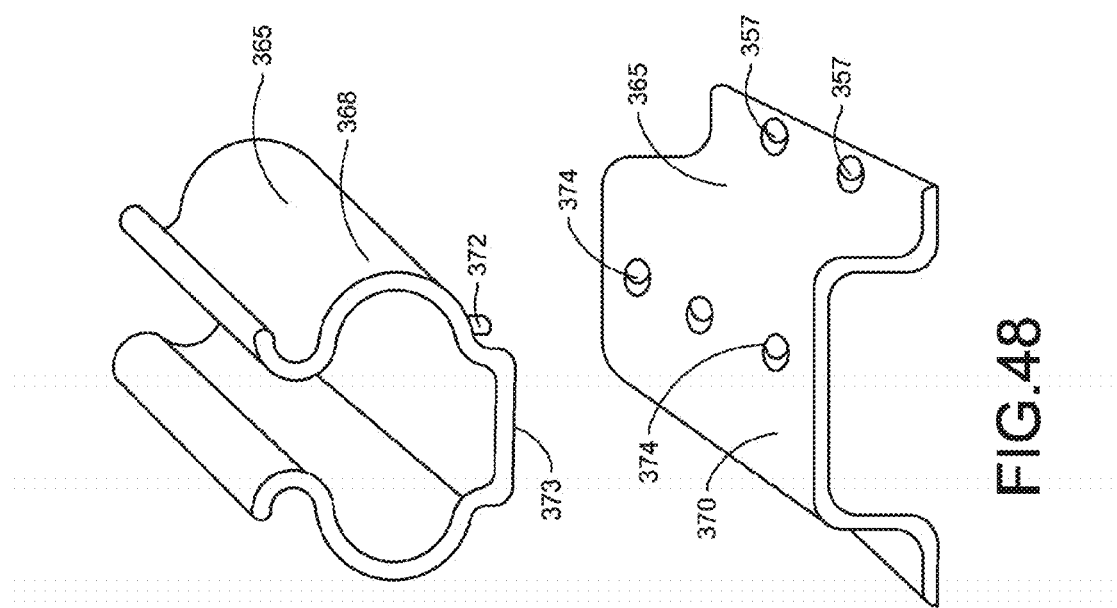
FIG.49
FIG.48

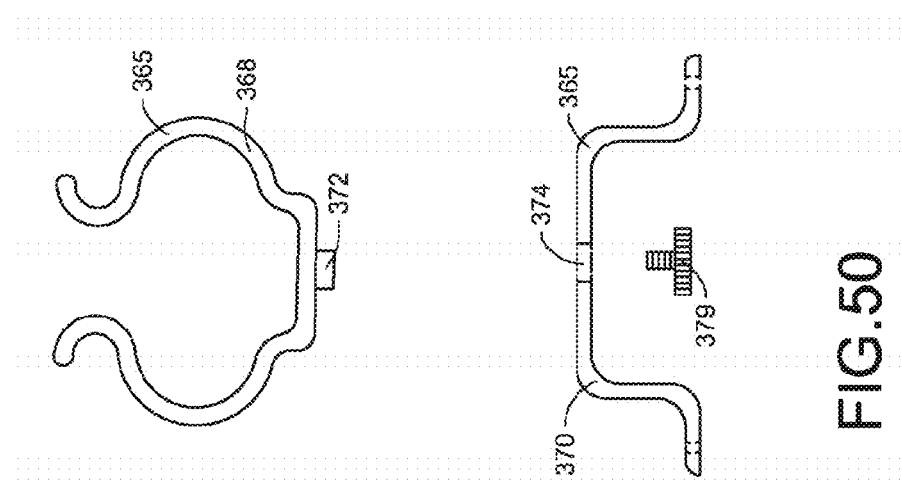

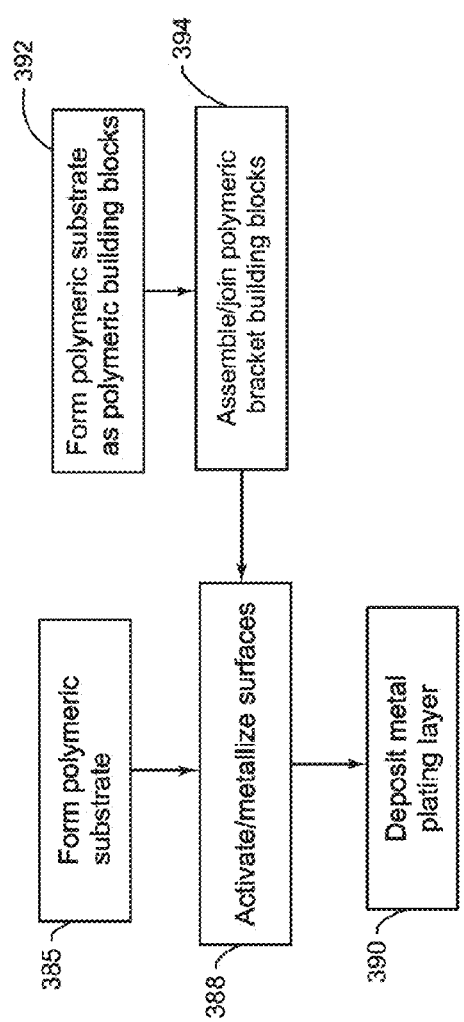

PLATED TUBULAR LATTICE STRUCTURE

CROSS-REFERENCE TO RELATED APPLICATIONS

This application claims priority under 35 U.S.C. §119(e) to U.S. Provisional Patent Application Ser. No. 61/844,161 filed on Jul. 9, 2013.

FIELD OF DISCLOSURE

The present disclosure generally relates to components formed from lightweight and high-strength plated polymers for various applications such as, but not limited to, construction and building material applications. More specifically, the present disclosure relates to the use of plated polymers for the construction of various articles such as, but not limited to, plated tubular lattice structures, cables, containers and packing materials, pipes, fasteners, and brackets.

BACKGROUND

Many engineers continue to seek high-strength and lightweight parts for various industrial applications such as, but not limited to, construction, building, and aerospace/automotive applications. Lightweight components may be desirable, for example, in some applications to provide favorable reductions in shipping costs or installation and repair costs. In addition, higher-strength components may exhibit enhanced performance characteristics such as stiffness, improved load capability, improved environmental durability, erosion resistance, and impact resistance. Polymeric materials may be attractive materials for component fabrication in a number of industries because they are lightweight and moldable into a range of complex shapes by conventional processes. However, parts formed from polymeric materials may be limited to relatively few structurally loaded applications as they are less structurally capable than metallic components of similar geometry. In contrast, parts formed from metallic materials are strong and less prone to structural failure compared to similarly-dimensioned polymeric parts, but they may be too heavy for some weight-sensitive applications. Consequently, there is a need for parts having both lightweight and high-strength properties for a range of applications.

IsoTruss® structures are ultra-lightweight and high-strength composite structures of resin and continuous fibers with potential for use in numerous applications such as bicycle frames, freeway pillars, telephone poles, and aircraft construction. IsoTruss® structures are cage-like lattice structures which consist of a plurality of aligned and straight axial posts connected by a series of pyramidal structures extending in the lateral direction. When viewed in cross-section, the IsoTruss® structure has a symmetrical star-shape with the axial posts intersecting with triangles at "nodes". It may take on various configurations which may vary in the number of posts, interconnecting pyramids, and nodes. Current manufacturing methods for IsoTruss® structures involve winding selected continuous fibers over a metallic mandrel and then carefully removing the metallic mandrel. Remarkably, the IsoTruss® structure exhibits the highest, or at least one of the highest, specific strengths (i.e., strength per unit weight) along its axial direction of currently known materials and structures surpassing steel at only a fraction (about 9%) of the weight. Although remarkable at absorbing loads in the axial direction, the Isotruss® structure may be weaker in the lateral direction. To extend the use of IsoTruss® for applications where high-strength in the lateral direction is necessary, systems are needed to improve the lateral strength of such structures.

SUMMARY OF THE DISCLOSURE

In accordance with one aspect of the present disclosure, a plated tubular lattice structure is disclosed. The plated tubular lattice structure may comprise a plurality of axial posts aligned in parallel, and a plurality of pyramidal structures extending laterally from the axial posts and connecting the axial posts at nodes. The plated tubular lattice structure may further comprise a backbone structure formed in a shape of the plated tubular lattice structure, and a metal plating layer on an outer surface of the backbone structure.

In another refinement, the backbone structure may be formed from a composite of continuous fibers in a resin.

In another refinement, the continuous fibers may be selected from the group consisting of carbon fibers, fiberglass, and aramid fibers.

In another refinement, the backbone structure may be formed from a polymeric material.

In another refinement, the polymeric material may include a hollow center.

In another refinement, the polymeric material may be a thermoplastic material selected from the group consisting of polyetherimide, thermoplastic polyimide, polyether ether ketone, polyether ketone ketone, polysulfone, polyamide, polyphenylene sulfide, polyester, polyimide, and combinations thereof.

In another refinement, the polymeric material may be a thermoset material selected from the group consisting of a condensation polyimide, an addition polyimide, an epoxy cured with an aliphatic amine, an epoxy cured with an aromatic amine, an epoxy cured with an anhydride, a cyanate ester, a phenolic, a polyester, a polybenzoxazine, a polyurethane, a polyacrylate, a polymethacrylate, a thermoset silicone, and combinations thereof.

In another refinement, the backbone structure may comprise a polymer substrate molded around a composite of continuous fibers in a resin.

In accordance with another aspect of the present disclosure, a plated tubular lattice structure is disclosed. The plated tubular lattice structure may include a plurality of axial posts aligned in parallel, and a plurality of pyramidal structures extending laterally from the axial posts and connecting the axial posts at nodes. The plated tubular lattice structure may be fabricated by a method comprising: 1) forming a backbone structure in a shape of the plated tubular lattice structure, 2) activating and metallizing an outer surface of the backbone structure, and 3) depositing a metal plating layer on the activated/metallized outer surface of the backbone structure to provide the plated tubular lattice structure.

In another refinement, the method may further comprise coating an outer surface of the plated tubular lattice structure with a polymer.

In another refinement, the metal plating layer may include a platable metallic material selected from the group consisting of nickel, cobalt, copper, iron, gold, silver, palladium, rhodium, chromium, zinc, tin, cadmium, an alloy of any of the foregoing comprising at least 50 wt. % of the alloy, and combinations thereof.

In another refinement, the metal plating layer may have an average thickness in a range of about 0.05 mm to about 3.8 mm.

In another refinement, forming the backbone structure in the shape of the plated tubular lattice structure may comprise molding the backbone structure from a polymeric material.

In another refinement, molding the backbone structure from the polymeric material may be carried out by injection molding.

In another refinement, forming the backbone structure in the shape of the plated tubular lattice structure may comprise forming the backbone structure from a composite of continuous fibers in a resin.

In another refinement, forming the backbone structure from continuous fibers in a resin may comprise winding tows of the continuous fibers in the resin over a mandrel followed by removing the mandrel.

In another refinement, the method may further comprise molding a polymer substrate around the backbone structure.

In another aspect of the present disclosure, a method for fabricating a plated tubular lattice structure is disclosed. The method may comprise forming a backbone structure having a plurality of axial posts aligned in parallel and a plurality of pyramidal structures extending laterally from the axial posts and connecting the axial posts at nodes. The method may further comprise activating and metallizing an outer surface of the backbone structure, and depositing a metal plating layer on the activated/metallized outer surface of the backbone structure to provide the plated tubular lattice structure.

In another refinement, forming the backbone structure may comprise molding the backbone structure from a polymeric material.

In another refinement, forming the backbone structure may comprise forming the backbone structure form a composite of continuous fibers in a resin.

These and other aspects and features of the present disclosure will be more readily understood when read in conjunction with the accompanying drawings.

BRIEF DESCRIPTION OF THE DRAWINGS

FIG. 1 is a side view of a signal-conductor cable constructed in accordance with the present disclosure.

FIG. 2 is a cross-sectional view of the signal-conductor cable of FIG. 1 taken along the line 2-2 of FIG. 1, constructed in accordance with the present disclosure.

FIG. 6 is a perspective view of another hybrid conductive tubing, constructed in accordance with the present disclosure.

FIG. 7 is a cross-sectional view of the hybrid conductive tubing of FIG. 6 taken along the line 7-7 of FIG. 6, illustrating metal plating wires on the outer surface of the support tubing and the polymer layer, constructed in accordance with the present disclosure.

FIG. 8 is a cross-sectional view of a hybrid conductive tubing similar to FIG. 7, but having a mixture of metal plating layers and metal plating wires on the surface of the support tubing and the polymer layer, constructed in accordance with the present disclosure.

FIG. 9 is a perspective view of another hybrid conductive tubing having a metal plating wire wrapped around the outer surface of the support tubing in a spiral configuration, constructed in accordance with the present disclosure.

FIG. 10 is a perspective view of the hybrid conductive tubing of FIG. 9, but having a surrounding polymer layer and a metal plating wire wrapped around the polymer layer in a spiral configuration, constructed in accordance with the present disclosure.

FIG. 13 is a perspective view, illustrating electrical signal collection from metal plating wires of the hybrid conductive tubing with an integrated connector, constructed in accordance with the present disclosure.

FIG. 14 is a perspective view, illustrating electrical signal collection from metal plating wires of the hybrid conductive tubing by gathering and soldering the metal plating wires, constructed in accordance with the present disclosure.

FIG. 23 is a perspective view of a plated polymeric pipe, constructed in accordance with the present disclosure.

FIG. 24 is a cross-sectional view of the plated polymeric pipe of FIG. 23 taken along the line 24-24 of FIG. 23, constructed in accordance with the present disclosure.

FIG. 25 is a cross-sectional view similar to FIG. 24, but having a metal plating layer on an external surface of a polymer substrate.

FIG. 26 is a cross-sectional view similar to FIG. 25, but having a metal plating layer on an internal surface of the polymer substrate.

FIG. 33 is a front view of a metal-encapsulated polymeric article, constructed in accordance with the present disclosure.

FIG. 34 is a cross-sectional view of the metal-encapsulated polymeric article of FIG. 33 taken along the line 34-34 of FIG. 33, constructed in accordance with the present disclosure.

FIG. 36 is a perspective view of a plated polymeric component having a plated fastener hole constructed in accordance with the present disclosure.

FIG. 37 is a cross-sectional view of the plated polymeric component of FIG. 36 taken along the line 37-37 of FIG. 36, illustrating the plated fastener hole as a simple through-hole, constructed in accordance with the present disclosure.

FIG. 40 is a cross-sectional view similar to FIG. 37, but with the walls of the fastener hole being curved to provide a straight metal plating layer.

FIG. 41 is a cross-sectional view similar to FIG. 40, but with the walls of the fastener hole being curved to provide a metal plating layer of uniform thickness.

FIG. 46 is front view of a plated polymeric bracket, constructed in accordance with the present disclosure.

FIG. 47 is a cross-sectional view of the plated polymeric bracket of FIG. 46 taken along the line 47-47 of FIG. 46, constructed in accordance with the present disclosure.

FIG. 48 is a perspective view of polymeric building blocks for a plated polymeric bracket, including a polymeric clamp portion and a polymeric base portion, constructed in accordance with the present disclosure.

FIG. 49 is a perspective view, similar to FIG. 48, but with the polymeric clamp portion and the polymeric base portion being connectable by a slotted connection, constructed in accordance with the present disclosure.

FIG. 50 is a front view, similar to FIG. 48, but with the polymeric clamp portion and the polymeric base portion being connectable by a threaded fastener, constructed in accordance with the present disclosure.

FIG. 51 is a flowchart illustrating methods for fabricating the plated polymeric bracket as a single unit or by assembling polymeric building blocks, in accordance with a method of the present disclosure.

Figure 3:
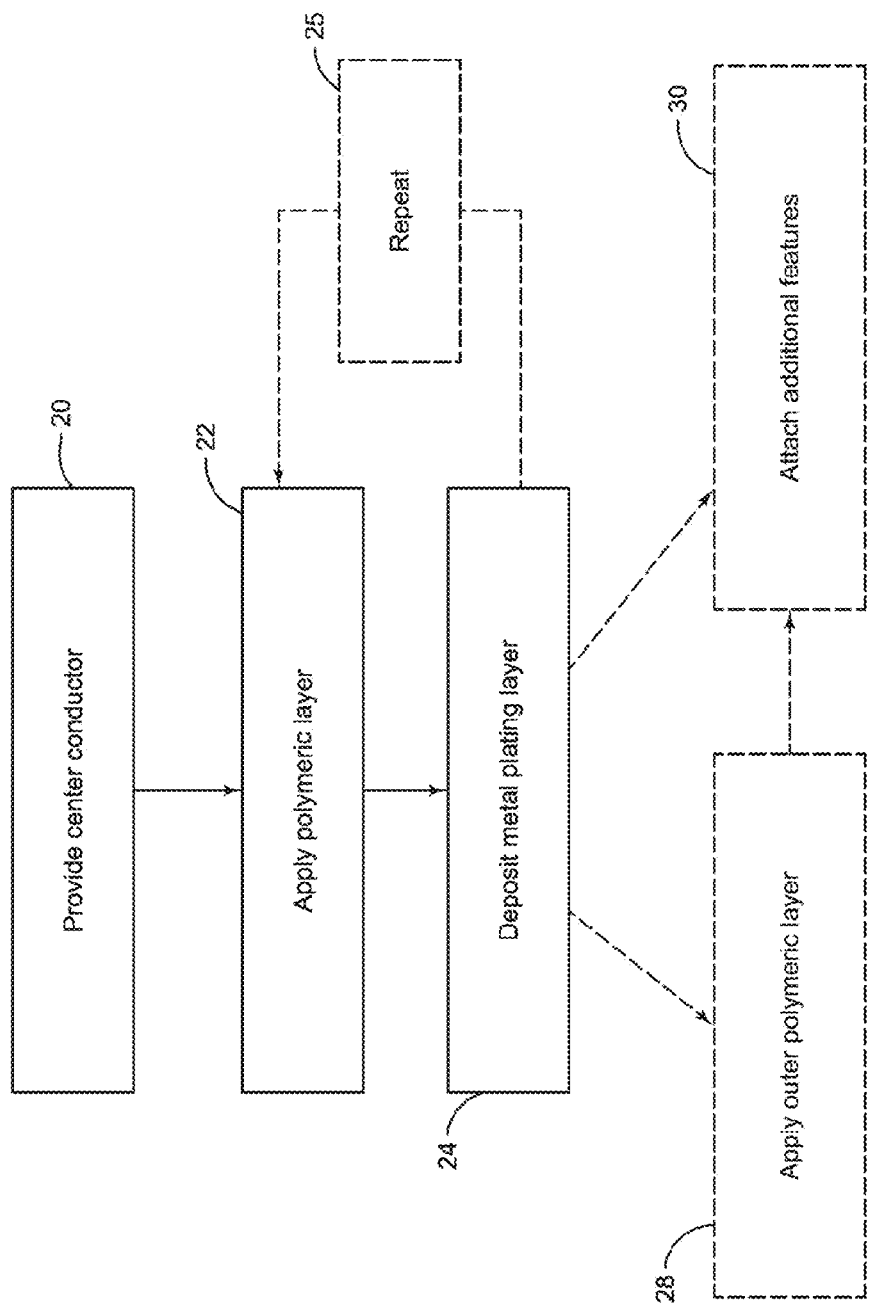
FIG. 3 is a flow chart illustrating a method for fabricating the signal-conductor cable, in accordance with a method of the present disclosure.

It should be understood that the drawings are not necessarily drawn to scale and that the disclosed embodiments are sometimes illustrated diagrammatically and in partial views. In certain instances, details which are not necessary for an understanding of this disclosure or which render other details difficult to perceive may have been omitted. It should be understood, of course, that this disclosure is not limited to the particular embodiments disclosed herein.

DETAILED DESCRIPTION

Lightweight Conductor

Electrical cables are involved in transmitting electrical signals between locations to provide power or electrical communication for various applications such as automotive and aerospace applications. The traditional construction of an electrical cable consists of a signal-conducting central core surrounded by a heavy shielding of a conductive material. The central conductor may consist of copper or aluminum and the shielding may consist of copper or a conductive polymer. The shielding layer may shield the central conductor from external electromagnetic noise and may also be involved in signal transmission. Between the central conductor and the shielding layer may be an insulating layer which may insulate the central conductor and the shielding, while also providing mechanical protection to these conductive layers. However, as masses of cables may be bundled and draped around structures in some applications, the heavy shielding employed in standard cable designs may introduce substantial weight burdens in weight-sensitive applications such as aerospace and automotive applications. At least from the standpoint of fuel efficiency and cost savings, lighter-weight and more flexible designs for electrical cables are clearly needed.

Referring now to FIGS. 1 and 2, a signal-conductor cable 10 in accordance with the present disclosure is depicted. The signal conductor cable 10 may be involved in electrical-signal transmission and/or other communication for various applications such as, but not limited to, aerospace and automotive applications. By virtue of its material construction, it may be substantially lighter than traditional electrical cables and may provide advantageous improvements in fuel efficiency (for aerospace, automotive, and other transportation applications) as well as cost reductions. In addition, the cable 10 may exhibit enhanced flexibility over traditional electrical cable constructions.

As best shown in FIG. 2, the electrical cable 10 may consist of a central conductor 12 at its core surrounded by one or more lightweight plated polymer layers 14. The central conductor 12 may consist of one or more electrical cables (e.g., copper cables or other conductive cables) and/or one or more fiber optic cables. The fiber optic may optionally be plated with a metallic material. Each plated polymeric layer 14 may consist of a polymeric layer 16 plated on its outer surface with one or more metal plating layers 18. The polymeric layers 16 may insulate and provide separation between the conductive layers (i.e., the central conductor 12 and the metal plating layers 18), as well as electrically shield the conductive layers from external electromagnetic noise, such as radio signals. They may also provide mechanical protection to the conductive layers. The metal plating layers 18 may each be involved in electrical signal transmission. Alternatively, one of the outer layers may be non-conductive and may act to shield other conductive layers (i.e., the central conductor and the metal plating layers) from interference from external electromagnetic noise, such as radio signals. As can be appreciated, numerous other alternative arrangements such as, for example, external polymeric (non-conductive) layers, an external jacket around the cable 10, multiple polymeric layers, etc., are also within the scope of this application.

The metal plating layers 18 may be formed from highly conductive metals such as, but not limited to, silver, copper, and gold, and each metal plating layer 18 in the cable 10 may have the same composition or different compositions. Due to the high conductivity of the metal plating layers 18, they may be made thin enough to maintain sufficient flexibility in the cable 10, allowing it to bend while still transmitting a signal. The thicknesses of the metal plating layers 18 may be engineered to provide a desired level of flexibility in the cable 10. Suitable thicknesses for the metal plating layers 18 may be less than about 0.001 inches (about 0.025 mm). However, the metal plating layers 18 may also have thicknesses greater than this range when stiffer cables with greater mechanical strength and less flexibility are desired. In addition, the outermost metal plating layer 18 may have a thickness greater than this range to provide resistance against erosion and/or the option to customize the surface finish of the cable 10 by polishing, machining, or other finishing processes.

The polymeric layers 16 may be formed from a thermoplastic material or a thermoset material. Suitable thermoplastic materials may include, but are not limited to, polyetherimide (PEI), thermoplastic polyimide, polyether ether ketone (PEEK), polyether ketone ketone (PEKK), polysulfone, polyamide, polyphenylene sulfide, polyester, polyimide, or combinations thereof. Suitable thermoset materials may include, but are not limited to, condensation polyimides, addition polyimides, epoxy cured with aliphatic and/or aromatic amines and/or anhydrides, cyanate esters, phenolics, polyesters, polybenzoxazine, polyurethanes, polyacrylates, polymethacrylates, silicones (thermoset), and combinations thereof. If desired, the thermoplastic or thermoset materials forming the polymeric layers 16 may be optionally reinforced with reinforcing materials such as carbon or glass. Each of the polymeric layers 16 in the electrical cable 10 may have the same or different compositions.

A method of fabricating the cable 10 in accordance with the present disclosure is shown in FIG. 3. According to a first block 20, the center conductor 12 may be provided. A polymeric layer 16 consisting of selected thermoplastic or thermoset materials (with optional fiber reinforcement) may then be applied to the outer surfaces of the center conductor 12 according to a next block 22, as shown. The polymeric layer 16 may be applied as a coating with a desired thickness using conventional processes apparent to those skilled in the art such as, but not limited to, spray coating, plasma spray coating, dip coating, or by dipping the center conductor 12 in a fluidized bed of the selected polymeric materials. Subsequent to the block 22, one or more metal plating layers 18 may be deposited on the surface of the polymer layer 16 according to a block 24. Deposition of the metal plating layer(s) 18 may be achieved using any metal deposition method apparent to those skilled in the art (e.g., electrolytic plating, electroless plating, electroforming, thermal spray coating, or physical vapor deposition), after having suitably activated and metallized the outer surfaces of the polymeric layer 16 by processes well-known in the industry. Upon completion of the block 24, a plated polymeric layer 14 may surround the center conductor 12. To apply additional plated polymer layers 14, the blocks 22 and 24 may be optionally repeated as necessary, according to a block 25.

As an optional step, an outer polymeric layer 16 may be coated on the outer surface of a previously deposited metal plating layer 18 to provide non-conductive outer coating on the cable 10, according to an optional block 28. The outer polymeric layer 16 may be coated on the outer surfaces of the previously deposited metal plating layer 18 at a desired thickness using conventional polymeric coating methods such as spray coating or dip coating. An outer polymeric layer 16 may be desired, for example, in situations requiring protection of the cable 10 from abrasion or certain fluids, whereas an outer metal plating layer 18 may be desired, for example, in situations requiring protection of the cable 10 from erosion. In addition, an outer metal plating layer 18 on the cable 10 may provide the option to later customize the surface finish of the electrical cable 10. As another optional step, additional features (e.g., end connectors, etc.) may be attached to the electrical cable following the block 24 (or the block 28) according to an optional block 30, as shown.

From the foregoing, it can therefore be seen that the present disclosure can find industrial applicability in many situations such as, but not limited to, weight-critical applications. The electrical cable design as disclosed herein utilizes one or more plated polymeric layers to provide electromagnetic shielding and insulation for a central conductor. In addition, the metal plating layers in the plated polymeric layers may replace heavier shielding layers typically used for electrical cable construction. Furthermore, the thicknesses of the metal plating layers in the plated polymeric layers may be engineered to provide desired levels of cable flexibility, cable strength, resistance against erosion, or other desired properties. The technology as disclosed herein offers an approach to produce lightweight and flexible electrical and/or communication cables and may find wide industrial applicability in a wide range of areas such as aerospace industries, automotive industries, and other industries which may benefit from lightweight and flexible cable constructions.

Hybrid Conductive Electrical Tubing

Current aircraft and automotive engine designs, as well as many other systems, use bundles of electrical cables and tubing wrapped around and anchored to various engine structures for support. The electrical cables may be responsible for providing power or electrical communications for a range of applications, while the tubing may be involved in transporting fluids such as fuel, oil, or gas to various locations. These masses of electrical cables and tubing may be heavy and may add weight to weight-sensitive systems such as aircraft and automotive systems. Furthermore, the bundles of electrical cables and tubing required for proper system operations may give some engines a cluttered appearance and may also be prone to handling damage. Clearly, from a fuel efficiency and safety standpoint, there is a need for lighter-weight and more durable electrical cable and fluid tubing constructions which offer the ability to save space and reduce clutter.

Figure 4:
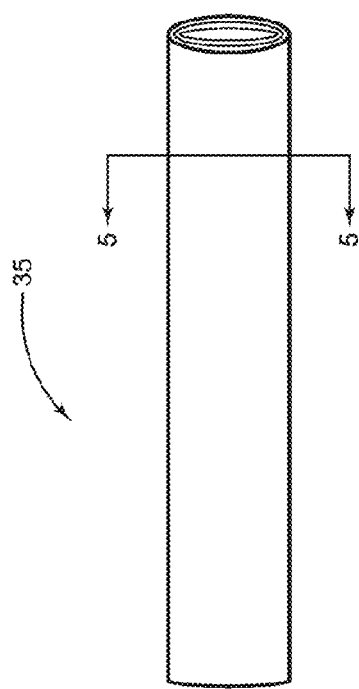
FIG. 4 is a perspective view of hybrid conductive tubing, constructed in accordance with the present disclosure.
Figure 5:
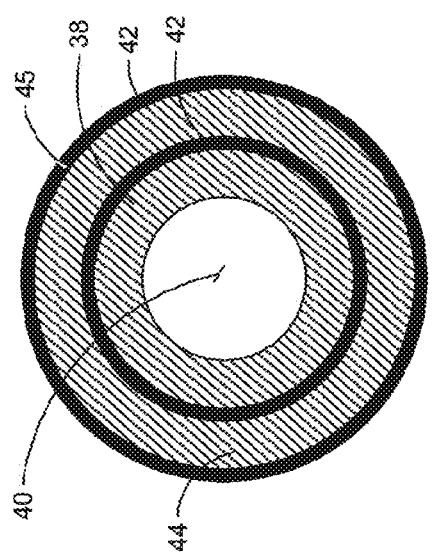
FIG. 5 is a cross-sectional view of the hybrid conductive tubing of FIG. 4 taken along the line 5-5 of FIG. 4, illustrating metal plating layers on the outer surface of a support tubing and a polymer layer, constructed in accordance with the present disclosure.

Referring now to FIGS. 4 and 5, a hybrid conductive tubing 35 is shown. The hybrid conductive tubing 35 may consolidate the functions of electrical cables and fluid tubing, as it may be capable of both transmitting electrical signals and transferring fluids such as liquids (fuel, oil, gas, etc.). Accordingly, the hybrid conductive tubing 35 may lead to substantial weight reductions which may increase fuel efficiency in some applications (e.g., aircraft and automotive applications), while reducing clutter and increasing the ease of some maintenance operations. In addition, the high-strength material construction of the hybrid conductive tubing 35 (see details below) may lead to reductions in handling damage. It may be used in various applications such as aircraft and automotive engine construction, or any other application requiring both fluid-transfer tubing and electrical cables.

As shown in FIG. 5, the hybrid conductive tubing 35 may have a support tubing 38 with a central open channel 40 for transferring fluids from one location to another. The support tubing 38 may be flexible but strong enough to support the fluid being transferred therethrough. It may be formed from one or more polymeric materials with optional reinforcement using materials such as, but not limited to, carbon or glass. The polymeric materials of the support tubing may consist of a thermoplastic material or a thermoset material (see further details below). In cases where the fluid being transferred reacts with the polymeric materials of the support tubing 38 (e.g., fluids containing caustic materials, etc.), an inner tubing formed from a material which is stable towards the fluid may be inserted or formed in the support tubing 38 to prevent contact between the support tubing 38 and the fluid. Alternatively, depending upon the fluid being transferred, the support tubing 38 may be formed from an extruded metal tube.

On the surface of the support tubing 38 may be one or more metal plating layers 42 which may be conductive and involved in transmitting electrical signals. Surrounding the metal plating layer(s) 42 on the support tubing 38 may be one or more polymeric layers 44 having one or more metal plating layers 42 on their outer surfaces, as shown in FIG. 5. The polymeric layer(s) 44 may insulate the metal plating layers 42 from each other and it may be formed from a thermoplastic material or a thermoset material, either of which may be optionally reinforced with suitable materials (e.g., carbon, glass, carbon fibers, or glass fibers). Notably, the materials forming the support tubing 38 and the polymeric layer(s) 44 may be selected according to specific requirements which may depend on the application (e.g., high-strength polymeric material with fiber reinforcement for the support tubing 38, etc.).

The metal plating layers 42 may be formed from one or more highly conductive metals such as copper, gold, or silver, and they may be thin enough to maintain sufficient flexibility in the hybrid conductive tubing 35. In some applications, the outermost metal plating layer 45 may be conductive and involved in electrical signal transmission. In other applications where electromagnetic interference (e.g., radio-frequency signals) is a concern, the outermost metal plating layer 45 may be either conductive or non-conductive and may act to shield the conductive metal plating layers 42 in the hybrid conductive tubing 35 from the external electromagnetic interference. If the outer metal plating layer 45 is conductive, it may be covered by a polymeric coating or other insulating layer for protection.

An alternative hybrid conductive tubing 50 is shown in FIGS. 6 and 7. The hybrid conductive tubing 50 may share many of the features of the hybrid conductive tubing 35, with the exception that metal plating wires 52 rather than metal plating layers 42 may be involved in electrical signal transmission. As best shown in FIG. 7, the hybrid conductive tubing 50 may have a support tubing 38 with one or more metal plating wires 52 deposited or placed on its outer surface. The support tubing 38 may have a central open channel 40 for transferring fluids, and the metal plating wires 52 may be conductive and involved in electrical signal transmission. As described above, an inner tubing may optionally be inserted or formed in the support tubing 38 if the polymeric material of the support tubing 38 is not compatible with the fluids being transferred. Furthermore, one or more additional polymeric layers 44 with one or more metal plating wires 52 on their outer surfaces may surround the support tubing 38, as shown. The metal plating wires 52 may extend along the length of the hybrid conductive tubing 50 in straight or curved lines, as best shown in FIG. 6. Furthermore, the polymeric material of the polymeric layers 44 and the support tubing 38 may insulate the conductive metal plating wires 52 from each other.

The metal plating wires 52 in the hybrid conductive tubing 50 may be formed from one or more highly conductive metals such as, but not limited to, copper, gold, or silver, and each metal plating wire 52 may have the same or different composition. In addition, the number, thickness, and spacing of the metal plating wires 52 on the surfaces of the support tubing 38 and the polymeric layers 44 may, of course, vary depending on the application. Deposition of the metal plating wires 52 with a desired thickness and spacing on the outer surfaces of the support tubing 38 and the polymeric layer(s) 44 may be achieved using conventional metal deposition processes (e.g., electroplating, electroless plating, electroforming, physical vapor deposition, etc.) combined with masking techniques to block selected surfaces of the support tubing 38 from being plated with metal. In some embodiments, the metal plating wires 52 on the outer surface of the hybrid conductive tubing 50 may not be conductive and may shield metal plating wires 52 inside of the hybrid conductive tubing 50 from external electromagnetic interference. In other embodiments, the metal plating wires 52 on the outer surface of the hybrid conductive tubing 50 may be conductive and may be covered by a polymer coating or other insulating layer (e.g., a layer of varnish, etc.) for protection.

As shown in FIG. 8, a hybrid conductive tubing 55 may combine the features of the hybrid conductive tubing 35 and the hybrid conductive tubing 50. More specifically, it may have one or more metal plating layers 42 deposited on the outer surfaces of the support tubing 38 and/or on the outer surfaces of one or more polymeric layers 44 in combination with metal plating wires 52 deposited on the support tubing 38 and/or on one or more polymeric layers 44. In this regard, it is noted that the hybrid conductive tubing 55 shown in FIG. 8 is exemplary, and various alternative configurations are also possible (e.g., metal plating wires on the surface of the support tubing, metal plating layers on the polymeric layers, additional polymeric layers with metal plating layers or metal plating wires deposited on their outer surfaces, etc.).

As yet another alternative arrangement, a hybrid conductive tubing 58 may have one or more metal plating wires 52 wrapped around the outer surface of the support tubing 38 in a spiral configuration, as shown in FIG. 9. Like the hybrid conductive tubing configurations described above, the hybrid conductive tubing 58 may have a central open channel 40 for transferring fluids and the metal plating wire(s) 52 may be conductive and involved in electrical-signal transmission. The thickness of the metal plating wire(s) 52 may vary and the spiral configuration may be formed using known surface masking techniques during deposition of the metal plating wires (see further details below). Notably, the spiral configuration of the metal plating wires 52 may structurally reinforce the support tubing 38, thereby allowing the support tubing 38 to be formed thinner and lighter in weight.

A polymeric layer 44 may surround the outer surface of the support tubing 38 of the hybrid conductive tubing 58 and it may have one or more metal plating wires 52 deposited on its outer surface in a spiral configuration, as shown in FIG. 10. As shown, the spiral configuration of the metal plating wire(s) 52 on the surface of the polymer layer 44 may have a handedness that is opposite to the handedness of the spiral metal plating wire(s) 52 on the surface of the support tubing 38. This arrangement may add further strength to the hybrid conductive tubing 58, allowing the polymeric layer 44 and/or the support tubing 38 to be formed even thinner to reduce the overall weight of the hybrid conductive tubing 58. As can be appreciated, additional polymeric layers 44 plated with one or more spiral metal plating wire(s) 52 on their outer surfaces may also be formed around the first polymeric layer, if desired. In this regard, the handedness of the spiral metal plating wire(s) 52 may alternate on each polymeric layer 44 to further structurally reinforce the hybrid conductive tubing 58.

Figure 11:
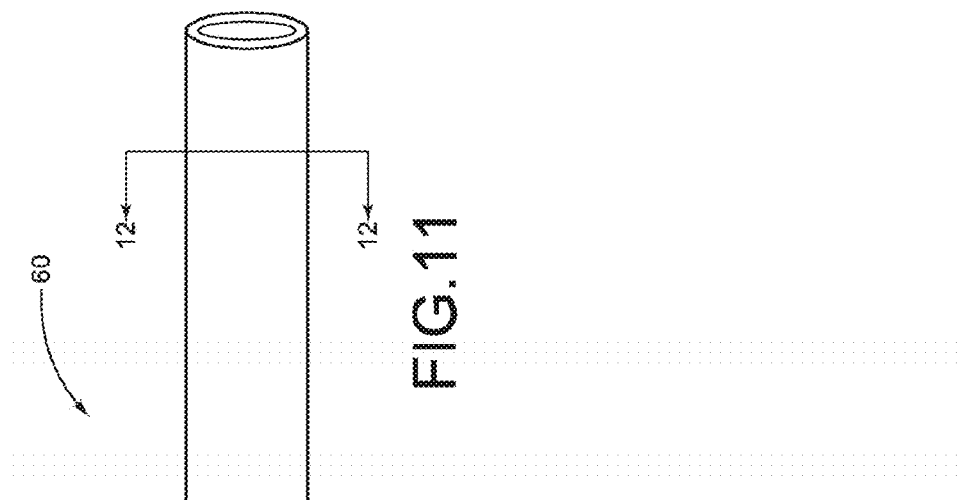
FIG. 11 is a perspective view of a hybrid conductive tubing, constructed in accordance with the present disclosure.
Figure 12:
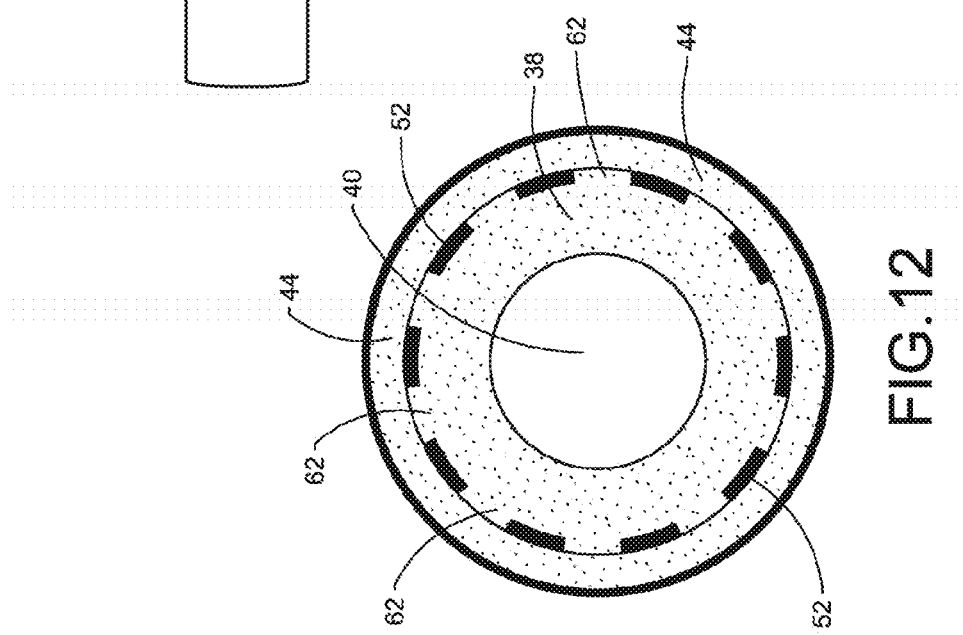
FIG. 12 is a cross-sectional view of the hybrid conductive tubing of FIG. 11 taken along the line 12-12 of FIG. 11, illustrating metal plating wires deposited in channels formed on the outer surface of the support tubing, constructed in accordance with the present disclosure.

A hybrid conductive tubing 60 having one or more metal plating wires 52 deposited in channels formed on the surface of the support tubing 38 is depicted in FIGS. 11 and 12. The hybrid conductive tubing 60 may have many features in common with the hybrid conductive tubing arrangements described above. For example, it may have a central open channel 40 configured to carry fluids and the metal plating wires 52 may be conductive and involved in electrical-signal transmission. However, as a unique feature, the support tubing 38 of the hybrid conductive tubing 60 may have gear-like teeth 62 on its outer surface which may extend along the length of the hybrid conductive tubing 60, forming straight or curved channels therebetween. The metal plating wires 52 deposited in these channels may therefore also extend along the length of the hybrid conductive tubing 60, with the gear-like teeth 62 serving to insulate the metal plating wires 52 from each other. As can be appreciated, the number, spacing, and thickness of the metal plating wires 52 in the hybrid conductive tubing 60 may vary depending on the application.

One or more polymeric layers 44 may also surround the support tubing 38 of the hybrid conductive tubing 60, offering further electrical insulation, as shown in FIG. 12. Optionally, these polymeric layers 44 may also have gear-like teeth formed on their outer surfaces to allow the deposition of metal plating wires 52 therebetween to provide multiple conductive layers. In this regard, it is noted that if the outer layer of the hybrid conductive tubing 60 has exposed conductive metal plating wires 52, the wires may be covered by a polymeric coating or another insulating layer. If, however, the metal plating wires 52 on the surface of the hybrid conductive tubing 60 are shielding and either conductive or non-conductive, they may remain exposed.

Based on the above description, those skilled in the art will understand that various combinations of the above-described hybrid conductive tubing arrangements also fall within the scope of this disclosure. For example, mixtures of metal plating layers 42, metal plating wires 52 in various configurations (e.g., straight, curved, or spiral), and/or metal plating wires 52 formed in the gaps between gear-like teeth on the surface of the support tubing 38 and/or polymeric layers 44 may exist in different orders in the hybrid conductive tubing. Furthermore, in any of the above-described hybrid conductive tubing arrangements or combinations thereof in which the metal platings layers 42 or the metal plating wires 52 are exposed on the outer surface of the hybrid conductive tubing, they may be conductive or non-conductive and shielding. If they are conductive, they may be covered by a polymeric coating or another insulating layer for protection.

Various arrangements may also be employed for collecting the electrical signals carried by the metal plating layers 42 and/or metal plating wires 52 of the hybrid conductive tubings disclosed herein. As shown in FIG. 13, a connector 64 may be molded into the body of the hybrid conductive tubing and the metal plating wires 52 (or metal plating layers 42) may be bonded to the connector 64. The connector 64 may form a junction at which the paths of the conductive metal plating wires 52 (or metal plating layers 42) and the fluid carried by the support tubing 38 diverge. More specifically, the connector 64 may direct the metal plating wires 52 (or metal plating layer 42) to one or more signal-collection stations in a direction 65, whereas the support tubing 38 may carry the fluid in a different direction 67 toward its destination. The connector 64 may be positioned near the ends of the hybrid conductive tubing or at other locations, if necessary.

Another alternative electrical signal collection arrangement is depicted in FIG. 14. In particular, the metal plating wires 52 (or metal plating layers 42) of any of the above-described hybrid conductive tubings may be exposed at selected locations, soldered together, and directed to one or more signal collection stations in a direction 65, as shown. The fluid carried by the support tubing 38 may then continue towards its destination in a direction 67, as shown. As yet another alternative arrangement, a quick-release connector may be included in any one of the above-described hybrid conductive tubings and may direct the support tubing 38 and fluid towards its destination, allowing the metal plating wires 52 or metal plating layers 42 to continue carrying the electrical signal toward one or more signal collection stations through the quick-release connector.

Figure 15:
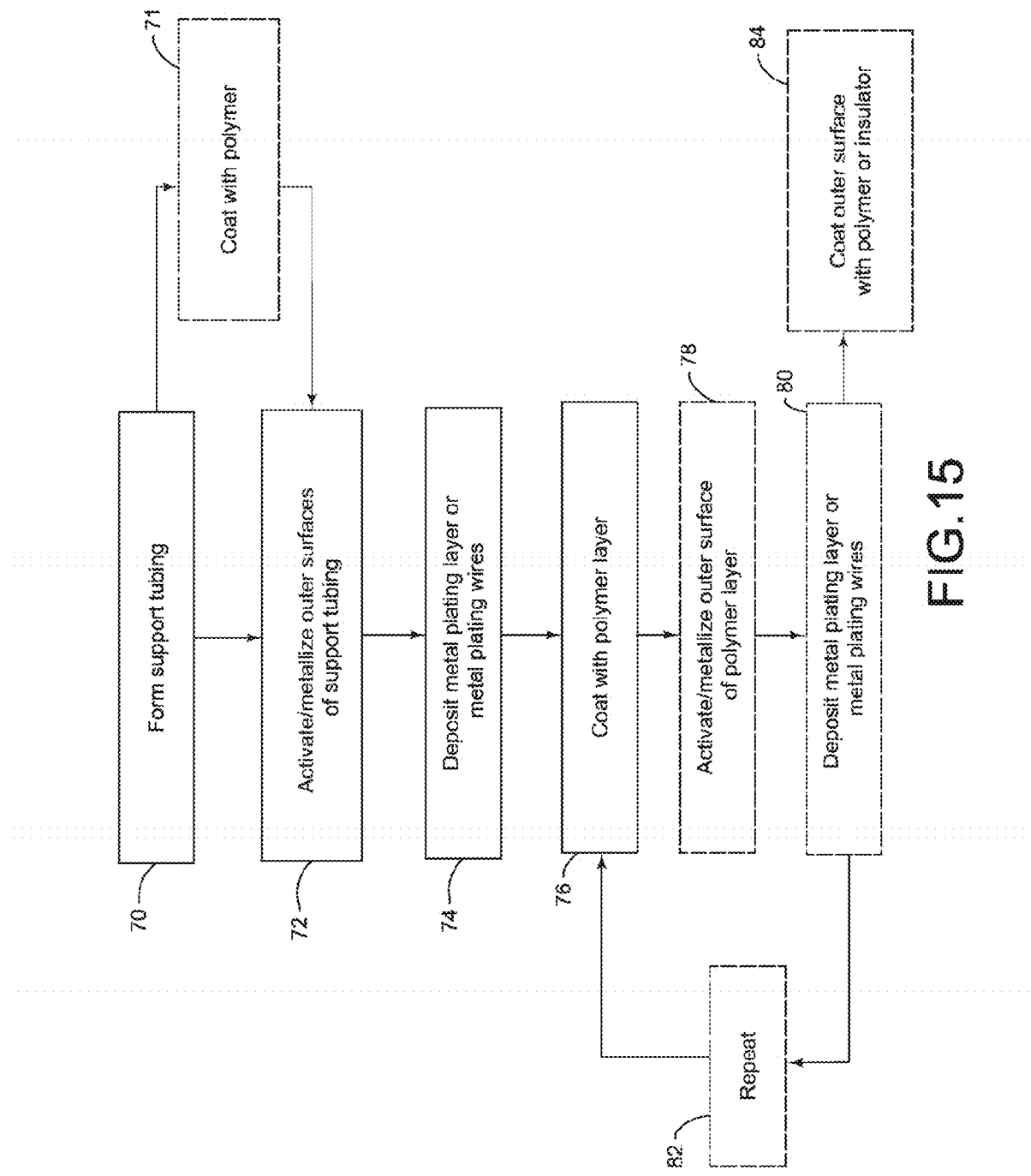
FIG. 15 is a flow chart illustrating a method for fabricating the hybrid conductive tubing, in accordance with a method of the present disclosure.

A method for fabricating the above-described hybrid conductive tubings is shown in FIG. 15. According to a first block 70, the support tubing 38 may be formed from selected thermoplastic materials or thermoset materials with optional reinforcement with carbon or glass. Suitable thermoplastic materials may include, but are not limited to, polyetherimide (PEI), thermoplastic polyimide, polyether ether ketone (PEEK), polyether ketone ketone (PEKK), polysulfone, polyamide, polyphenylene sulfide, polyester, polyimide, and combinations thereof. Suitable thermoset materials may include, but are not limited to, condensation polyimides, addition polyimides, epoxy cured with aliphatic and/or aromatic amines and/or anhydrides, cyanate esters, phenolics, polyesters, polybenzoxazine, polyurethanes, polyacrylates, polymethacrylates, silicones (thermoset), or combinations thereof. The support tubing 38 may be formed from the selected polymeric materials by a range of polymer molding processes apparent to those skilled in the art such as, but not limited to, injection molding or blow molding. Alternatively, the support tubing 38 may be formed from extruded metal. In addition, the support tubing 38 may be formed with smooth outer surfaces or with gear-like teeth 62 or other desired features.

If the support tubing 38 is polymeric, the outer surfaces (and potentially the inner surfaces) of the support tubing 38 which are selected for plating may be suitably activated and metallized using processes well-known in the industry according to a block 72. If the support tubing 38 is formed from metal, its outer surfaces may first be coated with a polymer layer according to a block 71 prior to the block 72, as shown. The polymer layer may be formed from the thermoplastic or thermoset materials described above (with optional fiber reinforcement) and may be applied to the outer surfaces of the support tubing 38 by conventional processes such as spray coating or dip coating.

One or more metal plating layers 42 or one or more metal plating wires 52 may then be deposited on the outer surface of the support tubing 38 according to block 74. As described above, the metal plating layers 42 and the metal plating wires 52 may consist of one or more highly conductive metals such as copper, gold, or silver. Deposition may be carried out using any metal deposition process apparent to those of ordinary skill in the art such as, but not limited to, electrolytic plating, electroless plating, electroforming, spray coating, and plasma vapor deposition. Notably, if metal plating wires 52 are deposited, deposition may be carried out using masking techniques to block certain surfaces of the support tubing 38 from being plated, as will be understood by those skilled in the art. Moreover, the metal plating wires 52 may be formed in straight lines, in curved lines, or in spiral configurations (see, for example, FIG. 6, FIGS. 9-10, and FIG. 12).

According to a next block 76, the outer surfaces of the support tubing 38 may then be coated with a polymeric layer 44. The polymeric layer 44 may be formed from selected thermoplastic materials or thermoset materials described above with optional reinforcement with carbon or glass. It may be applied to the outer surfaces of the support tubing 38 using conventional processes such as, but not limited to, spray coating or dip coating.

At block 76, further alternating arrangements of insulating polymeric layers 44 and conductive layers (e.g., metal plating layers 42 or metal plating wires 52) may be built-up according to optional blocks 78, 80, and 82. More specifically, the polymeric layer 44 may first be suitably activated and metallized on selected outer surfaces (block 78) and one or more metal plating layers 42 or metal plating wires 52 (with masking) may be deposited thereon (block 80), using the surface activation/metallization and metal deposition processes described above. The blocks 76, 78, and 80 may be repeated as desired to build up the desired number of alternating insulating and conductive layers in the hybrid tubing according to the block 82, as shown. If the outer metal plating layer 42 or metal plating wires 52 are conductive, the outer surface of the hybrid conductive tubing may then be coated with a protective polymeric coating or another insulating layer according to an optional block 84, as shown. If, however, the outer metal plating layer 42 or metal plating wires are shielding and non-conductive, they may remain exposed.

From the foregoing, it can therefore be seen that the hybrid conductive tubings as disclosed herein can find industrial applicability in many situations including, but not limited to, aerospace engine and automotive engine construction. The hybrid conductive tubings as disclosed herein are multi-purpose tubings capable of both transporting a fluid (gas or liquid) and transmitting electrical signals. Therefore, in some situations, the technology disclosed herein may eliminate the need for separate fluid-transfer tubings and electrical cables. The disclosed hybrid conductive tubing arrangements have alternating insulating polymeric layers and metal conductive layers. Moreover, the metal conductive layers may be deposited on the surface of the polymeric layers as solid layers or as wires in various configurations which may offer structural support to the tubing. The technology as disclosed herein offers a lightweight, high-strength, and space-saving alternative for fluid-transfer tubings and electrical cables and may find wide industrial applicability in a wide range of areas.

Plated Tubular Lattice Structure

Figure 17:
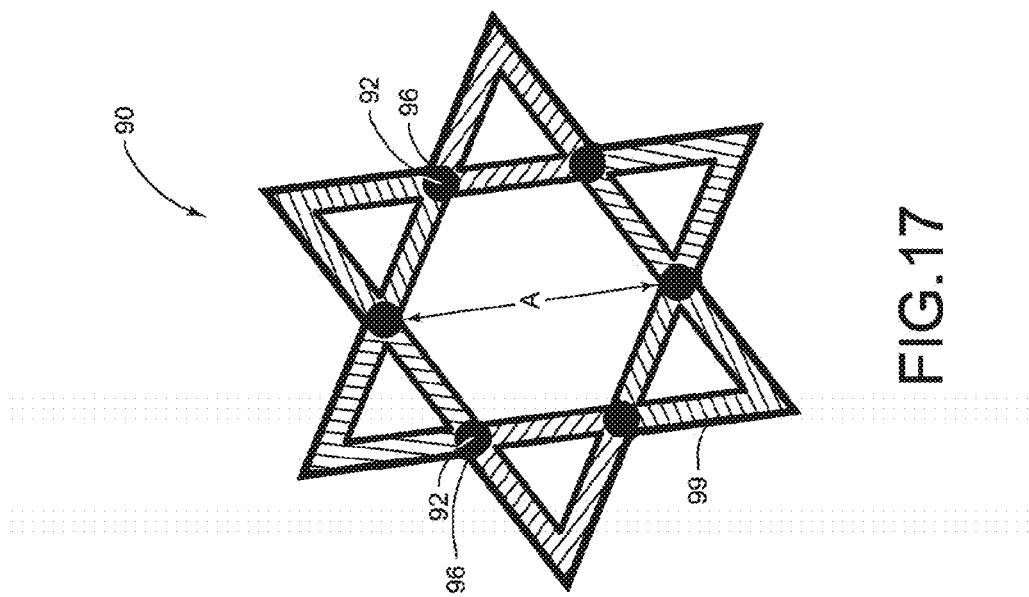
FIG. 17 is a cross-sectional view through the section 17-17 of FIG. 16, constructed in accordance with the present disclosure.
Figure 16:
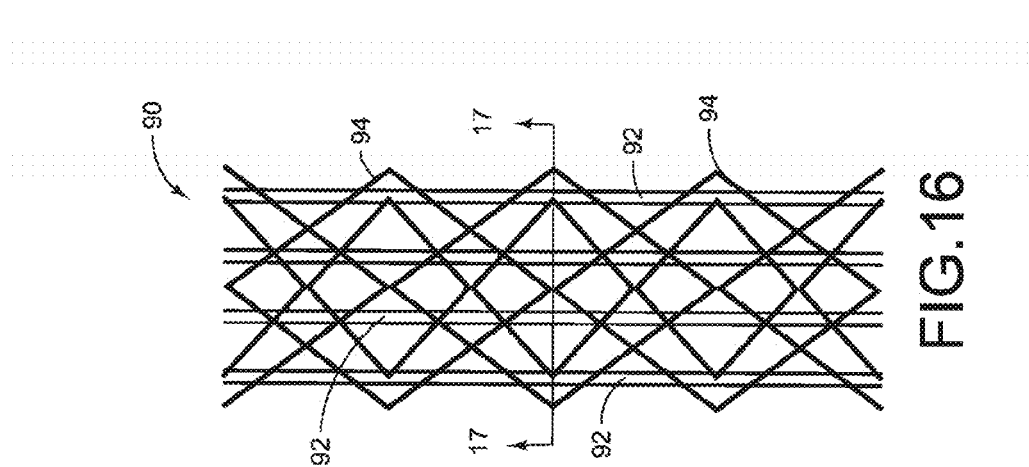
FIG. 16 is a perspective view of a plated tubular lattice structure, constructed in accordance with the present disclosure.

Referring now to FIGS. 16 and 17, a plated tubular lattice structure 90 is shown. The plated tubular lattice structure 90 may exhibit the geometry and high axial strength of composite lattice structures sold under the trademark IsoTruss®. However, in contrast to IsoTruss® structures, the plated tubular lattice structure 90 may have an improved lateral strength by virtue of one or more metal plating layers deposited on its outer surfaces. Accordingly, the plated tubular lattice structure 90 may have a substantially improved capability to endure lateral loading.

The plated tubular lattice structure 90 may consist of a sufficient number of axial posts 92 to resemble a circular cross-section and a series of pyramidal structures 94 (appearing as triangles in cross-section in FIG. 17) which may extend in the lateral direction and connect to the axial posts 92 at nodes 96. Each adjacent pair of axial posts 92 may be connected by a plurality of pyramidal structures 94 running along a longitudinal axis of the plated tubular lattice structure 90, as best shown in FIG. 16. The exemplary cross-section shown in FIGS. 16 and 17 has six axial posts 92 connected by six pyramidal structures 94 at six nodes 96, but in practice, the number of axial posts 92, the number of pyramidal structures 94, and the number of nodes 96 may vary depending on the application and design. Moreover, as can be appreciated, the length of the plated tubular lattice structure 90 and its inner tubular diameter A may also vary widely depending in the application.

The material arrangement of the plated tubular lattice structure 90 may consist of a backbone structure 98 formed in the shape of the desired tubular lattice structure 90 and having one or more metal plating layers 99 deposited on its outer surface. As one possibility, the backbone structure 98 may be a composite of one or more continuous fibers (e.g., carbon fibers, fiberglass, aramid fibers, etc.) in a resin. As an alternative arrangement, the backbone structure 98 may consist of one or more polymeric materials with or without a hollow center. As a third possible arrangement, backbone structure 98 may consist of a polymeric substrate molded around a composite of one or more continuous fibers (e.g., carbon fibers, fiberglass, aramid fibers, etc.) in a resin (see further details below).

Figure 18:
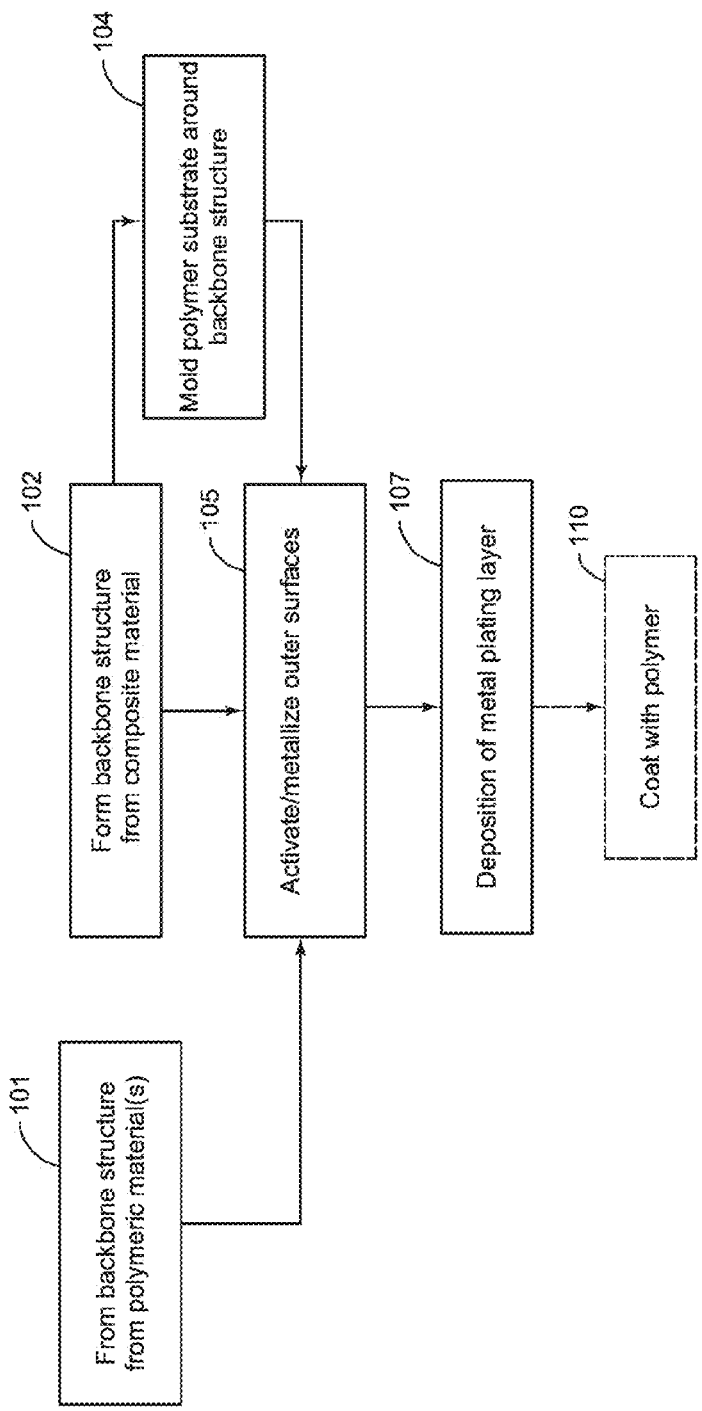
FIG. 18 is a flow chart illustrating methods for fabricating the plated tubular lattice structure, in accordance with a method of the present disclosure.

A series of steps which may be involved in the fabrication of the plated tubular lattice structure 90 according to the above-described arrangements are summarized in FIG. 18. The backbone structure 98 may be formed from one or more polymeric materials by a block 101. Alternatively, the backbone structure 98 may be formed from a composite material (i.e., continuous fiber(s) in a resin) according to a block 102. The block 101 may involve molding the backbone structure 98 from selected polymeric materials in the desired shape (see FIGS. 16-17). Molding may be performed using established polymer molding processes such as, but not limited to, injection molding. The polymeric material may be selected from thermoplastic materials or thermoset materials, either of which may be optionally reinforced with suitable reinforcing materials, such as carbon or glass. Suitable thermoplastic materials may include, but are not limited to, polyetherimide (PEI), thermoplastic polyimide, polyether ether ketone (PEEK), polyether ketone ketone (PEKK), polysulfone, polyamide, polyphenylene sulfide, polyester, polyimide, and combinations thereof. Suitable thermoset materials may include, but are not limited to, condensation polyimides, addition polyimides, epoxy cured with aliphatic and/or aromatic amines and/or anhydrides, cyanate esters, phenolics, polyesters, polybenzoxazine, polyurethanes, polyacrylates, polymethacrylates, silicones (thermoset), and combinations thereof.

The block 102 may be carried out using established methods for forming IsoTruss® composite structures. In particular, it may involve the winding of tows of continuous fibers (e.g., carbon fibers, glass fibers, aramid, etc.) in a resin over a metallic mandrel followed by the careful removal of the mandrel, as will be understood by those skilled in the art. In addition, if desired, a polymer substrate may be molded around the backbone structure 98 formed by the block 102 according to a next block 104, as shown. This step may form a cylindrical polymeric structure with or without a hollow center. Molding of the polymer substrate around the continuous fiber backbone may be carried out using known polymer molding techniques such as, but not limited to, injection molding and compression molding. Furthermore, the polymeric substrate may be formed from the thermoplastic or thermoset materials listed above with optional reinforcement material. The thickness of the polymer substrate may be in the range of about 0.050 inches (about 1.27 mm) to about 0.25 inches (about 6.35 mm) if injection molding is used, and may be in the range of about 0.050 inches (about 1.27 mm) to about 2 inches (about 51 mm) if compression molding is used to form the polymeric substrate. Once formed, the outer surfaces of the polymeric substrate formed by the block 104 may be suitably activated and metallized as described above according to the block 105.

According to a next block 105, the outer surfaces of the backbone structure 98 (formed by the block 101, the block 102, or the blocks 102 and 104) may be suitably activated and metallized using procedures apparent to those skilled in the art. More particularly, the block 105 may result in the metallization of the outer surfaces of the backbone structure 98 to allow the deposition of the metal plating layer(s) 99 thereon.

Subsequent to the block 105, the deposition of one or more metal plating layers 99 on the activated and metallized outer surfaces of backbone structure 98 may be carried out according to a block 107, as shown, to provide the plated tubular lattice structure 90. Deposition of the one or more metal plating layers 99 may be performed using metal deposition processes apparent to those skilled in the art such as, but not limited to, electroplating, electroless plating, and electroforming. The metal plating layer 99 may consist of any platable metallic material, such as, but not limited to nickel, cobalt, copper, iron, gold, silver, palladium, rhodium, chromium, zinc, tin, cadmium, and alloys with any of the foregoing elements comprising at least 50 wt. % of the alloy, and combinations thereof. In addition, the average thickness of the metal plating layers may be in the range of about 0.002 inches (about 0.051 mm) to about 0.150 inches (about 3.81 mm), with local thicknesses in the range of about 0.001 inches (about 0.025 mm) to about 0.200 inches (about 5.08 mm). However, other thickness ranges may also apply depending on the application. This range of metal plating layer thicknesses may provide resistance to erosion, impact damage, and foreign-object damage, while also providing the option to finish the surfaces of the lattice structures more aggressively to meet tight tolerances and/or surface finish requirements.

Furthermore, if desired, deposition of the metal plating layer(s) may be performed in multiple steps by masking certain areas of the backbone structure 98 to yield different thicknesses in different areas. Customization of the metal plating layer thickness in different regions may also be achieved using tailored racking tools (e.g., shields, thieves, conformal anodes, etc.) during deposition of the metal plating layer, as will be apparent to those skilled in the art. Selective adjustment of the thickness of the metal plating layer in different regions by masking and/or tailored racking tools may allow for optimization of properties in certain areas (e.g., fire resistance, structural support, surface characteristics, resistance against erosion, etc.), without adding undue weight to the part to accommodate each of these properties. In any event, completion of the block 107 may provide the desired plated tubular lattice structure 90.

According to an optional block 110, selected outer surfaces of the plated tubular lattice structure 90 may optionally be coated with a polymeric coating using conventional coating processes apparent to those skilled in the art, such as, but not limited to, spray coating and dip coating. The block 110 may be performed, for example, when a polymeric-appearing or non-conductive component is desired.

From the foregoing, it can therefore be seen that the plated tubular lattice structure as disclosed herein can find wide industrial applicability in many situations including, but not limited to, situations requiring tubular materials with both high axial and lateral strength. The plated tubular lattice structures have one or more metal plating layers on the outer surfaces of backbone structures which may be known polymeric structures, continuous fiber structures (i.e., IsoTruss®), or polymeric structures molded around continuous fiber structures. The resulting structures may exhibit the high axial strength of IsoTruss® composites, but with the added advantage of having improved strengths in the lateral direction. The technology as disclosed herein offers lightweight and high-strength structures which may find wide industrial applicability in a wide range of areas such as, but not limited to, bicycle fabrication, pillar fabrication, and aircraft construction.

Plated Corrugated Polymeric Structures

Corrugated polymeric materials have a construction similar to corrugated cardboard. In particular, corrugated polymeric materials may consist of a fluted (or corrugated) polymeric layer sandwiched between two flat polymeric layers, although other arrangements such as a single fluted polymer layer attached to a flat polymer layer or a single fluted polymer layer are also possibilities. These materials may be used as packing materials or for the construction of plastic containers and signs, for example. However, corrugated polymeric materials, by themselves, may not be capable of handling some larger loads. To extend the use of corrugated polymeric materials to higher strength applications, enhancements are needed to improve the structural resilience of these materials.

Figure 19:
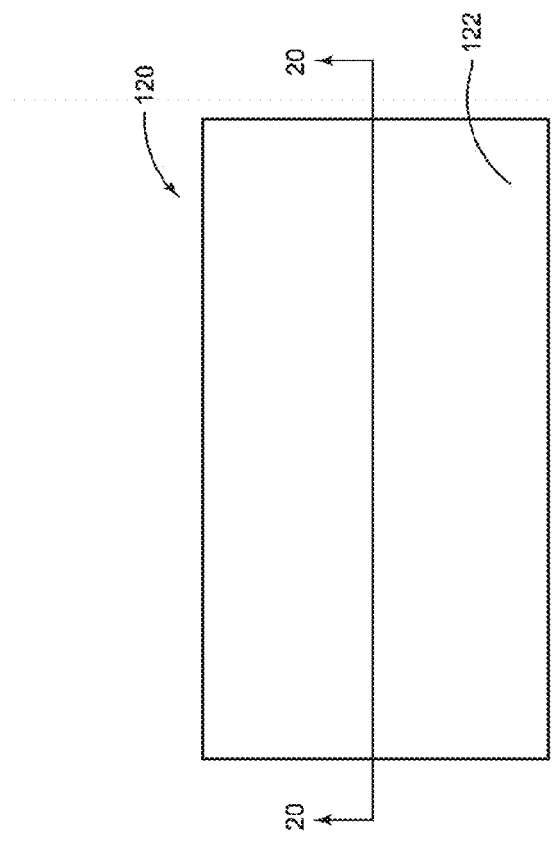
FIG. 19 is a top view of a plated corrugated structure, constructed in accordance with the present disclosure.
Figure 20:
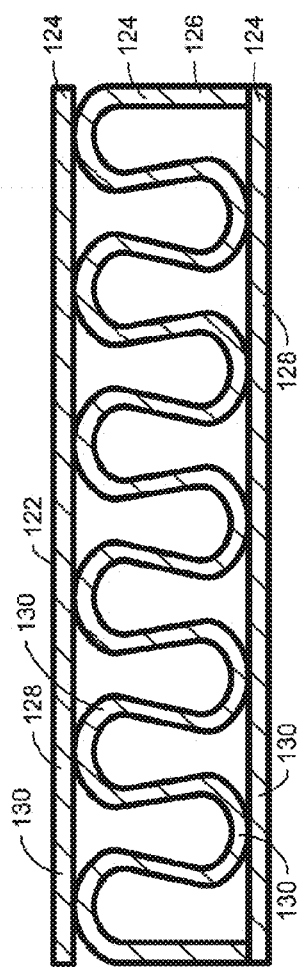
FIG. 20 is a cross-sectional view of the plated corrugated structure of FIG. 19 taken along the line 20-20 of FIG. 19, constructed in accordance with the present disclosure.

Referring now to FIGS. 19 and 20, a plated corrugated structure 120 is shown. The plated corrugated structure 120 may be a lightweight and high-strength article suitable for use in a range of applications such as, but not limited to, high-strength packing materials, signs, thermal protection systems, or aircraft or automotive structural components. In this regard, it may have any dimension suitable for its intended use and it may be assembled with other plated corrugated structures 120 to form larger and more complex structures (see further details below). The plated corrugated structure 120 may have one or more metal plating layers 122 applied to one or more of its external and/or internal surfaces, as best shown in FIG. 20. Importantly, the metal plating layer(s) 120 may impart the corrugated polymeric structure 120 with improved structural strength over traditional corrugated polymeric structures.

The construction of the plated corrugated structure 120 is best shown in FIG. 20. It may consist of three layers 124 which may include a fluted layer 126 between two flattened layers 128 which may be straight or curved. Alternatively, the plated corrugated structure 120 may have other corrugated arrangements such as, for example, one fluted layer 126 or one fluted layer 126 connected to one flattened layer 128. Each layer 124 may consist of a polymer substrate 130 having a fluted or flattened structure. In addition, each layer 124 may have one or more metal plating layers 122 deposited on one or more of its surfaces. For example, in the arrangement depicted in FIG. 20, a metal plating layer 122 is deposited on all of the surfaces of each polymer substrate 130 of each layer 124. However, as can be appreciated, many other arrangements, such as, for example, metal plating layers 122 deposited only on the external surfaces of the flattened layers 128, metal plating layers 122 deposited only on one layer 124, metal plating layers 122 deposited in selected regions of the surfaces of each layer 124, etc., are also possible.

The polymer substrates 130 may be formed from a thermoplastic material or a thermoset material, either of which may be optionally reinforced with reinforcing materials such as carbon or glass. Suitable thermoplastic materials may include, but are not limited to, polyetherimide (PEI), thermoplastic polyimide, polyether ether ketone (PEEK), polyether ketone ketone (PEKK), polysulfone, polyamide, polyphenylene sulfide, polyester, polyimide, polypropylene, polyethylene, polycarbonate, and combinations thereof. Suitable thermoset materials may include, but are not limited to, condensation polyimides, addition polyimides, epoxy cured with aliphatic and/or aromatic amines and/or anhydrides, cyanate esters, phenolics, polyesters, polybenzoxazine, polyurethanes, polyacrylates, polymethacrylates, silicones (thermoset), and combinations thereof.

The metal plating layer(s) 122 may consist of any platable metallic material, such as, but not limited to, nickel, cobalt, copper, iron, gold, silver, palladium, rhodium, chromium, zinc, tin, cadmium, and alloys with any of the foregoing elements comprising at least 50 wt. % of the alloy, and combinations thereof. The average thickness of the metal plating layer 122 may be in the range of about 0.004 inches (about 0.102 mm) to about 0.040 inches (about 1.02 mm), with local thicknesses in the range of about 0.001 inches (about 0.025 mm) to about 0.050 inches (about 1.27 mm). However, depending on the design and application of the plated corrugated structure, other metal plating layer thicknesses may also apply. This range of metal plating layer thicknesses may provide the plated corrugated structure 120 with added benefits such as resistance against erosion, impact, and foreign-object damage.

Figure 21:
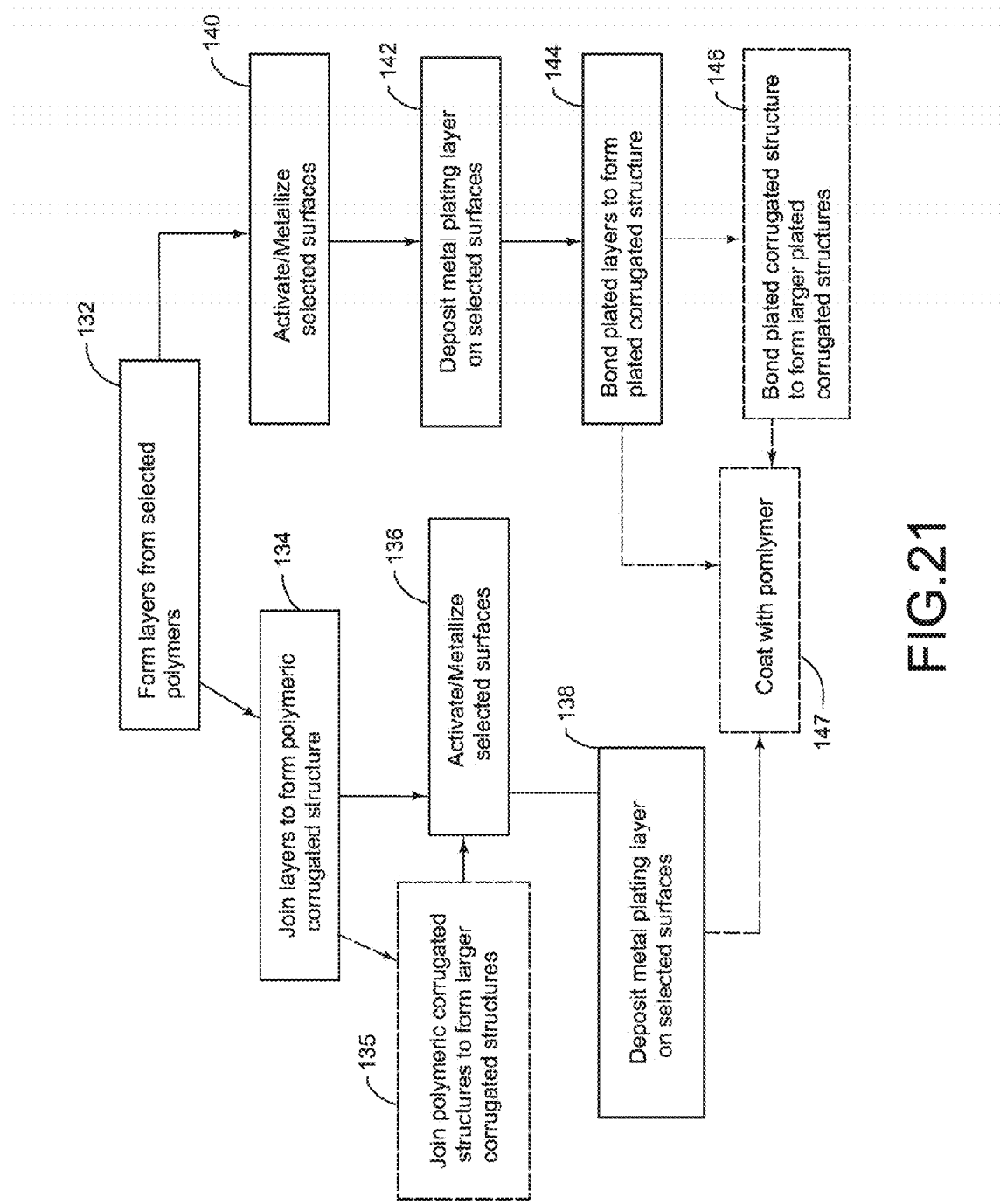
FIG. 21 is a flow chart diagram illustrating methods for fabricating the plated corrugated structure and larger plated corrugated structures, in accordance with methods of the present disclosure.

A series of steps which may be performed for fabricating the plated corrugated structure 120 as well as for fabricating larger plated corrugated structures are depicted in FIG. 21. According to a first block 132, the layers 124 may be formed in a desired shape (i.e., flattened, curved, or fluted) from selected polymeric materials. The polymeric materials may include the thermoplastic or thermoset materials described above with optional reinforcement. The desired shapes of each of the layers 124 may be formed using conventional polymer molding processes apparent to those skilled in the art such as, but not limited to, injection molding, compression molding, composite layup (autoclave, compression, or liquid molding), or extrusion. The layers 124 may then be joined to form a polymeric corrugated structure according to a next block 134. For example, the polymeric corrugated structure may have a fluted layer 126 between two flattened layers 128 (see FIG. 20), a single fluted layer 126 connected to a flattened layer 128, or other corrugated structural arrangements apparent to those skilled in the art. The layers 124 may be joined using conventional polymer joining processes such as, but not limited to, welding (ultrasonic, laser, friction, friction-stir, traditional, etc.), adhesive bonding, or formation of mitered joints (with or without adhesive).

Selected surfaces of the polymeric corrugated structure may then be suitably activated and metallized according to a next block 136 to prepare the selected surfaces for deposition of the metal plating layer(s) 122 thereon. Surface activation and metallization may be carried out using well-known procedures in the industry. Deposition of one or more metal plating layers 122 on the selected surfaces may then be carried out according to a next block 138, as shown. Deposition of the metal plating layer(s) 122 may be achieved using any metal deposition process apparent to those skilled in the art such as, but not limited to, electroplating, electroless plating, and electroforming. Notably, if less than all of the surfaces of the corrugated structure are selected for plating with the metal plating layer, masking techniques may be employed to block certain areas and prevent metal deposition thereon, as will be understood by those skilled in the art. Such masking techniques may also be employed to apply the metal plating layers in strips, lines, or other designs.

Depending on the intended application of the material, one or more of the polymeric corrugated structures formed by the block 134 may be joined to form a larger polymeric corrugated structure having a desired geometry prior to the block 136, according to an optional block 135, as shown. Joining of the polymeric corrugated structures according to the block 135 may be achieved using conventional processes such as, but not limited to, welding (ultrasonic, laser, friction, friction-stir, traditional, etc.), adhesive bonding, or by the formation of mitered joints (with or without adhesive). Selected surfaces of the larger polymeric corrugated structure may then be suitably activated and metallized (block 136), allowing subsequent deposition of the metal plating layer(s) on the selected surfaces to be performed (block 138).

As an alternative fabrication method, selected surfaces of the layers 124 formed by the block 132 may be suitably activated and metallized according to a block 140. Subsequent to the block 140, one or more metal plating layers 122 may be deposited on the selected surfaces of the layers 124 according to a next block 142. As described above, deposition of the metal plating layer(s) 122 may be achieved using conventional processes such as, but not limited to, electroplating, electroless plating, or electroforming. Furthermore, masking techniques may be employed to block certain areas of the layers 124 from being plated. According to a next block 144, the plated layers may be bonded to form a plated corrugated structure, such as the plated corrugated structure 120 depicted in FIG. 20 or another plated corrugated structure. Bonding of the plated layers during the block 144 may be achieved by transient liquid phase (TLP) bonding, as will be apparent to those skilled in the art. Depending on its intended use, one or more of the plated corrugated structures formed by the block 144 may be assembled and bonded together in a desired geometry to form a larger plated corrugated structure, according to an optional block 146, as shown. It is may also be possible to perform bonding according to block 144 and block 146 simultaneously, in certain instances. In any event, any of the plated corrugated structures or larger plated corrugated structures may be optionally coated on exposed surfaces with a polymer coating, if desired, according to an optional block 147, as shown. The polymer coating may provide a polymeric-appearing and non-conductive surface and may be applied using known coating processes such as, but not limited to, spray coating and dip coating.

Figure 22:
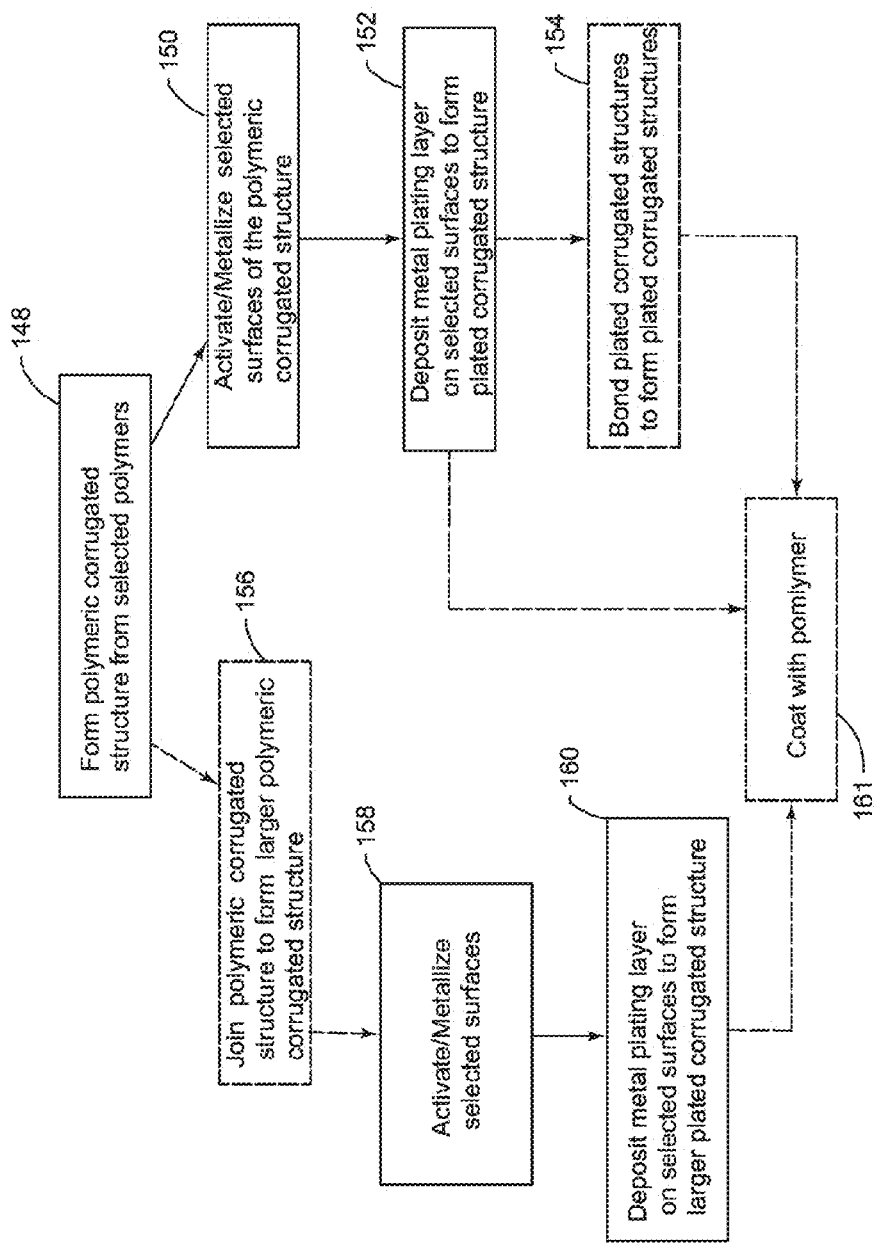
FIG. 22 is a flow-chart diagram illustrating additional methods for fabricating the plated corrugated structure and larger plated corrugated structures, in accordance with methods of the present disclosure.

Additional alternative methods for fabricating the plated corrugated structure 120 are depicted in FIG. 22. According to a first block 148, a desired polymeric corrugated structure may be formed from selected polymeric materials. The formed polymeric corrugated structure may be similar to the three-layer corrugated structure depicted in FIG. 20 (but without the metal plating layers) or it may be another type of corrugated structure. The selected polymeric materials may include the thermoplastic materials or thermoset materials described above with optional reinforcement. The polymeric corrugated structure may be formed using conventional polymer molding processes such as, but not limited to, injection molding, compression molding, composite layup (autoclave, compression, or liquid molding), extrusion, or additive manufacturing.

According to a next block 150, selected surfaces of the polymeric corrugated structure formed by the block 148 may then be suitably activated and metallized to prepare those surfaces for deposition of metal plating layer(s) thereon. One or more metal plating layers 122 may then be deposited on the selected surfaces using known techniques (e.g., electroplating, electroless plating, electroforming) according to a next block 152, thereby providing a plated corrugated structure (e.g., the plated corrugated structure 120). If desired, one or more of the resulting plated corrugated structures may then be assembled and bonded (by TLP bonding) to form a larger plated corrugated structure according to an optional block 154, as shown.

As yet another alternative method to form larger plated corrugated structures, one or more of the polymeric corrugated structures formed by the block 148 may be assembled and joined to form a larger polymeric corrugated structure having a desired geometry according an optional block 156. Joining of the polymeric corrugated structures may be achieved by conventional processes (e.g., welding, adhesive bonding, mitered joints, etc.). Selected surfaces of the larger polymeric corrugated structure may then be suitably activated and metallized according to a next block 158, as shown. Subsequent to the block 158, the metal plating layer(s) 122 may be deposited on the selected surfaces using conventional processes (e.g., electroplating, electroless plating, and electroforming) according to a block 160. Furthermore, any of the plated corrugated structures or larger plated corrugated structures formed by the processes in FIG. 22 may be optionally coated with a polymer coating according to an optional block 161, as shown. The polymer coating may be deposited on the exposed surfaces of the plated corrugated structure or larger plated corrugated structure using conventional coating processes such as, but not limited to, spray coating or dip coating.

It is noted that during any of the metal deposition steps described above and depicted in FIGS. 21 and 22, the thicknesses of the metal plating layers 122 on the surfaces of the plated corrugated structures or larger plated corrugated structures may be selectively customized in specific regions using masking and/or tailored racking techniques (e.g., shields, thieves, conformal anodes, etc.), as will be apparent to those skilled in the art. Customization of the metal plating layer thickness in different regions may allow for optimization of surface properties such as, but not limited to, fire resistance and structural support, without adding undue weight to the part to completely accommodate each of these properties. In addition, thicker metal plating layers in selected regions may offer the option to more aggressively machine or finish the surfaces to achieve desired surface roughness or to meet tight tolerances.

From the foregoing, it can therefore be seen that the present disclosure can find wide industrial applicability in many situations such as, but not limited to, situations requiring high-strength and lightweight packing materials, thermal protection structures, and high-strength and lightweight aircraft or automotive components. In particular, the plated corrugated structures as disclosed herein may exhibit markedly enhanced strengths over traditional corrugated plastic materials. Furthermore, the plated corrugated structures may be substantially lighter in weight than entirely metallic corrugated structures. The metal plating layers on the surfaces of the plated corrugated structures may also offer the option to assemble and bond the plated corrugated structures to form larger structures using known processes, such as transient liquid phase (TLP) bonding. In addition, the corrugated pattern of the plated corrugated structures may be exploited to provide cooling fluid channels in thermal protection applications. The technology as disclosed herein may find wide industrial applicability in a wide range of areas such as aerospace, automotive, and container or packing material industries.

Plated Polymeric Pipe

Pipes and tubes are employed for transporting fluids for a range of applications such as oil transportation, civil infrastructure, and construction. Examples may include underground pipes for carrying oil across large distances, irrigation pipes, plumbing pipes for residential and commercial structures, as well as pipes for automotive or aircraft construction. Pipes formed from only metallic materials are structurally resilient, but are heavy and may be susceptible to corrosion. In contrast, pipes formed from only polymeric materials are lightweight and less costly to produce compared to similarly-dimensioned metallic pipes, but may be less structurally resilient and prone to premature structural failure and/or erosion in some cases. To expand the use of such lightweight and cost-effective polymeric pipes in various applications, enhancements are needed to improve the structural resilience of polymeric pipes.

Referring now to FIGS. 23 and 24, a plated polymeric pipe 170 is shown. The plated polymeric pipe 170 may have a core formed from a polymeric substrate 172 and one or more metal plating layers 174 deposited on an internal surface 176 and an external surface 178 of the polymer substrate 172, as shown in FIG. 24. The metal plating layer(s) 174 may impart the plated polymeric pipe 170 with improved structural strength over similarly dimensioned polymeric pipes, without adding substantial weight to the pipe. Moreover, because the plated polymeric pipe 170 may mostly consist of polymeric materials, it may be substantially lighter in weight than similarly dimensioned all-metallic pipes.

The plated polymeric pipe 170 may have an open internal channel 180 for carrying fluids such as, but not limited to, oil, water, and waste. It may be employed for use in a range of applications such as, but not limited to, underground oil transportation, commercial construction, home construction, and automotive or aerospace applications. Accordingly, it may have a length, diameter, and shape suitable for its intended use. For example, the diameter of the internal channel 180 may be several feet wide if employed for oil transportation, or several inches to a few feet wide if employed for commercial construction. In addition, the plated polymeric pipe 170 may be straight, as shown in FIG. 23, or it may be curved or bent in various locations if necessary.

The metal plating layer(s) 174 may be deposited on both the internal surface 176 and the external surface 178 of the polymeric substrate 172, as shown in FIG. 24. Alternatively, depending on the design and use of the plated polymeric pipe 170, the metal plating layer(s) 174 may be deposited only on the external surface 178 as shown in FIG. 25, or only on the internal surface 176 as shown in FIG. 26. Plating on just the internal surface 176 may be favored, for example, to prevent corrosion on the exterior surface of the pipe, whereas plating on just the external surface 178 may be favored when increased impact resistance is desired on the exterior surface of the pipe. However, those skilled in the art will understand that various other considerations may also be taken into account when selecting which surfaces of the pipe to plate with the metal plating layer 174.

The polymeric substrate 172 may consist of a thermoplastic material or a thermoset material. Suitable thermoplastic materials may include, but are not limited to, polyethylene, polyetherimide (PEI), thermoplastic polyimide, polyether ether ketone (PEEK), polyether ketone ketone (PEEK), polysulfone, polyamide, polyphenylene sulfide, polyester, polyimide, and combinations thereof. Suitable thermoset materials may include, but are not limited to, polyimides, addition polyimides, epoxy cured with aliphatic and/or aromatic amines and/or anhydrides, cyanate esters, phenolics, polyesters, polybenzoxazine, polyurethanes, polyacrylates, polymethacrylates, silicones (thermoset), and combinations thereof. In addition, either of the thermoplastic materials or the thermoset materials may be optionally reinforced with reinforcing materials such as carbon or glass.

The metal plating layers 174 may be formed from any platable metal or platable metal alloy such as, but not limited to, nickel, cobalt, copper, iron, gold, silver, palladium, rhodium, chromium, zinc, tin, cadmium, and alloys with any of the foregoing elements comprising at least 50 wt. % of the alloy, and combinations thereof. The thickness of the metal plating layer 174 may vary depending on the size and diameter of the plated polymeric pipe 170 and its application. For plated polymeric pipes 170 having diameters in the range of about ten inches to about one hundred inches (about 0.25 m to about 2.5 m), the thickness of the metal plating layer 174 may be in the range of about 0.010 inches to about 0.250 inches (about 0.254 mm to about 6.35 mm). For plated polymeric pipes 170 having diameters in the range of about one inch to about ten inches (about 0.025 m to about 0.25 m), the thickness of the metal plating layer 174 may be in the range of about 0.001 inches to about 0.025 inches (about 0.025 mm to about 0.64 mm). For plated polymeric pipes 170 having diameters less than or equal to about one inch, the thickness of the metal plating layer 174 may be in the range of about 0.0005 inches to about 0.005 inches (about 0.013 mm to about 0.13 mm). However, depending on the design and application of the pipe, other metal plating layer thicknesses may also apply. These ranges of metal plating layer thicknesses may provide the plated polymeric pipe 170 with resistance against erosion, impact, and foreign-object damage. Moreover, these thickness ranges may provide the option to finish the surfaces of the pipe more aggressively to meet tight tolerances and/or to meet surface finish requirements.

Figure 27:
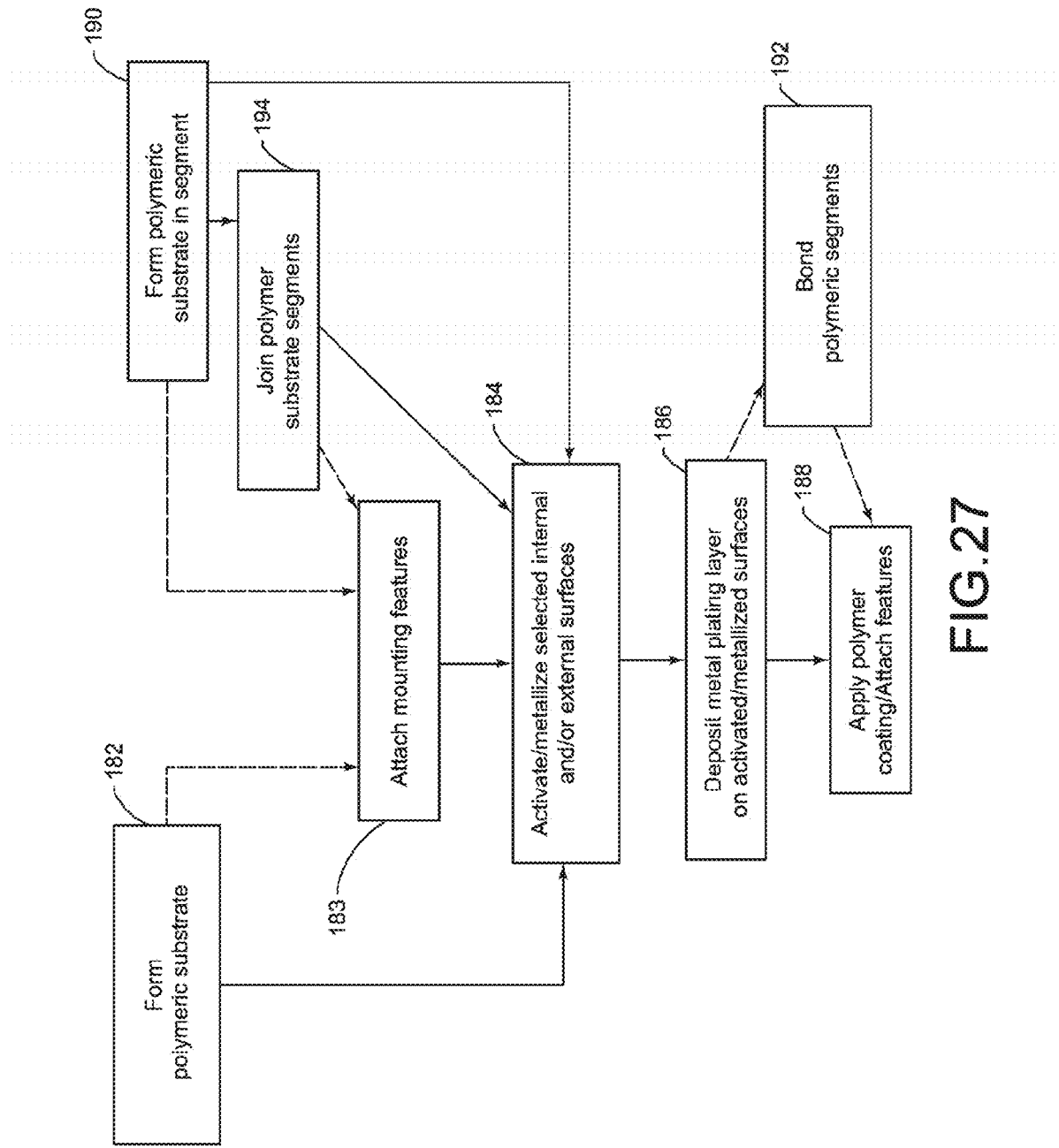
FIG. 27 is a flowchart illustrating methods involved in the fabrication of the plated polymeric pipe, in accordance with a method of the present disclosure.

FIG. 27 illustrates various methods which may be used to fabricate the plated polymeric pipe 170. According to a first block 182, the polymeric substrate 172 may be formed in a desired pipe structure from selected polymeric materials which may include the thermoplastic materials or thermoset materials described above with optional reinforcement. The desired polymer pipe structure may be formed using a range of processes apparent to those skilled in the art such as, but not limited to, injection molding, compression molding, blow molding, additive manufacturing (liquid bed, powder bed, deposition processes), or composite layup (autoclave, compression, or liquid molding). If desired, mounting features may be subsequently adhesively bonded onto the polymeric substrate 172 after molding according to an optional block 183, as shown. The attachment of such mounting features after the block 182 may simplify the mold tooling for the polymeric substrate 172. Following the block 182 (or the optional block 183), selected internal surfaces 176 and/or external surfaces 178 of the polymeric substrate 172 may be suitably activated and metallized according to a next block 184. Surface activation and metallization may be performed using well-established techniques in the industry and may result in a metallic (or conductive) surface being formed on the treated surfaces of the polymer substrate 174, thereby allowing the subsequent deposition of one or more metal plating layers 174 thereon.

Subsequent to the block 184, one or more metal plating layers 186 may be deposited on the activated and metallized surfaces of the polymer substrate 172 according to a block 186. Deposition of the metal plating layer(s) 184 may be achieved using a metal deposition method apparent to those skilled in the art such as, but not limited to, electroplating, electroless plating, brush plating, or electroforming. If electroless plating is used, the metal plating layer 184 may be codeposited with polytetrafluoroethylene (Teflon®), which may advantageously provide a slippery wear surface. Furthermore, it is also noted that masking techniques may be employed during the block 186 to block certain internal surfaces 176 and/or external surfaces 178 of the polymeric substrate 172 from being plated or to yield different thicknesses in areas of interest. Such masking techniques are well-established in the industry and apparent to those skilled in the art. Customization of the thickness of the metal plating layer 174 in different regions may also be achieved during the block 186 with the use of tailored racking techniques (i.e., shields, thieves, conformal anodes, etc.), as will be apparent to those skilled in the art. Tailoring of the thickness of the metal plating layer(s) 174 in selected regions by masking and/or tailored racking techniques may allow for the optimization of properties such as structural support and desired surface characteristics without adding undue weight to the part to accommodate each of the properties.

Following the block 186, the plated polymeric pipe 170 may be provided. If desired, a polymer coating may be then be applied over the outer surfaces of the plated polymeric pipe 170 (in its entirety or in select regions) to provide a lightweight, stiff, and strong polymeric-appearing (non-conductive) pipe, according to an optional block 188. The polymer coating may be applied using conventional processes apparent to those skilled in the art such as, but not limited to, spray coating and dip coating. Furthermore, if needed, additional features (e.g., bosses, inserts, flanges, etc.) may be attached to the plated polymeric pipe 170 using adhesives or fasteners according to the optional block 188, as shown.

As an alternative fabrication method, the polymeric substrate 172 may be formed in two or more segments according to the block 190. The segments may be formed in a desired shape from the thermoplastic materials or thermoset materials described above with optional reinforcement using conventional polymer molding processes (e.g., injection molding, blow molding, additive manufacturing, compression molding, composite layup). If desired, mounting features may be adhesively attached to one or more of the polymeric segments according to the optional block 183, as described above. Following the block 190 (or the optional block 183), selected internal or external surfaces of each of the polymer segments may be suitably activated and metallized and one or more metal plating layers 174 may be deposited on the activated and metallized surfaces according to the blocks 184 and 186, respectively, as described above. Notably, if desired, masking and/or tailored racking techniques may be employed to customize the thickness of the metal plating layer (s) 174 in specific regions, as described above. The plated polymeric segments may then be bonded to each other according to a block 192 to form the full-length plated polymeric pipe 170. Bonding of the plated polymeric segments may be achieved using transient liquid phase (TLP) bonding, as will be understood by those skilled in the art. Following the block 192, if desired, a polymer coating may be applied and/or additional features may be attached to the plated polymeric pipe 170 according to the optional block 188, as described above.

As another alternative fabrication method for the plated polymeric pipe 170, the polymeric segments formed by the block 190 may be joined to form the full-length polymeric substrate 172, according to a block 194. Joining of the polymeric segments may be achieved using any conventional process such as, but not limited to, adhesive bonding, mitered joints (with or without adhesive), or welding (ultrasonic, laser, friction, friction-stir, traditional, etc.). The polymeric substrate 172 formed by the joining of the polymeric segments may then be processed like the polymeric substrate 172 generated by the block 182 to provide the final plated polymeric pipe 170, as described above.

From the foregoing, it can therefore be seen that the plated polymeric pipe as disclosed herein may find industrial applicability in many situations such as, but not limited to, underground pipe construction, irrigation pipe construction, commercial or residential pipe construction, and pipes for automotive or aircraft construction. The plated polymeric pipe offers a lightweight and low cost alternative for all-metallic pipes and may lead to reduced shipping costs and increased ease of installation compared with all-metallic pipes. As disclosed herein, metal plating layers may be selectively applied to internal and/or external surfaces of a pipe-shaped polymeric substrate to markedly improve the structural resilience of the pipe over polymeric-based pipes, without substantially adding to the weight of the pipe. Therefore, it is expected that the plated polymeric pipe will exhibit improved resistance against impact and fracture compared with all-polymeric pipes. In addition, the thickness of the plating may be tailored to provide improved erosion-resistance or other desired surface characteristics. The technology as disclosed herein may find wide industrial applicability in a wide range of areas such as oil transport industries, construction industries, and automotive or aerospace industries.

Over-Plated Fastened Composite Assemblies

Many engineers continue to seek strategies to fabricate high strength and lightweight components in complex geometries for various industrial applications. In some applications, individual structural components may be assembled and fastened together in a arrangement to produce a desired complex shape. However, in certain applications where vibrations and/or aerodynamic forces are present (e.g., aerospace applications, automotive applications, etc.), the possibility of fastener loosening and the loss of the clamping forces holding the component together is a legitimate concern. In addition, thermoplastic and composite materials are attractive materials for forming components with complex geometrical features, as they are lightweight and may be directly molded into a range of complex shapes. However, thermoplastic components may be limited to relatively few structurally loaded applications due to their low strengths relative to metallic components. Clearly, strategies are needed to provide high strength and lightweight components in a variety of complex geometries.

Figure 28:
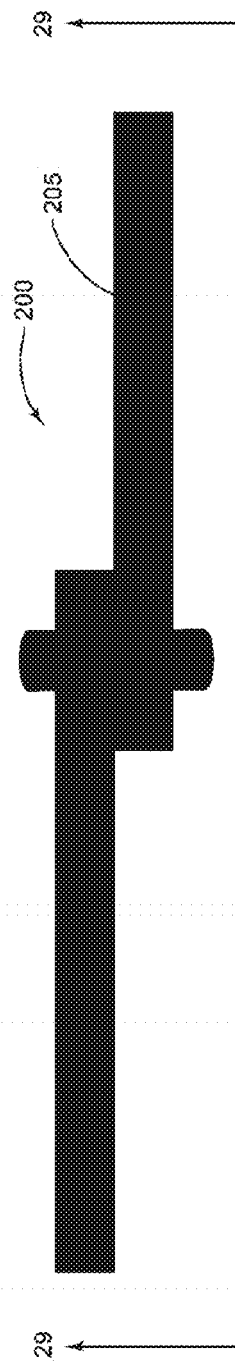
FIG. 28 is a side view of an over-plated fastened assembly, constructed in accordance with the present disclosure.
Figure 29:
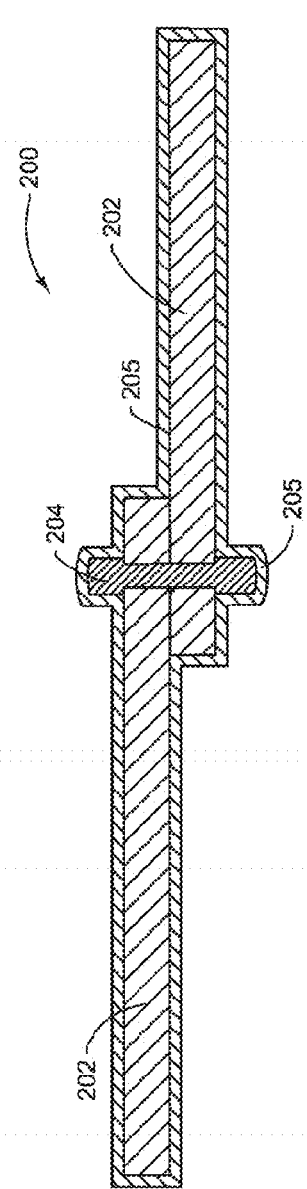
FIG. 29 is a cross-sectional view of the over-plated fastened assembly of FIG. 28 taken along the line 29-29 of FIG. 28, constructed in accordance with the present disclosure.

Referring now to FIGS. 28 and 29, an over-plated fastened assembly 200 is shown. The over-plated fastened assembly 200 may consist of two or more components 202 joined together by one or more fasteners 204. In addition, it may have one or more metal plating layers 205 deposited over the outer surfaces of the fastened components, as shown. Importantly, the metal plating layer(s) 205 may impart the assembly 200 with increased structural resilience, while also mechanically locking the fastener(s) 204 in place to minimize or eliminate the possibility of disassociation of the components 202.

The components 202 may have a variety of geometries, including complex geometries, and may be assembled together to form a range of shapes, whether simple or complex. In addition, each component 202 of the assembly may have the same or different geometries. Accordingly, the geometry of the over-plated fastened assembly 200 may, in practice, exhibit a range of simple or complex shapes which may deviate substantially from the exemplary structures shown in FIGS. 28 and 29. Furthermore, in some situations, the assembly 200 may have multiple components 202 fastened together at multiple interfaces and there may be multiple fasteners 204 at each interface. In addition, in some situations, each fastener 204 may insert through and fasten more than two components.

Figure 30:
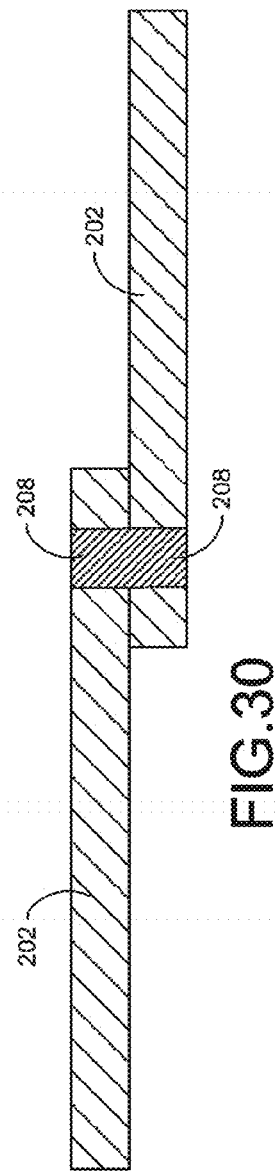
FIG. 30 is a cross-sectional view similar to FIG. 29, but with a metal plating layer and a fastener removed.

Each of the components 202 in the assembly 200 may have one or more holes 208 and the components 202 may be assembled together with the holes 208 aligned to receive a fastener 204, as best shown in FIG. 30. The holes 208 may be various types of holes such as, but not limited to, simple through holes, countersunk holes, and counterbore holes. In addition, depending on the type of fastener, the holes 208 formed in the components 202 may be threaded or smooth. The fastener 204 may be any suitable mechanical fastener such as, but not limited to, a bolt, a rivet, a stud, a nut, or a permanent composite fastener, such as an injection molded pin or rivet. The fasteners 204 may be formed from a range of suitable materials such as metals, composite materials, or plastics (e.g., nylon).

The components 202 may be formed from polymeric materials, composite materials, or metallic materials. In addition, each component 202 in the assembly 200 may be formed from the same or different materials. The polymeric materials may be a thermoplastic material or a thermoset material with optional fiber reinforcement with reinforcing fibers such as, but not limited to, carbon fiber or glass fibers. Suitable thermoplastic materials may include, but are not limited to, polyetherimide (PEI), thermoplastic polyimide, polyether ether ketone (PEEK), polyether ketone ketone (PEKK), polysulfone, polyamide, polyphenylene sulfide, polyester, polyimide, and combinations thereof. Suitable thermoset materials may include, but are not limited to, condensation polyimides, addition polyimides, epoxy cured with aliphatic and/or aromatic amines and/or anhydrides, cyanate esters, phenolics, polyesters, polybenzoxazine, polyurethanes, polyacrylates, polymethacrylates, silicones (thermoset), and combinations thereof. Optionally, whether formed from polymeric materials, composite materials, or metallic material, one or more of the components 202 forming the assembly 200 may be individually plated on its outer surfaces with one or more metal plating layers (see details below).

The metal plating layer 205 may be any platable metal or metal alloy such as, but not limited to, nickel, cobalt, nickel-cobalt alloys, copper, chromium, or zinc. It may be applied over the fastened components with average thicknesses in the range of about 0.004 inches (about 0.102 mm) to about 0.040 inches (about 1.02 mm) and local thicknesses in the range of about 0.001 inches (about 0.025 mm) to about 0.050 inches (about 1.27 mm), but other thicknesses may also be used depending on the application. This range of metal plating layer thicknesses may provide resistance against erosion, impact, and foreign object damage. In addition, this range of thicknesses may also provide the option to finish the surfaces of the assembly 200 more aggressively to meet tight tolerances or to meet surface finish requirements.

Figure 31:
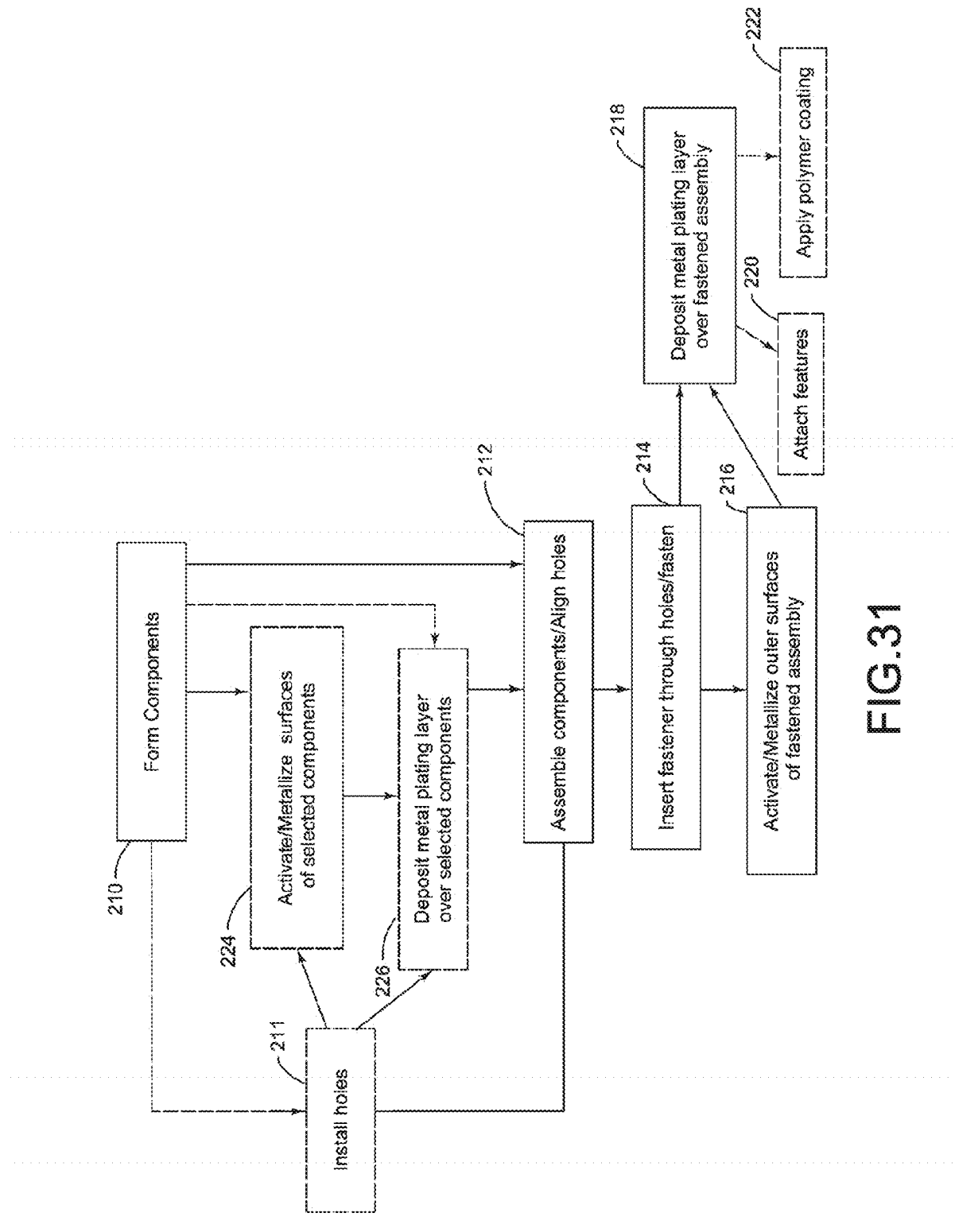
FIG. 31 is a flow chart illustrating methods for the fabrication of the over-plated fastened assembly, in accordance with methods of the present disclosure.

Methods for fabricating the over-plated fastened assembly are illustrated in FIG. 31. According to a first block 210, each of the components 202 of the assembly may be formed in a desired shape from selected materials (i.e., polymeric, composite, or metallic). Forming of the components 202 in a desired shape may be achieved using a range of processes apparent to those skilled in the art such as, but not limited to, injection molding, compression molding, blow molding, additive manufacturing (liquid bed, powder bed, deposition processes), or composite layup (autoclave, compression, or liquid molding). If the components 202 are formed from metallic materials, they may be formed in a desired shape using methods apparent to those skilled in the art such as, but not limited to, forging, casting, or machining. The holes 208 may be directly introduced into the body of the components 202 during the formation step (block 210), or they may be installed in the components 202 following formation according to an optional block 211, as shown. Installation of the holes 208 during the block 211 may be achieved by drilling, machining, etching, or other similar process.

Subsequent to the block 210 (or the block 211), the components 202 may be assembled in a desired shape with the holes 208 aligned to receive one or more of the fasteners 204, according to a block 212. The components 202 may then be locked in the desired shape by inserting the fasteners 204 through the aligned holes and tightening the fasteners, thereby forming a fastened assembly, according to a next block 214. If the components 202 are formed from polymeric or composite materials, the outer surfaces of the fastened assembly may then be suitably activated and metallized according to a next block 216, as shown. This process may be achieved using well-established methods apparent to those skilled in the art and may result in a metallic (or conductive) surface being formed on the fastened assembly, thereby allowing the subsequent deposition of one or more metal plating layers 205 thereon. However, if the components 202 are only formed from metals, the block 216 may be bypassed, as their surfaces will already be metallic and conductive.

Following the block 216 (or the block 214), one or more metal plating layers 204 may be deposited over the fastened assembly according to a next block 218. Deposition of the metal plating layer(s) 204 may be achieved using metal deposition methods apparent to those skilled in the art such as, but not limited to, electroplating, electroless plating, or electroforming. If desired, masking techniques may be employed to block selected outer surfaces of the fastened assembly from being plated or to yield different metal plating layer thicknesses in different areas of interest. Such masking techniques are well-established in the industry and apparent to those skilled in the art. A customized metal plating layer thickness profile on the outer surface of the fastened assembly may also be achieved with the use of tailored racking techniques (e.g., shield, current thieves, conformal anodes, etc.), as will be apparent to those skilled in the art. Tailoring of the thickness of the metal plating layer 204 in different regions of the part may allow for the optimization of desired properties such as, but not limited to, structural support, erosion resistance, fire resistance, and other surface characteristics without adding undue weight to the assembly 200 to accommodate each of these properties.

Following the block 218, the over-plated fastened assembly 200 may be provided. If desired, additional features (e.g., bosses or inserts) may then be attached to the assembly 200 (with the use of adhesives, fasteners, etc.) according to an optional block 220, as shown. In addition, if desired, one or more polymer coatings may be applied over the outer surfaces of the assembly according to an optional block 222. The polymeric coating may result in a light-weight, stiff, and strong polymeric-appearing (non-conductive) assembly. It may be applied over all of the outer surfaces of the assembly or on selected surfaces using conventional processes such as spray coating and dip coating.

As an additional possibility, one or more selected components 202 of the assembly may be optionally individually plated over with a metal plating layer after the block 210 (or the block 211). If the selected components are formed from polymeric materials or composite materials, suitable surface activation and metallization of the outer surfaces of the selected components, followed by deposition of one or more metal plating layers on the metallized surfaces may be carried out according to the optional blocks 224 and 226, respectively, as shown. As explained above, surface activation and metallization may be carried out using well-established methods in the industry. Furthermore, deposition of the metal plating layer(s) may also be carried out using well-established methods (e.g., electroplating, electroforming, electroless plating, etc.). Notably, if the selected components are formed from metallic materials, the block 224 may be bypassed, and the block 226 may be performed directly after the block 210 (or the block 211), as shown. The plated components may then be assembled, fastened, and plated over with one or more metal plating layers 205 (blocks 212, 214, and 218), as described above. Additional features may be attached and/or a polymeric coating may then be applied according to the optional blocks 220 and 222, respectively.

Figure 32:
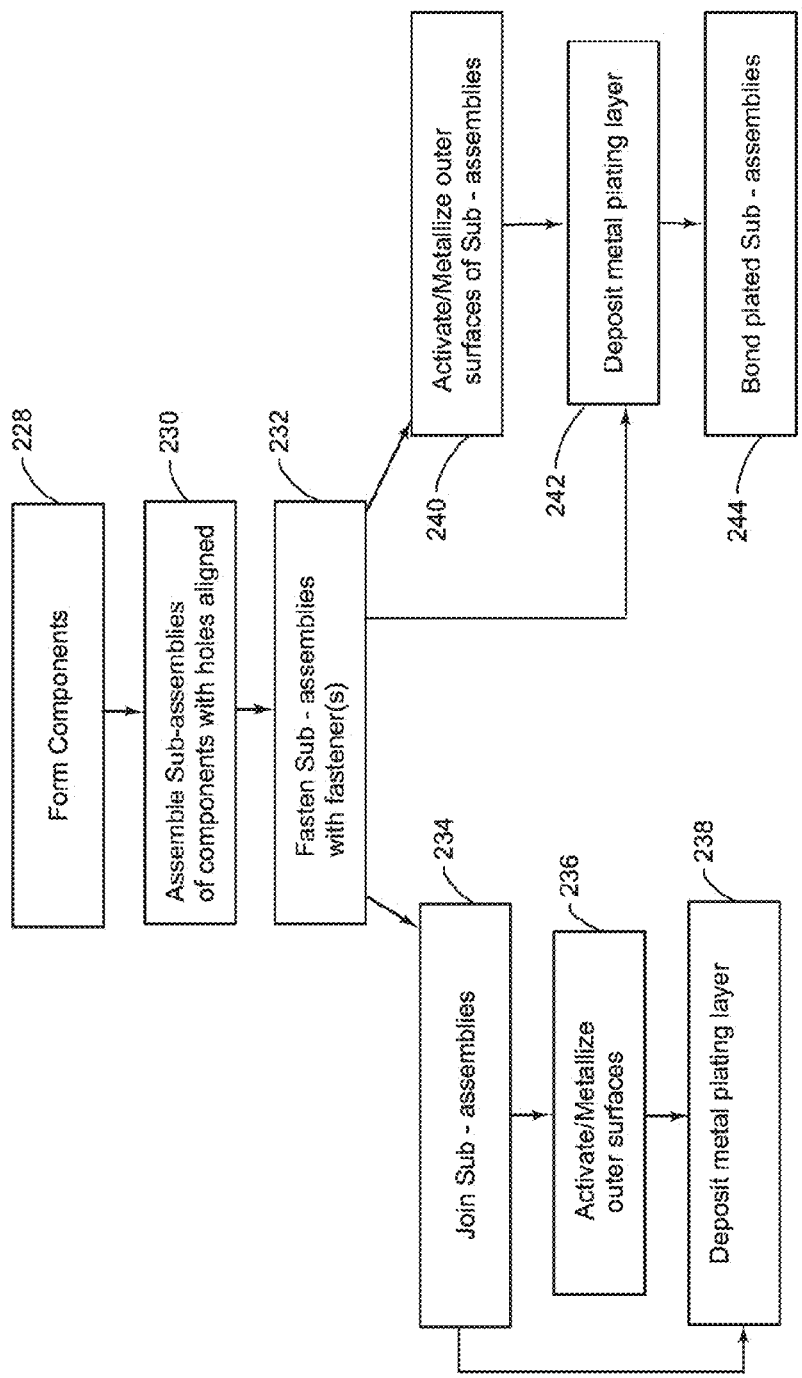
FIG. 32 is a flow chart illustrating additional methods for fabricating the over-plated fastened assembly, in accordance with methods of the present disclosure.

Alternative methods for fabricating the over-plated fastened assembly 200 from sub-assemblies (or segments) are illustrated in FIG. 32. Beginning with a first block 228, the components 202 may be formed from selected materials (i.e., polymeric, composite, or metallic) as described above. As explained above, the holes 208 may be formed into the body of the components 202 during its formation or after its formation by drilling, machining, etching, etc. The components 202 may then be assembled in sub-assemblies with the holes 208 being aligned to receive fasteners according to a next block 230, as shown. One or more fasteners 204 may then be inserted in the aligned holes and fastened to lock the sub-assembly structures in place according to a block 232.

Following the block 232, the fastened sub-assemblies may then be joined to form the full-scale assembly according to the block 234. Joining of the sub-assemblies may be carried out using conventional processes such as, but not limited to, welding (ultrasonic, laser, friction, friction-stir welding, traditional, etc.), adhesive bonding, or by the use of mitered joints (with or without adhesive). The outer surfaces of the assembly may then be activated and metallized as described above according to a block 236. The block 236 may be followed by deposition of one or more metal plating layers 205 on the metallized surfaces of the assembly according to a block 238, as shown. If, however, the components of the assembly are formed from metallic materials, the block 236 may be bypassed, as shown. In any event, completion of the block 238 may provide the over-plated fastened assembly 200.

As another alternative fabrication approach, the outer surfaces of the sub-assemblies formed by the block 232 may be individually activated and metallized according to a block 240. Following surface activation and metallization, one or more metal plating layers 205 may be deposited on the surfaces of the individual sub-assemblies according to the block 242, as shown. However, if the components 202 of the sub-assemblies are metallic, the block 240 may be bypassed. Following deposition of the metal plating layer(s) 205, the plated sub-assemblies may be bonded together in a desired configuration to form the full-scale over-plated fastened assembly 200 according to the block 244. Bonding of the sub-assemblies may be achieved by transient liquid phase (TLP) bonding, as will be understood by those skilled in the art. It is noted that any of the over-plated fastened assemblies 200 produced by the process illustrated in FIG. 32 may be optionally further processed to introduce additional features (e.g., bosses, inserts, etc.) and/or to apply polymer coatings, as described above.

From the foregoing, it can therefore be seen that over-plated fastened assemblies as disclosed herein may find industrial applicability in many situations such as, but not limited to, situations requiring lightweight and high strength components with complex geometries. The strategies for fabricating the over-plated fastened assemblies allow for complex geometries to be assembled and fastened together from smaller component building blocks. These complex components may be subsequently plated over with one or more metal plating layers to provide substantial improvements in component strength. In addition, the over-plating layer may markedly improve fastener retention and minimize or completely eliminate undesirable dissociation of the smaller component building blocks, thereby further improving the overall structural robustness of the component. The technology as disclosed herein may find wide industrial applicability in a wide range of areas such as automotive and aerospace industries.

Metal-Encapsulated Polymeric Article

Many engineers continue to seek strategies to fabricate high-strength and lightweight components in complex geometries for various industrial applications. Lightweight components may be desirable, for example, in some applications (e.g., automotive and aerospace applications) to provide increases in fuel efficiency. In addition, higher-strength components may exhibit enhanced performance characteristics such as improved environmental durability, erosion resistance, and impact resistance. Polymeric materials may be attractive materials for forming components with complex geometrical features, as they are lightweight and may be molded into a range of complex shapes. However, many polymeric materials may be limited to relatively few structurally loaded applications due to their low strengths relative to metallic materials. In addition, certain complex geometries may be costly to access by conventional polymer molding techniques such as injection molding. Clearly, there is a need for enhancements to provide high-strength and lightweight parts in a range of complex geometries.

Referring now to FIGS. 33 and 34, an encapsulated polymeric article 250 is shown. The encapsulated polymeric article 250 may consist of a polymeric substrate 252 encapsulated in one or more outer shells 254, as best shown in FIG. 34. Depending on the application, the polymeric substrate 252 may be fully encapsulated or it may be partially encapsulated in the outer shell 254. The outer shell 254 may be formed from a metallic material and may substantially increase the strength of the article 250 over all polymeric materials of similar size and dimensions. Accordingly, the article 250 may exhibit enhanced performance characteristics over similarly-dimensioned completely polymeric parts with respect to properties such as, but not limited to, environmental durability, erosion resistance, impact resistance, and resistance to foreign-objection damage. In addition, the article 250 may exhibit a range of geometries, including complex geometries. More specifically, it may have any shape suitable for its intended use, which may deviate substantially from the exemplary box-like structure shown in FIGS. 33 and 34.

The polymeric substrate 252 may be in intimate contact with the outer shell 254 and there may be a mechanical interaction between the polymeric substrate 252 and the outer shell 254. However, the polymer substrate 252 may not be directly bonded to the outer shell 254. If the outer shell 254 is formed from metallic materials, it may be formed from a range of metallic materials, such as, but not limited to, nickel, cobalt, copper, iron, gold, silver, palladium, rhodium, chromium, zinc, tin, cadmium, and alloys with any of the foregoing elements comprising at least 50 wt. % of the alloy, and combinations thereof. The polymeric substrate 252 may be formed from a thermoplastic material or a thermoset material, and it may be optionally structurally reinforced with reinforcement materials, such as, but not limited to, carbon or glass. Suitable thermoplastic materials may include, but are not limited to, polyetherimide (PEI), thermoplastic polyimide, polyether ether ketone (PEEK), polyether ketone ketone (PEKK), polysulfone, polyamide, polyphenylene sulfide, polyesters, polyimide, combinations thereof, or any of the foregoing with reinforcement (e.g., carbon or glass). Suitable thermoset materials may include, but are not limited to, condensation polyimides, addition polyimides, epoxy cured with aliphatic and/or aromatic amines and/or anhydrides, cyanate esters, phenolics, polyesters, polybenzoxazine, polyurethanes, polyacrylates, polymethacrylates, silicones (thermoset), combinations thereof, or any of the foregoing with fiber reinforcement.

Figure 35:
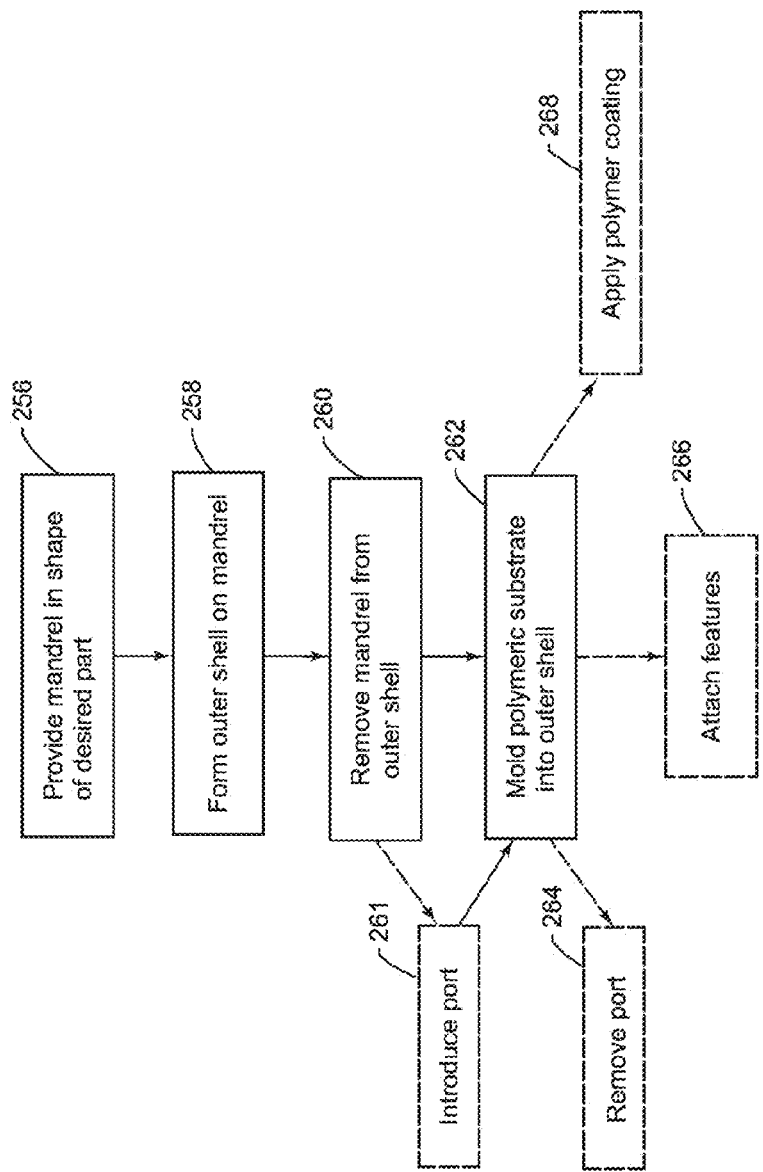
FIG. 35 is a flowchart illustrating a method for the fabrication of the metal-encapsulated polymeric article, in accordance with a method of the present disclosure.

A method for fabricating the encapsulated polymeric article 250 is illustrated in FIG. 35. Beginning with a first block 256, a mandrel in the shape of the desired article may be provided. The mandrel may be designed to be removable from the outer shell 254 or it may be a sacrificial mandrel. It may be formed in the desired shape by a conventional forming process (e.g., additive manufacturing, etc.) from a range of materials such as, but not limited to, metallic materials including pure metals and alloys, polymeric materials, glass, or wood. According to a next block 258, the outer shell 254 may be formed on the mandrel from selected metallic materials. The outer shell 254 may be shaped on the mandrel using a range of processes apparent to those skilled in the art such as, but not limited to, electroforming, cold spraying, plasma vapor deposition, or other spray deposition processes.

Subsequent to the block 258, the mandrel may be removed from the outer shell 254 according to a block 260, leaving the outer shell 254 with one or more open (or hollow) internal cavities for receiving polymeric materials. A port (or opening) for receiving the polymeric materials may be directly formed in the body of the outer shell 254 during its formation (block 258), but if not, a port may be later introduced into the body of the outer shell by an optional block 261, as shown. This port may have features such as a flange or a boss to facilitate attachment of a polymer molding tool in the next step (see below).

Following the block 260 (or the block 261), the polymeric substrate 252 may be molded in the outer shell 254 by injecting selected polymeric materials (selected from the thermoplastic or thermoset materials described above) into the outer shell 254 through the port, according to a block 262. Alternatively, the polymeric substrate 252 may be molded into the outer shell 254 by compression molding or another suitable process selected by a skilled artisan.

The block 262 may furnish the desired encapsulated polymeric article 250, although additional optional processing of the article may also follow. For example, the port on the outer shell 254 may be removed by machining or another process by an optional block 264, as shown. Alternatively, the port may be designed to be an integral part of the article 250 and may be used, for example, to subsequently attach the article 250 to another component. In addition, additional features (e.g., bosses or inserts) may be attached to the encapsulated polymeric article 250 according to an optional block 266. Such features may be attached to selected surfaces of the article using a range of methods apparent to those skilled in the art such as, but not limited to, adhesive bonding, riveting, brazing, or transient liquid phase (TLP) bonding. It is noted that the optional block 266 may also be performed prior to the block 262, if desired. As another optional processing step, a polymer coating may be applied over the surfaces of the article 250 according to an optional block 268, as shown. The polymer coating may be applied by conventional processes such as, but not limited to, spray coating or dip coating, and it may be applied over all of the outer surfaces of the article or on selected surfaces. The optional polymer coating may produce a lightweight, strong, and polymeric-appearing (non-conductive) article.

From the foregoing, it can therefore be seen that encapsulated polymeric articles as disclosed herein may find industrial applicability in many situations such as, but not limited to, situations requiring lightweight, high-strength parts with complex geometrical features. The metallic outer shell may markedly enhance the structural resilience of the article and lead to advantageous improvements in properties such as, but not limited to, stiffness, environmental durability, erosion resistance, impact resistance, and foreign-object damage resistance. In addition, the outer shell may be formed into a range of complex shapes and serve as a template for molding the polymeric substrate. In some circumstances, this fabrication method may lead to increased ease of fabricating complex part geometries and reductions in manufacturing costs. The technology as disclosed herein may find wide industrial applicability in a wide range of areas such as, but not limited to, automotive and aerospace industries.

Plated Polymeric Fastener Holes

Polymeric materials are attractive materials for component fabrication in a number of industries because they are lightweight and moldable into a variety of shapes by conventional processes. However, polymeric components may be less structurally capable than metallic components of similar geometry. For example, in a structurally loaded application, the fastener edge distances (i.e., the distance between the center of the fastener hole and the free edge of the part) in polymeric components are often required to be much greater than fastener edge distances in metallic components because polymeric components may be more susceptible to fastener pullout or fastener cracking the free edge of the component with structural loading. This may significantly limit the applications available to polymeric materials because some interfaces or part geometries cannot allow for larger fastener edge distances. In addition, in some cases, fastener holes in a polymeric component may be more susceptible to damage due to contact with fasteners, motion between the component and the fastener, and installation and removal of fasteners compared with metallic components. Clearly, there is a need to improve the structural robustness of fastener holes in polymeric materials.

Referring now to FIGS. 36 and 37, a plated polymeric component 270 having a plated fastener hole 272 is shown. The plated polymeric component 270 may have any size and shape suitable for its intended purpose and, in practice, may have a geometry which deviates substantially from the exemplary box-like structure shown. It may consist of a polymeric substrate 274 and one or more fastener holes 276 formed in the body of the polymeric substrate 274. The exposed surfaces of the polymer substrate 274 (including the walls of the fastener holes 276) may be plated in its entirety with one or more metal plating layers 278 to provide the plated polymeric component 270 and the plated fastener hole 272, as best shown in FIG. 37. As an alternative arrangement, the metal plating layer (s) 278 may be deposited selectively only over the walls of the fastener holes 276, with the metal plating layer(s) 278 at least partially contacting the outer surfaces of the polymeric substrate 274. In any event, by virtue of the metal plating layer(s) 278, the plated fastener holes 272 may exhibit improved damage resistance, improved wear tolerance, and a reduced tendency to pullout or cracking of the edges of the polymeric substrate 274 as compared with non-plated fastener holes in similarly-dimensioned polymeric components. In addition, the improved damage resistance of the plated fastener holes 272 may allow them to be positioned at a decreased fastener edge distance ($d_1$) from the polymeric substrate edges 281 compared with non-plated fastener holes in similarly-dimensioned polymeric components.

The polymeric substrate 274 may be formed from a thermoplastic material or a thermoset material with optional reinforcing materials, such as, but not limited to, carbon or glass. Suitable thermoplastic materials may include, but are not limited to, polyetherimide (PEI), thermoplastic polyimide, polyether ether ketone (PEEK), polyether ketone ketone (PEKK), polysulfone, polyamide, polyphenylene sulfide, polyester, polyimide, or combinations thereof. Suitable thermoset materials may include, but are not limited to, condensation polyimides, addition polyimides, epoxy cured with aliphatic and/or aromatic amines, and/or anhydrides, cyanate esters, phenolics, polyesters, polybenzoxazine, polyurethanes, polyacrylates, polymethacrylates, silicones (thermoset), and combinations thereof. The metal plating layer 278 may be formed from any platable metallic material, such as, but not limited to, nickel, cobalt, copper, iron, gold, silver, palladium, rhodium, chromium, zinc, tin, cadmium, and alloys with any of the foregoing elements comprising at least 50 wt. % of the alloy, and combinations thereof.

The plated fastener holes 272 may be configured to accept fasteners of various types such as, but not limited to, bolts, rivets, screws, studs, or nuts. In this regard, the walls of the plated fastener hole 272 may be smooth or threaded depending on the type of fastener it is designed to receive. In addition, depending on the application, the plated fastener hole 272 may be various types of holes such as, but not limited to, a plated simple through hole 285 (FIG. 37), a plated counter-bored hole 288 (FIG. 38), or a plated countersunk hole 290 (FIG. 39).

Referring now to FIG. 37, the plated simple through hole 285 may consist of a simple through hole 292 having one or more metal plating layers 278 deposited on its interior walls and at least a portion of the outer surfaces 293 of the polymeric substrate 274. The plated simple through hole 285 may also have fillet radii 295 formed on its upper lip and its lower lip, as shown. The fillet radii 295 may have a minimum radius of about 0.025 inches (about 0.635 mm) and a maximum radius of about 20% of the diameter of the simple through hole 292. A maximum radius of about 20% of the diameter of the simple through hole 292 may ensure that the fastener maintains sufficient bearing area on the plated polymeric substrate 270. To accommodate the thickness of the metal plating layer 278, the diameter ($d_2$) of the simple through hole 292 may be the final desired through-hole diameter (determined according to the diameter of the fastener) plus two times the thickness of the metal plating layer 278.

Figure 38:
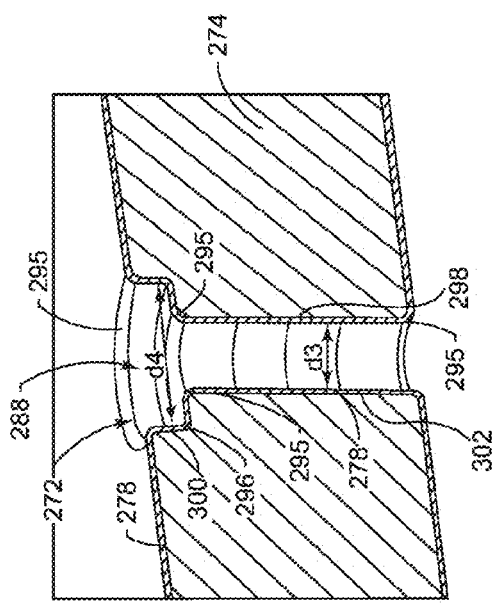
FIG. 38 is a cross-sectional view similar to FIG. 37, but with the plated fastener hole being a counter-bored hole, constructed in accordance with the present disclosure.

FIG. 38 shows a plated counter-bored hole 288. The plated counter-bored hole 288 may consist of a counter-bored hole 298 having one or more metal plating layers 278 deposited on its inner walls and at least a portion of the outer surfaces 293 of the polymeric substrate 274. The counter-bored hole 298 may have a counter-bored region 300, configured to receive a fastener head, and a simple through hole region 302. The counter-bored hole 298 may also have fillet radii 295 which may also include interior fillet radii 296 near the bottom of the counter-bored region 300, as shown. The fillet radii 295 may have a minimum radius of about 0.025 inches (about 0.635 mm) and a maximum radius of about 20% of the diameter of the simple through hole region 302. The diameter ($d_3$) of the simple through hole region 302 may be equal to the final desired through-hole diameter (determined according to the dimensions of the fastener of interest) plus two times the thickness of the metal plating layer 278. To provide sufficient clearance for the fastener head, the diameter ($d_4$) of the counter-bored region 300 may be equal to the final desired diameter of the counter-bored region 300 (determined according to the diameter of the fastener head) plus twice the thickness of the metal plating layer 278 plus twice the thickness of the interior fillet radii 296.

Figure 39:
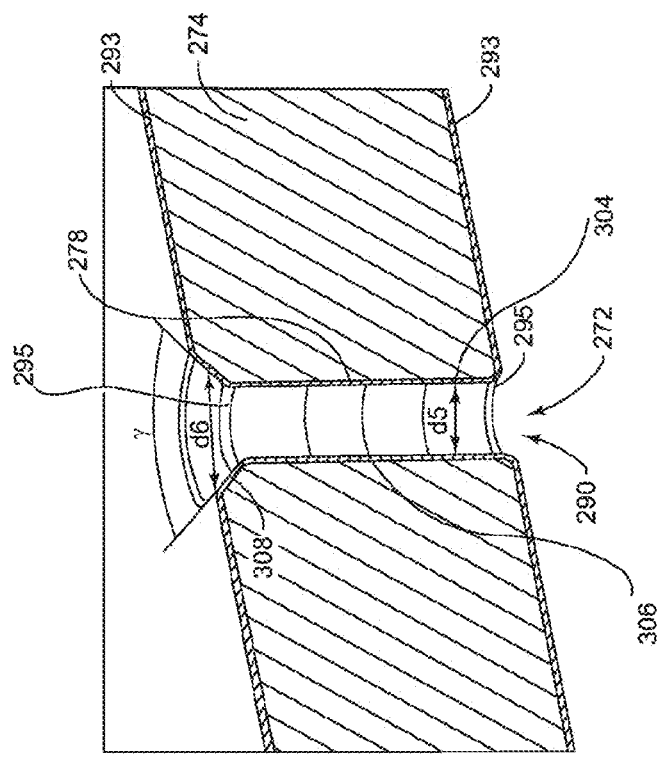
FIG. 39 is a cross-sectional view similar to FIG. 37, but with the plated fastener hole being a countersunk hole, constructed in accordance with the present disclosure.

A plated countersunk hole 290 is shown in FIG. 39. It may consist of a countersunk hole 304 plated on its interior walls with one or more metal plating layers 278. The metal plating layer 278 may extend to and contact at least a portion of the outer surfaces 293 of the polymeric substrate 274. The countersunk hole 290 may have a simple through-hole region 306 and a countersunk region 308 which may have a countersunk angle γ, as shown. In addition, the countersunk hole 304 may have fillet radii 295, as shown. The fillet radii 295 may have a minimum radius of about 0.025 inches (about 0.635 mm) and a maximum radius of 20% of the diameter of the simple through hole region 306. The diameter ($d_5$) of the simple through hole region 306 may be equal to the final desired through-hole diameter (determined according to the dimensions of the fastener) plus two times the thickness of the metal plating layer 278. To provide sufficient clearance for the fastener head, the diameter ($d_6$) of the counter sunk region 308 may be determined by equation (1) below which takes into account the desired countersunk diameter (determined by the dimensions of the fastener head, the thickness of the metal plating layer 278, and the countersunk angle γ.

$$d_6 = \text{(desired countersunk diameter)} + 2\text{(metal plating layer thickness)}/\sin(90 - 0.5*\gamma) \quad (1)$$

As can be appreciated, plated fastener hole configurations beyond those shown and described above also fall within the scope of this disclosure. Also, these plated-hole configurations can be combined, as necessary to perform additional functions. For example, a plated hole can incorporate a countersunk on one side and a counterbored hole on the other side to accommodate a countersunk screw with a sunk nut (in the counterbore).

If electrolytic plating methods are used to deposit the metal plating layer 278, the thickness of the metal plating layer 278 may be greater near the hole openings, where there is greater current density, and thinner near the centers of the holes, where there is less current density. This trend may increase with decreasing diameters of the fastener holes (smaller holes) and may be less dramatic or non-existent with larger holes. To remedy undesired non-uniform plating in smaller fastener holes, the walls of the fastener holes 276 may be curved to compensate for the current density gradient and control the thickness of the metal plating layer 278 as shown in FIGS. 40 and 41. The degree of wall curvature may be adjusted to provide desirable outcomes such as a straight metal plating layer (FIG. 40) or a uniform metal plating layer (FIG. 41).

Figure 42:
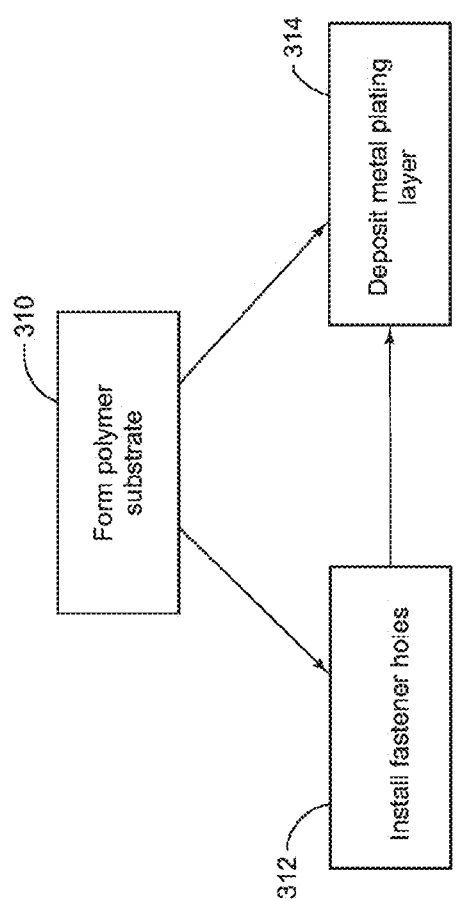
FIG. 42 is a flowchart illustrating steps involved in the fabrication of the plated polymeric component with the plated fastener holes, in accordance with a method of the present disclosure.

A method for fabricating the plated polymeric component 270 with one or more plated fastener holes 272 is illustrated in FIG. 42. Beginning with a first block 310, the polymeric substrate 274 may be formed in a desired shape from the thermoplastic or the thermoset materials described above with optional reinforcement. It may be formed in the desired shape using polymer molding processes apparent to those skilled in the art such as, but not limited to, injection molding, compression molding, blow molding, additive manufacturing (liquid bed, powder bed, deposition processes), or composite layup (autoclave, compression, or liquid molding). In some cases, one or more fastener holes 276 may be directly formed in the body of the polymeric substrate 274 during its formation (block 310), and in other cases, the fastener holes 276 may be separately introduced by a block 312 after formation of the polymeric substrate. The block 312 may involve installing the fastener holes 276 by post-machining processes, drilling, etching, or other method selected by a skilled artisan. Depending on the type of fastener holes employed (simple through hole, countersunk hole, countersunk holes, etc.), the diameters of the fastener holes may be constructed to provide sufficient clearance for the fastener/fastener head by taking into account the anticipated metal plating layer thickness as well as other factors (e.g., fillet radii or countersunk angles) when relevant, as described above. The diameters of the fastener holes 276 may be as small as about 1/16 inch if electrolytic deposition of the metal plating layer is used or about 1/32 inch if electroless plating is used. In addition, as described above, curvature may optionally be introduced into the walls of the fastener holes 276 to control electrolytic deposition of the metal plating layer(s) 278 over the walls of the fastener holes 276.

Following the block 310 (or the block 312), one or more metal plating layer(s) 278 may be deposited over the exposed surfaces of the polymeric substrate 274 (including the walls of the fastener holes 276) according to a next block 314. Alternatively, masking techniques may be employed to limit the deposition of the metal plating layer(s) 278 to just the walls of the fastener holes 276 and portions of the outer surfaces 293 surrounding the fastener holes 276, as will be understood by those skilled in the art. Deposition of the metal plating layer(s) 278 may be achieved using metal deposition techniques apparent to those of ordinary skill in the art such as, but not limited to, electroless plating, electroplating, and electroforming, after having suitably activated and metallized the relevant surfaces of the polymer substrate using established techniques in the industry. Electroless plating may be preferred to avoid localized buildup of the metal plating layer(s) 278. However, if electrolytic plating is used for metal plating layer deposition in fastener holes with an aspect ratio (depth/diameter) about greater than two, supplemental or conformal anodes may be employed to improve the uniformity of the metal plating layer thickness through the fastener holes, as will be understood by those skilled in the art.

From the foregoing, it can therefore be seen that the present disclosure can find industrial applicability in many situations, including, but not limited to, situations requiring robust fastener holes in lightweight polymeric components. The plated fastener holes as disclosed herein may exhibit improved damage resistance, improved wear tolerance, and a reduced tendency to pullout or cracking of the edges of the polymeric component. Furthermore, the improved structural resilience of the fastener holes may allow them to be positioned at a decreased fastener edge distance from the edges of the polymeric component, thereby increasing the versatility of fastener holes in polymeric materials. The plated fastener holes as disclosed herein may find wide industrial applicability in a wide range of areas such as, but not limited to, aerospace, automotive, and construction industries.

Plated Polymeric Threads

Threaded fasteners such as screws, bolts, nuts, and studs are widely used in many applications for the assembly of various structures. For example, they are widely used in gas turbine engines, automotive applications, and space applications. Traditional threaded fasteners are formed from high-strength and heavy metallic materials. However, in some weight-sensitive applications which require large numbers of threaded fasteners, the heavy metallic materials can lead to the accumulation of undesirable weight. While polymeric threaded fasteners may be a lighter-weight option, polymeric components, by themselves, may be less structurally resilient than similarly-dimensioned metallic components. Clearly, there is a need to develop high-strength and lightweight threaded fasteners for weight-sensitive applications.

Figure 44:
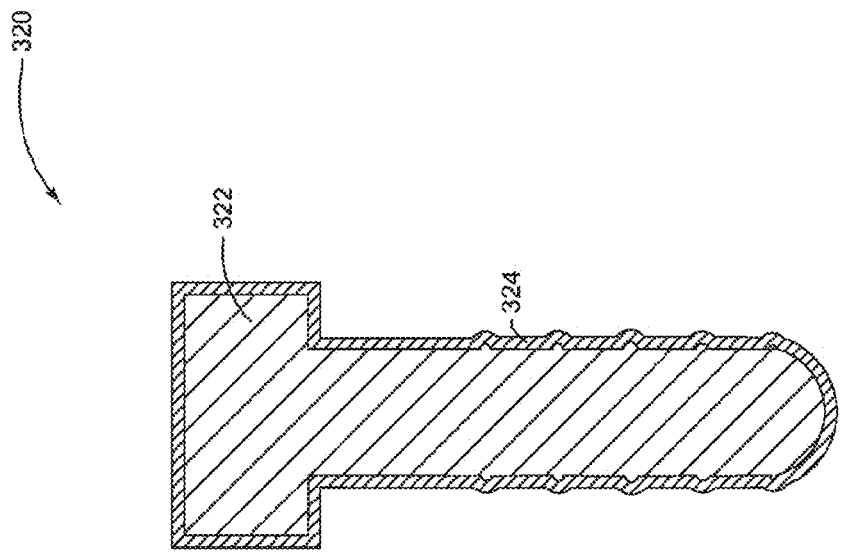
FIG. 44 is a cross-sectional view of the plated polymeric threaded fastener of FIG. 43 taken along the line 44-44 of FIG. 43, constructed in accordance with the present disclosure.
Figure 43:
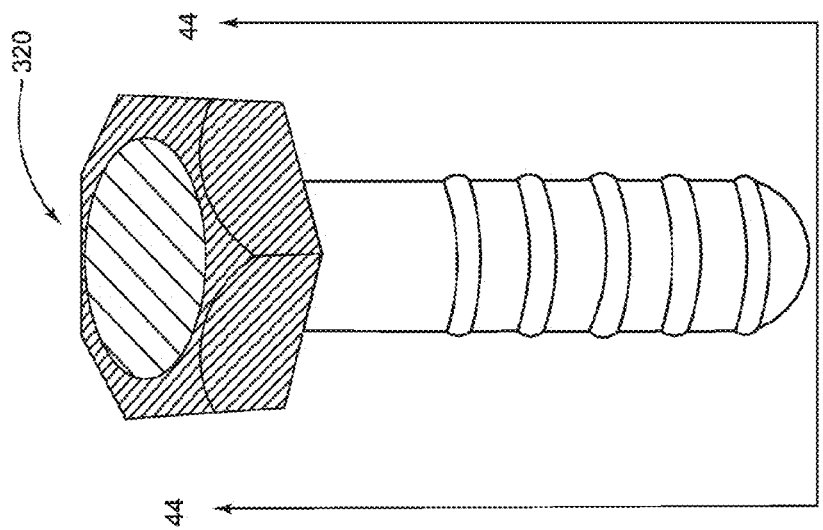
FIG. 43 is a perspective view of a plated polymeric threaded fastener, constructed in accordance with the present disclosure.

Referring now to FIGS. 43 and 44, a plated polymeric threaded fastener 320 is shown. The plated polymeric threaded fastener 320 may have a core formed from a polymeric substrate 322. It may also have one or more metal plating layers 324 deposited on the external surfaces of the polymer substrate 322, as best shown in FIG. 44. By virtue of its plated-polymer construction, the plated polymeric fastener 320 may be lightweight and exhibit high structural strength. More specifically, the polymeric substrate core may be lightweight, while the metal plating layer(s) 324 may impart the fastener with desired high-strength properties. Accordingly, the use of the plated polymeric fastener 320 may be particularly beneficial in weight-sensitive applications such as, but not limited to, gas turbine, automotive, and aerospace applications. The threaded fastener 320 may be any type of threaded fastener such as, but not limited to, screws, nuts, bolts, studs, or other threaded components, and it may have any size and dimension suitable for its intended use.

The polymeric substrate 322 may consist of a thermoplastic material or a thermoset material. Suitable thermoplastic materials may include, but are not limited to, polyetherimide (PEI), thermoplastic polyimide, polyether ether ketone (PEEK), polyether ketone ketone (PEKK), polysulfone, polyamide, polyphenylene sulfide, polyester, polyimide, or combinations thereof. Suitable thermoset materials may include, but are not limited to, condensation polyimides, addition polyimides, epoxy cured with aliphatic and/or aromatic amines and/or anhydrides, cyanate esters, phenolics, polyesters, polybenzoxazine, polyurethanes, polyacrylates, polymethacrylates, silicones (thermoset), or combinations thereof. In addition, the thermoplastic materials or the thermoset materials may be optionally reinforced with reinforcing materials, such as, but not limited to, carbon or glass. The polymeric substrate fastener head, diameter, and thread geometry must be undersized to account for the thickness of the plating layer. The undersize must account for the plating layer thickness as well as the desired final fastener dimensions for the end use application.

The metal plating layer 324 may be formed from any platable metallic material, such as, but not limited to, nickel, copper, silver, cobalt, iron, gold, palladium, rhodium, chromium, zinc, tin, cadmium, nickel-phosphorous alloys, nickel-boron alloys, nickel-tungsten alloys, and alloys with any of the foregoing elements comprising at least 50 wt. % of the alloy, and combinations thereof. The thickness of the metal plating layer 324 may vary locally from about 0.0001 inches (about 0.0025 mm) to about 0.030 inches (about 0.762 mm). The average thickness of the metal plating layer 324 may be in the range of about 0.0001 inches (about 0.0025 mm) to about 0.010 inches (about 0.254 mm), but other metal plating layer thickness may also apply depending on the application. Application of the metal plating layer thickness will bring the substrate geometry to the final desired fastener shape.

Figure 45:
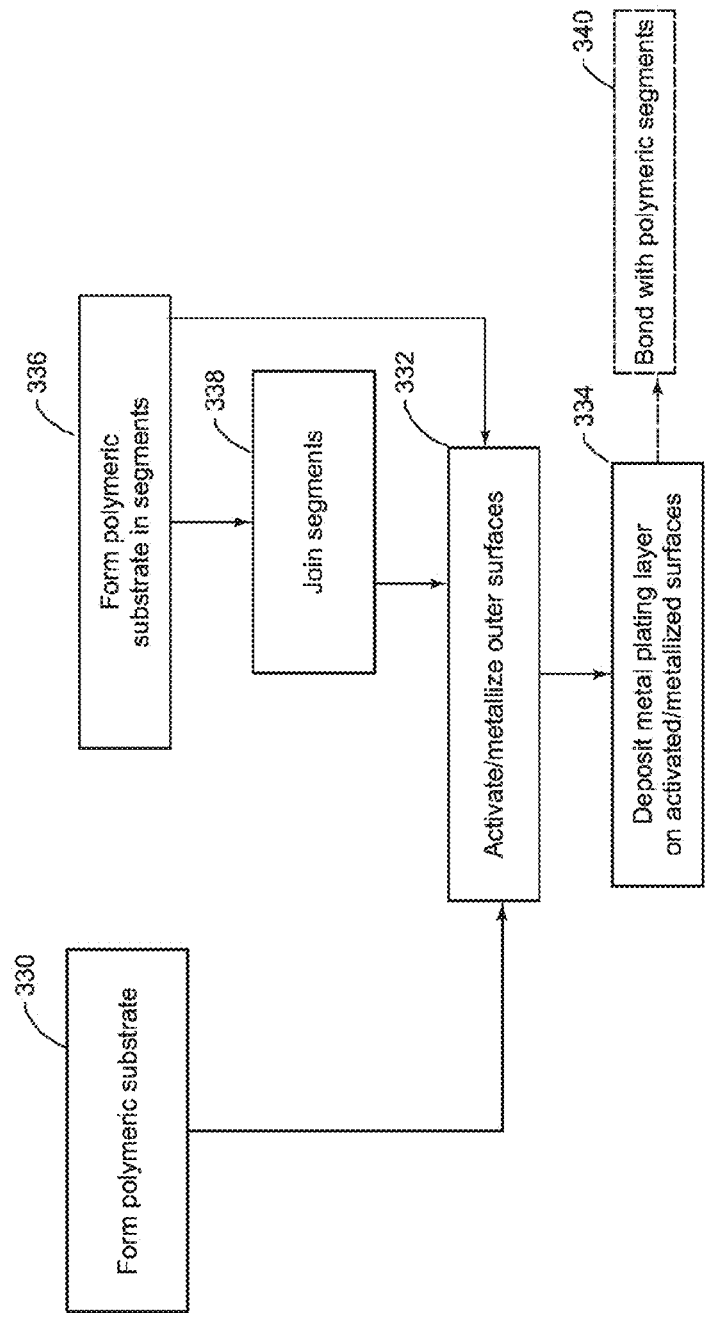
FIG. 45 is a flowchart illustrating methods involved in the fabrication of the plated polymeric threaded fastener, in accordance with a method of the present disclosure.

FIG. 45 illustrates methods which may be used to fabricate the plated polymeric threaded fastener 320. Beginning with a block 330, the polymeric substrate 322 may be formed in a desired fastener shape (e.g., a bolt, a screw, etc.) from selected polymeric materials which may include the thermoplastic materials or thermoset materials described above with optional reinforcement. The desired fastener shape may be formed using a range of polymer molding processes apparent to those skilled in the art such as, but not limited to, injection molding, compression molding, blow molding, additive manufacturing (liquid bed, powder bed, deposition processes), or composite layup (autoclave, compression, or liquid molding). Following the block 330, the external surfaces of the polymer substrate 322 may be suitably activated and metallized according to a next block 332, as shown. Surface activation and metallization of the polymer substrate 322 may be performed using well-established techniques in the industry and may result in a metallic (or conductive) surface being formed on the external surfaces of the polymer substrate 322, thereby allowing the subsequent deposition of one or more metal plating layers 324 thereon.

Subsequent to the block 332, one or more metal plating layers 324 may be deposited on the activated and metallized surfaces of the polymeric substrate 322 according to a next block 334. Deposition of the metal plating layer(s) 324 may be achieved using a metal deposition method apparent to those skilled in the art such as, but not limited to, electroplating, electroless plating, or electroforming. For the deposition of the metal plating layer(s) 324 on finer thread pitches, electroless plating may be used. In addition, deposition of the metal plating layer(s) 324 may be performed in multiple steps by masking certain areas of the polymer substrate 322 to yield different thicknesses (or no plating) in areas of interest, as will be understood by those having ordinary skill in the art. Customization of the thickness of the metal plating layer(s) 324 may also be achieved using tailored racking tools apparent to those skilled in the art such as, but not limited to, shields, thieves, and conformal anodes. Customization of the thickness of the metal plating layer(s) 324 in different areas of the fastener with masking and/or tailored racking tools may allow for the optimization of properties such as structural support and surface characteristics, but without adding undue weight to the fastener to accommodate each desired property. Upon completion of the block 334, the plated polymeric threaded fastener 320 may be provided.

As an alternative strategy to fabricate the plated polymeric threaded fastener 320, the polymeric substrate 322 may be formed in two or more segments according to a block 336, as shown. Each of the segments may be formed in a desired shape from the thermoplastic or thermoset materials described above with optional reinforcement using conventional polymer molding processes, as described above for the block 330. According to a next block 338, the formed segments may be joined using conventional processes to provide the complete polymeric substrate 322 in the shape of the desired threaded fastener. Joining of the segments may be achieved using conventional joining processes apparent to those skilled in the art such as, but not limited to, welding processes (e.g., ultrasonic, laser, friction, friction-stir, traditional), adhesive bonding, or mitered joints (with or without adhesive). The external surfaces of the polymer substrate 322 formed by the block 338 may then be suitably activated and metallized according to the block 332, as described above. One or more metal plating layers 324 may then be deposited on the activated and metallized surfaces of the polymer substrate according to the block 334, as described above. Masking and/or tailored racking techniques may also be employed to selectively customize the thickness of the metal plating layer(s) 324, if desired. Upon completion of the block 334, the plated polymeric threaded fastener 320 may be provided.

As another alternative fabrication method to form the plated polymeric threaded fastener 320, the external surfaces of the polymeric segments formed by the block 336 may each be individually activated and metallized according to the block 332. One or more metal plating layers 324 may then be deposited on the metallized surfaces of each of the polymeric segments according to the block 334, as described above. The plated polymeric segments formed by the block 334 may then be bonded together to provide the full-length plated polymeric threaded fastener 320 according to the block 340, as shown. Bonding of the plated polymeric segments may be achieved using transient liquid phase (TLP) bonding, as will be understood by those skilled in the art.

From the foregoing, it can therefore be seen that the plated polymeric threaded fastener as disclosed herein may find industrial applicability in many situations such as, but not limited to, situations requiring lightweight and high-strength fasteners. The plated polymeric threaded fasteners may be formed from a readily moldable and lightweight polymeric core which may be plated on its external surfaces with one or more high-strength metal plating layers. Accordingly, the plated polymeric threaded fasteners as disclosed herein may offer lightweight alternatives for traditional heavier all-metallic fasteners, without substantially compromising the strength of the fastener. It is expected that the technology as disclosed herein may find wide industrial applicability in a wide range of areas such as, but not limited to, automotive industries, aerospace industries, sporting industries, and toy industries.

Plated Polymeric Brackets

Brackets are commonly made from sheet metal that is formed, bent, drilled, and/or machined to provide clamping structures that support various components (e.g., hoses, tubes, etc.) in various configurations on support structures, such as gas turbine engines. The brackets may have a deformable clamp portion for accommodating the dimensions of the tube or hose and a base portion for anchoring the clamp portion and the component to the support structure. However, the sheet metal material used to form the brackets may be heavy and may contribute undesired weight in weight-sensitive applications. In addition, due to the variety of support configurations required for different applications, the bracket structures may be individually designed and fabricated for each use. As current processes for bending, forming, welding, and machining sheet metal in desired configurations can be costly, such bracket design customization may lead to excess manufacturing costs. Clearly, there is a need for lighter-weight and lower-cost bracket designs.

Referring now to FIGS. 46 and 47, a plated polymeric bracket 350 is shown. It may be employed for supporting cylindrical structures such as hoses or tubes on a support surface 351, as shown. The plated polymeric bracket 350 may consist of a clamp portion 352 configured to clamp the cylindrical structure. The clamp portion 352 may be deformable such that it may be deformed into one or more open positions 353 to allow the insertion of the cylindrical structure. The plated polymeric bracket 350 may further consist of a base portion 355 configured to attach to the support surface 351, as best shown in FIG. 46. The base portion 355 may have one or more apertures 357 for bolting the plated polymeric bracket 350 to the support surface, or the base portion 355 may be configured to attach to the support surface 351 by another method.

As best shown in FIG. 47, the plated polymeric bracket 350 may consist of polymeric substrate 360 plated on its outer surfaces with one or more metal plating layers 362. As most of the material composition of the plated polymeric bracket 350 may consist of the polymeric substrate 360, the plated polymeric bracket 350 may be substantially lighter in weight than similarly dimensioned all-metallic brackets. In addition, the metal plating layer(s) 362 may impart the plated polymeric bracket 350 with increased structural resilience.

The polymer substrate 360 may consist of a thermoplastic material or a thermoset material. Suitable thermoplastic materials may include, but are not limited to, polyetherimide (PEI), thermoplastic polyimide, polyether ether ketone (PEEK), polyether ketone ketone (PEKK), polysulfone, polyamide, polyphenylene sulfide, polyester, polyimide, or combinations thereof. Suitable thermoset materials may include, but are not limited to, condensation polyimides, addition polyimides, epoxy cured with aliphatic and/or aromatic amines and/or anhydrides, cyanate esters, phenolics, polyesters, polybenzoxazine, polyurethanes, polyacrylates, polymethacrylates, silicones (thermoset), or combinations thereof. In addition, the thermoplastic materials or the thermoset materials may be optionally reinforced with reinforcing materials such as, but not limited to, carbon or glass.

The metal plating layer 362 may be formed from any platable metallic material, such as, but not limited to, nickel, cobalt, copper, iron, gold, silver, palladium, rhodium, chromium, zinc, tin, cadmium, and alloys with any of the foregoing elements comprising at least 50 wt. % of the alloy, and combinations thereof. Local thicknesses of the metal plating layer 362 may vary from about 0.001 (about 0.025 mm) inches to about 0.025 inches (about 0.635 mm), locally. The average thickness of the metal plating layer 364 may be in the range of about 0.003 inches (about 0.076 mm) to about 0.020 inches (about 0.51 mm), but other thicknesses may also apply depending on the application. This range of metal plating layer thicknesses may provide resistance to erosion, impact, and foreign-object damage. The thickness range may also provide the option to finish the surfaces of the plated polymeric bracket 350 to meet tolerances and/or surface finish requirements.

As an alternative arrangement, the polymeric substrate 360 may be formed from two or more polymeric building blocks 365 which may be assembled in a customized configuration suitable to the support requirements at hand, as shown in FIG. 48. This modular assembly arrangement may reduce costs for manufacturing separate bracket structures for each support requirement. Once assembled in the desired configuration, the building blocks 365 may be locked in position and plated over with one or more metal plating layers 362 to provide the bracket with additional strength. More specifically, the polymeric substrate 360 may be formed in two building blocks 365 including a polymeric clamp portion 368 and a polymeric base portion 370, as shown in FIG. 48. The polymeric clamp portion 368 may have one or more protrusions 372 extending from its bottom surface 373 which may be configured to connect to one or more compatible apertures 374 formed in the body of the polymeric base portion 370. In this way, the position of the polymeric clamp portion 368 with respect to the polymeric base portion 370 may be adjusted by inserting the protrusion(s) 372 in the selected aperture(s) 374 to customize the bracket structure according to the needs at hand.

The protrusion(s) 372 and the apertures 374 may have a variety of compatible geometrical shapes such as, but not limited to, cylindrical, rectangular, square, hexagonal, or other geometrical shapes. Once assembled in the desired configuration, the polymeric clamp portion 368 and the polymeric base portion 370 may be joined or locked in position by different methods such as a snap-lock fit or press fit between the protrusion 372 and the aperture 374 or by adhesive bonding. The assembled bracket structure may then be plated over with one or more metal plating layers 362 to provide added strength.

Alternatively, the building blocks 365 may be assembled by a slotted connection, as shown in FIG. 49. More specifically, the polymeric clamp portion 368 may have a rectangular protrusion (or protrusions) 376 extending from its bottom surface 373 and the rectangular protrusion 376 may be configured to insert in a compatible slot (or slots) 378 formed in the body of the polymeric base portion 370. The polymeric clamp portion 368 may be slid in the slot 378 to adjust the positioning of the polymeric clamp portion 368 with respect to the polymeric base portion 370 to customize the bracket configuration according to the support requirements. Once adjusted in the desired configuration, the polymeric clamp portion 368 and the polymeric base portion 370 may be joined or locked in position by a snap-lock fit or press fit between the rectangular protrusion 376 and the slot 378, or they may be joined by adhesive bonding. The assembled polymeric bracket structure may then be plated over with one or more metal plating layers 362.

As an alternative building block connection arrangement, the polymeric building blocks 365 may be configured to connect with one or more threaded fasteners 379, as shown in FIG. 50. More specifically, the protrusion 372 extending from the polymeric clamp portion 368 may be threaded so that the polymeric clamp portion 368 may be joined with the polymeric base portion 370 in the desired configuration using a threaded fastener 379.

Methods which may be used to fabricate the plated polymeric bracket as a single unit or by the assembly of polymeric building blocks are illustrated in FIG. 51. To fabricate the plated polymeric bracket 350 as a single unit (see FIGS. 46-47), the polymeric substrate 360 may first be formed in a desired bracket shape according to a block 385, as shown. The polymer substrate 360 may be formed from thermoplastic materials or thermoset materials with optional reinforcement, as described above. It may be formed in the desired bracket shape using a range of polymer molding processes apparent to those skilled in the art such as, but not limited to, injection molding, compression molding, blow molding, additive manufacturing (liquid bed, powder, bed, deposition processes), or composite layup (autoclave, compression, or liquid molding).

Following the block 385, the surfaces of the formed polymeric substrate 360 may be suitably activated and metallized according to a next block 388, as shown. Surface activation and metallization of the polymer substrate 360 may be performed using well-established techniques in the industry and may result in a metallic (or conductive) surface being formed on the external surfaces of the polymeric substrate 360, thereby allowing the subsequent deposition of one or more metal plating layers 362 thereon. According to a next block 390, the deposition of one or more metal plating layers 362 on the activated/metallized surfaces of the polymeric substrate 360 may be performed. Deposition of the metal plating layer(s) 362 may be achieved using a metal deposition method apparent to those skilled in the art, such as, but not limited to, electroplating, electroless plating, or electroforming. In addition, the thickness of the metal plating layer(s) 362 may be adjusted during the block 390 to provide the bracket with desired surface properties such as, but not limited to, erosion resistance, impact resistance, and resistance against foreign-object damage. Following the block 390, the plated polymeric bracket 350 may be provided.

As an alternative fabrication method, the polymeric substrate may first be formed in two or more polymeric building blocks 365 (e.g., the polymeric clamp portion 368 and the polymeric base portion 370) according to a block 392. The polymeric building blocks 365 may be formed from thermoplastic materials or thermoset materials with optional reinforcement, as described above. In addition, forming of the polymeric building blocks 365 in a desired shape may be achieved using the polymer molding processes described above (i.e., injection molding, compression molding, blow molding, additive manufacturing, composite layup, etc.). The polymeric building blocks 365 may then be assembled and joined together in a customized bracket configuration according to a next block 394, as shown. For example, the polymeric building blocks 365 may be assembled using a compatible connection between one or more protrusions 372 on one polymeric building block 365 and one or more recesses 374 formed on another polymeric building block 365 (see FIGS. 48 and 50). Alternatively, they may be assembled by a slotted connection (see FIG. 49). The assembled polymeric building blocks 365 may then be joined or locked in the desired configuration by a snap-lock or press fit, adhesive bonding, or by a threaded fastener (see FIG. 50). Following the block 394, the polymeric substrate having a customized bracket configuration may be provided. The surfaces of the customized polymer substrate may then be suitably activated and metallized according to the block 388, as described above. One or more metal plating layers 362 may then be deposited on the activated/metallized surfaces of the customized polymer substrate according to the block 390, as described above, thereby providing the plated polymeric bracket.

From the foregoing, it can therefore be seen that the plated polymeric brackets as disclosed herein may find industrial applicability in many situations such as, but not limited to, situations requiring lightweight and high-strength brackets. In addition, the plated polymeric brackets may be assembled in a customized bracket configuration from polymeric building blocks to provide advantageous reductions in manufacturing costs for brackets. The technology as disclosed herein may find wide industrial applicability in a wide range of areas such as, but not limited to, automotive and aerospace industries.

Lightweight High-Strength Super-Polished Article

High-strength and lightweight components with very smooth surfaces are desirable for many applications such as aerospace, sporting, and automotive applications to reduce aerodynamic drag. Metallic components are high in strength and can be polished to a desirable smoothness suitable for minimizing drag, but metallic components tend to be heavy. In contrast, polymeric components are lightweight, but may be relatively weak compared with similarly-dimensioned metallic materials and usually cannot be polished to low surface roughnesses suitable for minimizing drag. Coatings may be applied over the surfaces of polymeric components to reduce surface roughness. However, such coatings usually cannot achieve the same degree of smoothness as many polished metallic components. Clearly, there is a need for lightweight and high-strength articles that can be polished to low surface roughnesses.

Figure 53:
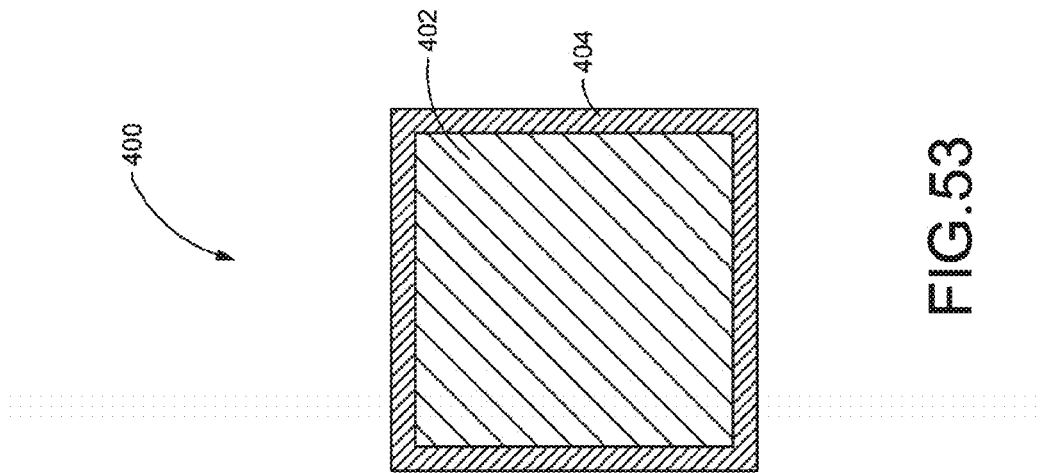
FIG. 53 is a cross-sectional view of the polished plated polymeric article of FIG. 52 taken along the line 53-53 of FIG. 52, constructed in accordance with the present disclosure.
Figure 52:
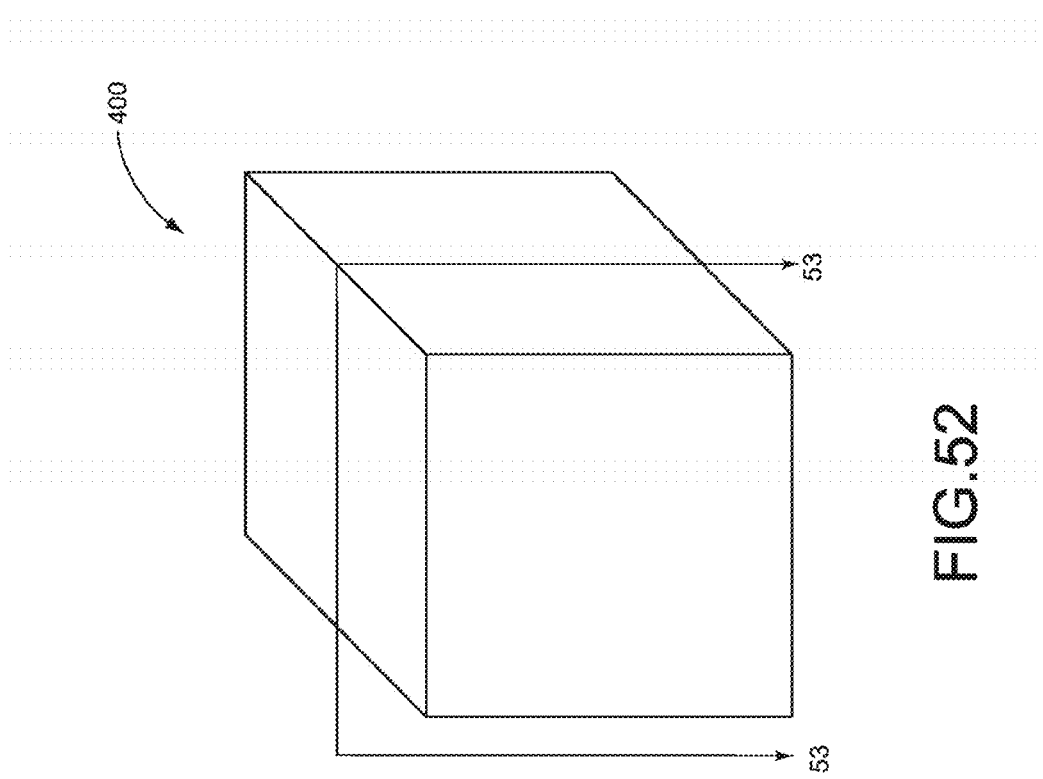
FIG. 52 is a perspective view of a polished plated polymeric article, constructed in accordance with the present disclosure.

Referring now to FIGS. 52 and 53, a polished plated polymeric article 400 is shown. The polished plated polymeric article 400 may be a component for use in a range of applications such as, but not limited to, aerospace, automotive, and sporting applications. As can be appreciated, it may have any structure suitable for its intended use and, in practice, may have a structure which deviates substantially from the exemplary box-like structure depicted. Importantly, the polished plated polymeric article 400 may be lightweight and high in structural strength. Furthermore, its outer surfaces may be super-polished and exhibit a smoothness suitable for minimizing drag in aerodynamic applications (e.g., aerospace, automotive, etc.).

The polished plated polymeric article 400 may consist of a polymeric substrate 402 at its core, as best shown in FIG. 53. Furthermore, the surfaces of the polymeric substrate 402 may be plated with one or more metal plating layers 404. As most of the material composition of the polished plated polymeric article 400 may consist of the polymer substrate 402, the polished plated polymeric article 400 may be substantially lighter in weight than similarly-dimensioned all-metallic components. In addition, the metal plating layer(s) 404 on the surface of the part may impart the article with increased structural resilience while allowing the outer surfaces of the article to be polished to a low surface roughness.

The polymer substrate 402 may consist of a thermoplastic material or a thermoset material. Suitable thermoplastic materials may include, but are not limited to, polyetherimide (PEI), thermoplastic polyimide, polyether ether ketone (PEEK), polyether ketone ketone (PEKK), polysulfone, polyamide, polyphenylene sulfide, polyester, polyimide, or combinations thereof. Suitable thermoset materials may include, but are not limited to, condensation polyimides, addition polyimides, epoxy cured with aliphatic and/or aromatic amines and/or anhydrides, cyanate esters, phenolics, polyesters, polybenzoxazine, polyurethanes, polyacrylates, polymethacrylates, silicones (thermoset), or combinations thereof. In addition, the thermoplastic materials or the thermoset materials may be optionally reinforced with reinforcing materials, such as, but not limited to, carbon or glass. The thickness of the polymer substrate 402 may vary depending on the polymer molding process used in its formation. For example, if the polymer substrate 402 is formed by injection molding, its thickness may be in the range of about 0.05 inches (about 1.3 mm) to about 0.25 inches (about 6.4 mm), with localized areas ranging up to about 0.5 inches (about 13 mm). However, if it is formed by compression molding, it may have a thickness in the range of about 0.05 inches (about 1.3 mm) to about two inches (about 51 mm).

The metal plating layer 404 may be formed from any platable metallic material, such as, but not limited to, nickel, cobalt, copper, iron, gold, silver, palladium, rhodium, chromium, zinc, tin, cadmium, and alloys with any of the foregoing elements comprising at least 50 wt. % of the alloy, and combinations thereof. Local thicknesses of the metal plating layer 404 may vary from about 0.001 (about 0.025 mm) inches to about 0.050 inches (about 1.3 mm). The average thickness of the metal plating layer 364 may be in the range of about 0.004 inches (about 0.1 mm) to about 0.04 inches (about 1 mm), but other thicknesses may also apply depending on the application. This range of metal plating layer thicknesses may provide resistance to erosion, impact, and foreign-object damage. The thickness range may also provide the option to finish the surfaces of the polished plated polymeric article 400 to meet tolerances and/or surface finish requirements. Furthermore, the outer surfaces of the metal plating layer 404 may be polished to a low surface roughness using conventional surface polishing processes apparent to those skilled in the art such as, but not limited to, grinding, lapping, honing, abrasive-flow machining, micromachining methods, or other surface polishing techniques selected by a skilled artisan.

Figure 54:
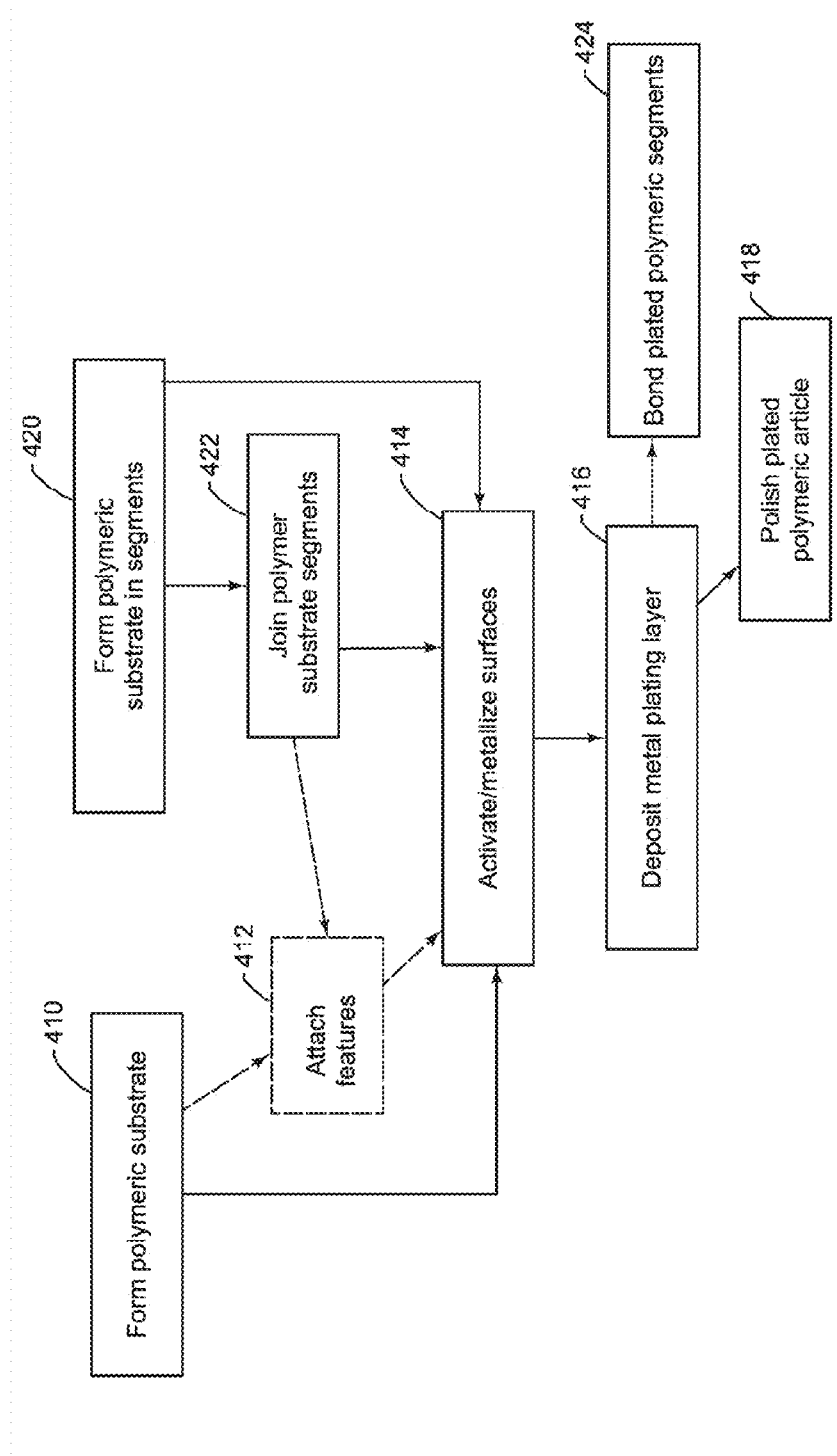
FIG. 54 is a flowchart illustrating methods for the fabrication of the polished plated polymeric article, in accordance with methods of the present disclosure.

Methods which may be used to fabricate the polished plated polymeric article 400 are illustrated in FIG. 54. Beginning with a first block 410, the polymer substrate 402 may be formed in a desired shape from thermoplastic or thermoset materials with optional reinforcement, as described above. It may be molded in the desired shape using polymer molding processes apparent to those skilled in the art such as, but not limited to, injection molding, compression molding, blow molding, additive manufacturing (liquid bed, powder bed, deposition processes), or composite layup (autoclave, compression, or liquid molding). If desired, features such as flanges or bosses may be separately added to the formed polymeric substrate 402 with an adhesive or fastener, according to an optional block 412. The introduction of such features in a separate step may simplify the polymer mold tooling during the block 410.

Following the block 410 (or the optional block 412), the exposed surfaces of the polymer substrate 402 may be activated and metallized according to a next block 414, as shown. Surface activation and metallization of the polymer substrate 402 may be carried out using established procedures well-known in the industry and may result in a metallic (or conductive) surface being formed on the external surfaces of the polymer substrate 402, thereby allowing the subsequent deposition of one or more metal plating layers 404 thereon. One or more metal plating layers 404 may then be deposited on the activated and metallized surfaces of the polymeric substrate 402 according to a next block 416. Deposition of the metal plating layer(s) 404 may be achieved using a metal deposition method apparent to those skilled in the art such as, but not limited to, electroplating, electroless plating, or electroforming. If desired, the thickness of the metal plating layer(s) 404 in different areas of the article may be customized using established masking techniques to yield different thicknesses (or no plating) in areas of interest. Likewise, tailored racking tools (e.g., shields, thieves, conformal anodes, etc.) may also be used to customize the thickness of the metal plating layer(s) 404 in different areas of the article, as will be understood by those skilled in the art. Customization of the thickness of the metal plating layer(s) 404 in different areas of the polished article 400 by masking and/or tailored racking may allow for the optimization of desired properties (e.g., structural support, erosion resistance, impact resistance, etc.) in targeted regions without adding undue weight to the part to completely accommodate each of the desired properties.

Subsequent to the block 416, the resulting plated polymeric article may be polished to provide the polished plated polymeric article 400, according to a block 418. Polishing may be achieved using conventional polishing methods apparent to those skilled in the art such as, but not limited to, grinding, lapping, honing, abrasive flow machining, or micromachining. If micromachining is employed, it may be performed using the surface finishing technology of MicroTek Finishing, LLP located in Hamilton, Ohio, or another micromachining process. Following surface polishing, the polished plated polymeric article 400 may exhibit a low surface roughness suitable for minimizing drag in aerodynamic applications.

As an alternative method for fabricating the polished plated polymeric article 400, the polymeric substrate 402 may be formed in two or more segments according to a block 420, as shown. The polymeric substrate segments may be formed from selected thermoplastic or thermoset materials (with optional reinforcement) using one or more of the polymer molding processes described above. As one possibility, the polymeric substrate segments may be subsequently joined to form the full-length polymeric substrate 402 according to a next block 422. Joining of the polymeric substrate segments may be achieved using conventional joining processes such as welding (e.g., ultrasonic, laser, friction, friction-stir, traditional, etc.), adhesive bonding, or mitered joints (with or without adhesive). If desired, additional features may then be attached to the polymeric substrate 402 according to the optional block 412, as described above. Following the block 422 (or the optional block 412), the surfaces of the formed polymer substrate 402 may then be suitably activated and metallized according to the block 414, as described above. Furthermore, one or more metal plating layers 404 may then be deposited on the activated/metallized surfaces of the polymer substrate 402 according to the block 416. The outer surfaces of the resulting plated polymeric article may then be polished according to the block 418, as described above.

As another possibility, the outer surfaces of each of the polymeric substrate segments formed by the block 420 may be activated and metallized (block 414) and subsequently plated with one or more metal plating layers 404 (block 416) to form two or more plated polymeric segments. Following the block 416, the plated polymeric segments may then be bonded together to form a complete plated polymeric article, according to a block 424, as shown. Bonding of the plated polymeric segments may be achieved using transient liquid phase (TLP) bonding, as will be understood by those skilled in the art. Following the block 424, the surfaces of the plated polymeric article may be polished to a desired smoothness according to the block 418, as described above.

From the foregoing, it can therefore be seen that the polished plated polymeric articles as disclosed herein may find industrial applicability in many situations such as, but not limited to, situations requiring high-strength and lightweight articles having super-polished surfaces to minimize drag. The polished plated polymeric articles have a lightweight core formed from a polymeric substrate and one or more outer metal plating layers on the surface of the polymeric substrate to increase the strength of the article. In addition, like metallic components, the outer metal plating layer(s) may be polished to a low surface roughness suitable for minimizing unwanted drag in aerodynamic applications. It is expected that the technology as disclosed herein may find wide industrial applicability in a wide range of areas such as, but not limited to, automotive, racing, sporting, and aerospace industries.

What is claimed is:

1. A plated tubular lattice structure, comprising:
   a backbone structure including
   a plurality of axial posts aligned in parallel, and
   a plurality of pyramidal structures extending laterally from the axial posts and connecting the axial posts at nodes; and
   a metal plating layer on an activated outer surface of the backbone structure; and
   a polymer coating an outer surface of the metal plating layer.

2. The plated tubular lattice structure of claim 1, wherein the backbone structure is formed from a composite of continuous fibers in a resin.

3. The plated tubular lattice structure of claim 2, wherein the continuous fibers are selected from the group consisting of carbon fibers, fiberglass, and aramid fibers.

4. The plated tubular lattice structure of claim 1, wherein the backbone structure is formed from a polymeric material.

5. The plated tubular lattice structure of claim 4, wherein the polymeric material includes a hollow center.

6. The plated tubular lattice structure of claim 4, wherein the polymeric material is a thermoplastic material selected from the group consisting of polyetherimide, thermoplastic polyimide, polyether ether ketone, polyether ketone ketone, polysulfone, polyamide, polyphenylene sulfide, polyester, polyimide, and combinations thereof.

7. The plated tubular lattice structure of claim 4, wherein the polymeric material is a thermoset material selected from the group consisting of a condensation polyimide, an addition polyimide, an epoxy cured with an aliphatic amine, an epoxy cured with an aromatic amine, an epoxy cured with an anhydride, a cyanate ester, a phenolic, a polyester, a polybenzoxazine, a polyurethane, a polyacrylate, a polymethacrylate, a thermoset silicone, and combinations thereof.

8. The plated tubular lattice structure of claim 1, wherein the backbone structure comprises a polymer substrate molded around a composite of continuous fibers in a resin.

9. A plated tubular lattice structure including a plurality of axial posts aligned in parallel and a plurality of pyramidal structures extending laterally from the axial posts and connecting the axial posts at nodes, the plated tubular lattice structure being fabricated by a method comprising:
   forming a backbone structure in a shape of the plated tubular lattice structure;
   activating and metallizing an outer surface of the backbone structure;
   depositing a metal plating layer on the activated/metallized outer surface of the backbone structure to provide the plated tubular lattice structure; and
   coating an outer surface of the plated tubular lattice structure with a polymer.

10. The plated tubular lattice structure of claim 9, wherein the metal plating layer includes a platable metallic material selected from the group consisting of nickel, cobalt, copper, iron, gold, silver, palladium, rhodium, chromium, zinc, tin, cadmium, an alloy of any of the foregoing comprising at least 50 wt. % of the alloy, and combinations thereof.

11. The plated tubular lattice structure of claim 10, wherein the metal plating layer has an average thickness in a range of 0.05 mm to 3.8 mm.

12. The plated tubular lattice structure of claim 9, wherein forming the backbone structure in the shape of the plated tubular lattice structure comprises molding the backbone structure from a polymeric material.

13. The plated tubular lattice structure of claim 12, wherein molding the backbone structure from the polymeric material is carried out by injection molding.

14. The plated tubular lattice structure of claim 9, wherein forming the backbone structure in the shape of the plated tubular lattice structure comprises forming the backbone structure from a composite of continuous fibers in a resin.

15. The plated tubular lattice structure of claim 14, wherein forming the backbone structure from the composite of continuous fibers in a resin comprises winding tows of the continuous fibers in the resin over a mandrel followed by removing the mandrel.

16. The plated tubular lattice structure of claim 14, further comprising molding a polymer substrate around the backbone structure.

17. A method for fabricating a plated tubular lattice structure, comprising:
   forming a backbone structure having a plurality of axial posts aligned in parallel and a plurality of pyramidal structures extending laterally from the axial posts and connecting the axial posts at nodes;
   activating and metallizing an outer surface of the backbone structure; and
   depositing a metal plating layer on the activated/metallized outer surface of the backbone structure to provide the plated tubular lattice structure; and
   coating an outer surface of the plated tubular lattice structure with a polymer.

18. The method of claim 17, wherein forming the backbone structure comprises molding the backbone structure from a polymeric material.

19. The method of claim 17, wherein forming the backbone structure comprises forming the backbone structure from a composite of continuous fibers in a resin.

* * * * *